(12) United States Patent (10) Patent No.: US 8,965,898 B2
Aman et al. (45) Date of Patent: *Feb. 24, 2015

(54) OPTIMIZATIONS FOR LIVE EVENT, REAL-TIME, 3D OBJECT TRACKING

(75) Inventors: James A. Aman, Souderton, PA (US); William R. Haller, Bethlehem, PA (US)

(73) Assignee: InthePlay, Inc., Lansdale, PA (US)

( * ) Notice: Subject to any disclaimer, the term of this patent is extended or adjusted under 35 U.S.C. 154(b) by 1125 days.

This patent is subject to a terminal disclaimer.

(21) Appl. No.: 12/287,339

(22) Filed: Oct. 8, 2008

(65) Prior Publication Data

US 2009/0046152 A1 Feb. 19, 2009

Related U.S. Application Data

(60) Division of application No. 10/006,444, filed on Nov. 20, 2001, now Pat. No. 7,483,049, and a continuation-in-part of application No. 09/510,922, filed on Feb. 22, 2000, now Pat. No. 6,707,487, and a continuation-in-part of application No. 09/179,219, filed on Nov. 20, 1998, now Pat. No. 6,567,116.

(51) Int. Cl.
| | |
|---|---|
| *G06F 17/30* | (2006.01) |
| *G06T 7/20* | (2006.01) |
| *A63B 24/00* | (2006.01) |
| *A63B 71/06* | (2006.01) |
| *G01S 17/87* | (2006.01) |
| *G01S 17/66* | (2006.01) |
| *G06K 9/32* | (2006.01) |

(52) U.S. Cl.
CPC ............ *A63B 71/0605* (2013.01); *G06T 7/2033* (2013.01); *G06K 2009/3225* (2013.01); *A63B 24/0021* (2013.01); *A63B 2220/40* (2013.01); *A63B 2024/0025* (2013.01); *A63B 2220/30* (2013.01); *G01S 17/87* (2013.01); *G06K 9/3216* (2013.01); *A63B 2220/13* (2013.01); *A63B 2220/806* (2013.01); *A63B 2208/12* (2013.01); *A63B 2243/0045* (2013.01); *G01S 17/66* (2013.01); *Y10S 707/913* (2013.01); *Y10S 707/914* (2013.01); *Y10S 707/915* (2013.01)
USPC ............ 707/741; 707/913; 707/914; 707/915

(58) Field of Classification Search
CPC .......... G06F 17/30858; G06F 17/3002; G06F 17/30017
USPC .................................. 707/741, 913, 914, 915
See application file for complete search history.

(56) References Cited

U.S. PATENT DOCUMENTS

| | | | | |
|---|---|---|---|---|
| 6,295,367 | B1 * | 9/2001 | Crabtree et al. | 382/103 |
| 6,751,354 | B2 * | 6/2004 | Foote et al. | 382/224 |
| 6,891,566 | B2 * | 5/2005 | Marchese | 348/211.3 |

(Continued)

*Primary Examiner* — Thanh-Ha Dang
(74) *Attorney, Agent, or Firm* — Stradley Ronon Stevens & Young, LLP

(57) ABSTRACT

Techniques for indexing multimedia data simultaneous with its capture to convert a real world event into an accessible database in real time are provided. The present invention introduces a new paradigm of converting a real world event in real time into a rich multimedia database by processing data from multiple cameras observing the event. Real time analysis of the camera data, coupled with domain knowledge, results in instant indexing of multimedia data at capture time itself. This yields the semantic information to answer complex queries about the content, and the ability to extract portions of data that correspond to complex actions performed in the real world.

52 Claims, 32 Drawing Sheets

(56) References Cited

U.S. PATENT DOCUMENTS

| | | | |
|---|---|---|---|
| 6,956,573 B1* | 10/2005 | Bergen et al. | 345/473 |
| 7,548,565 B2* | 6/2009 | Sull et al. | 370/503 |
| 8,060,515 B2* | 11/2011 | Smith-Semedo et al. | 707/741 |
| 2003/0177503 A1* | 9/2003 | Sull et al. | 725/112 |
| 2004/0073536 A1* | 4/2004 | Smith-Semedo et al. | 707/2 |
| 2008/0262996 A1* | 10/2008 | Yogeshwar et al. | 707/1 |
| 2012/0041956 A1* | 2/2012 | Smith-Semedo et al. | 707/741 |

\* cited by examiner

*Fig.* 9

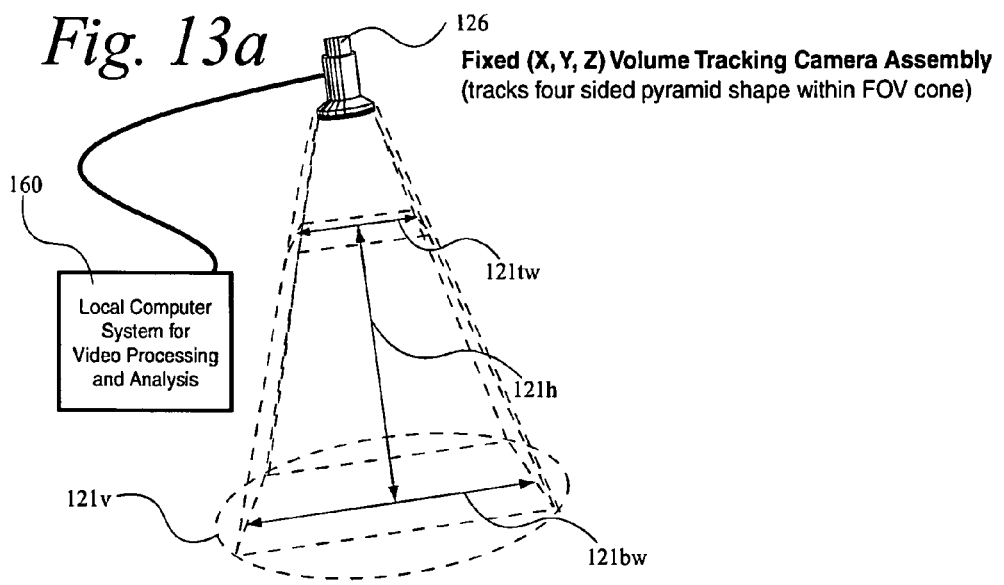
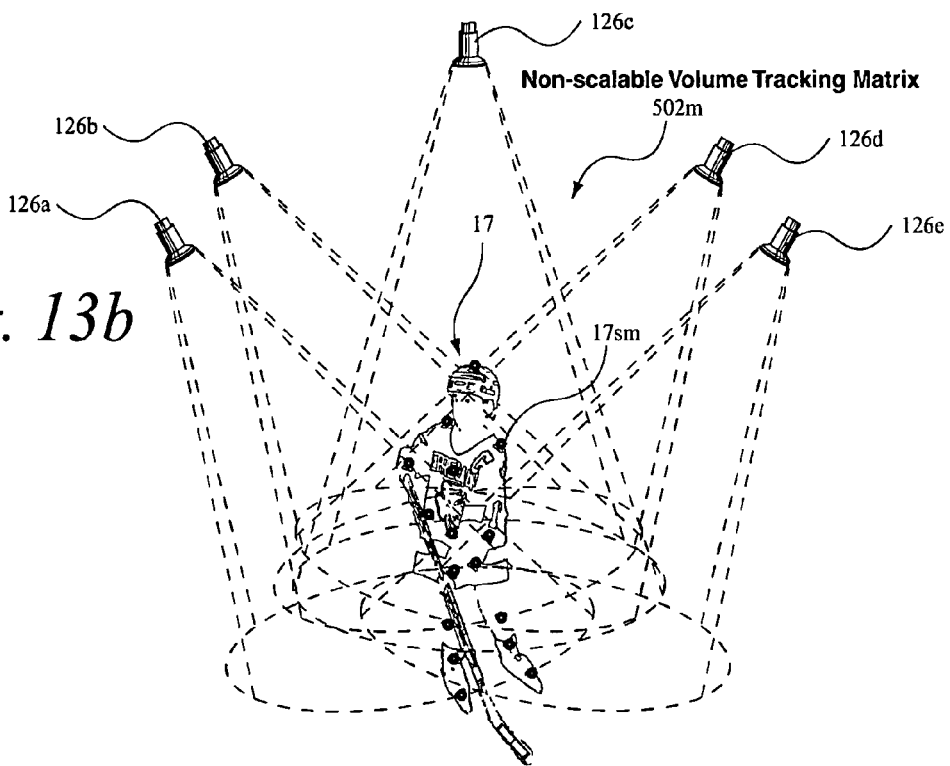

Fixed (X,Y) Area Tracking Camera Assembly

Scalable Area Tracking Matrix

Reflective Material

Retroreflective Material

Fluorescent Material

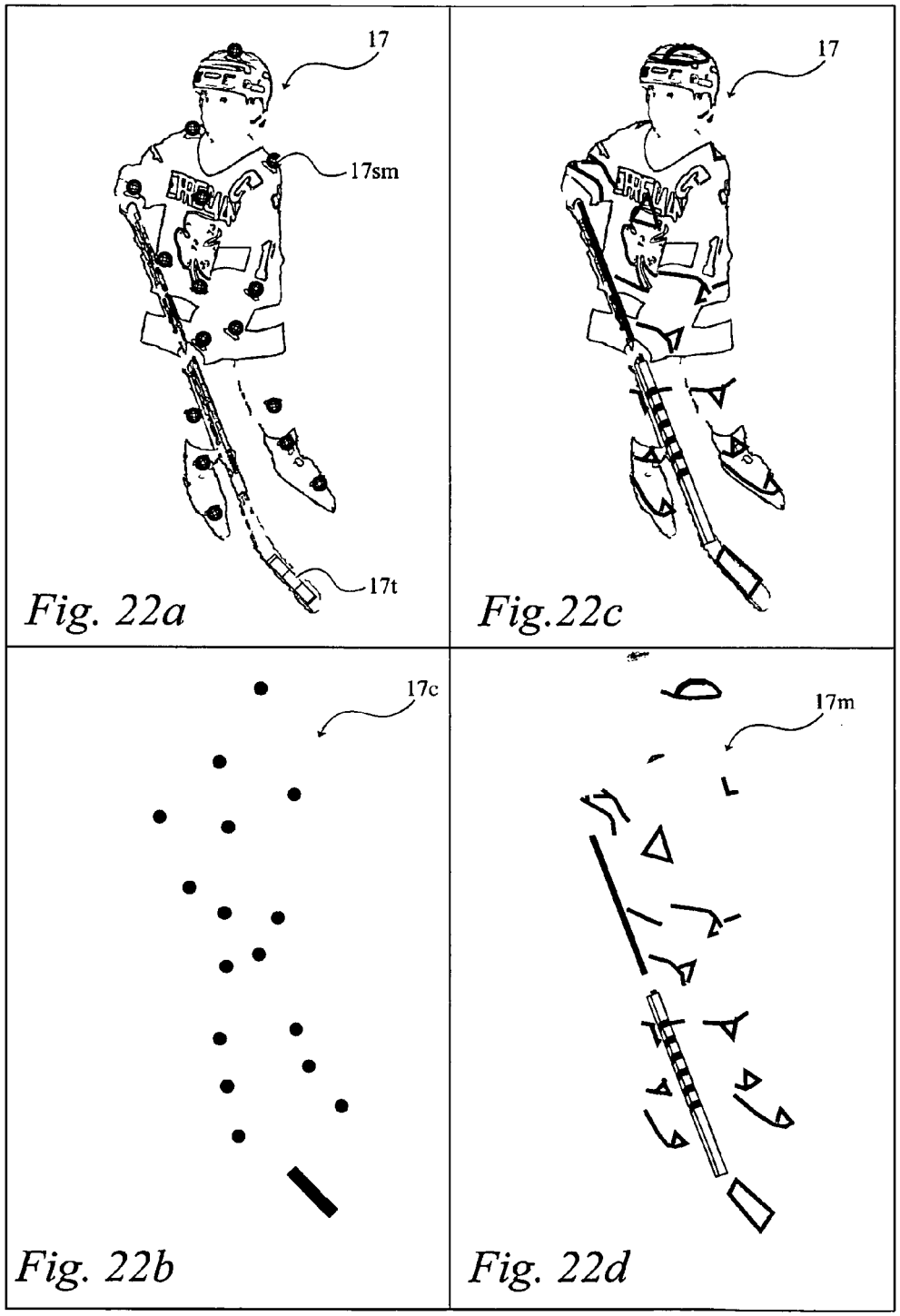

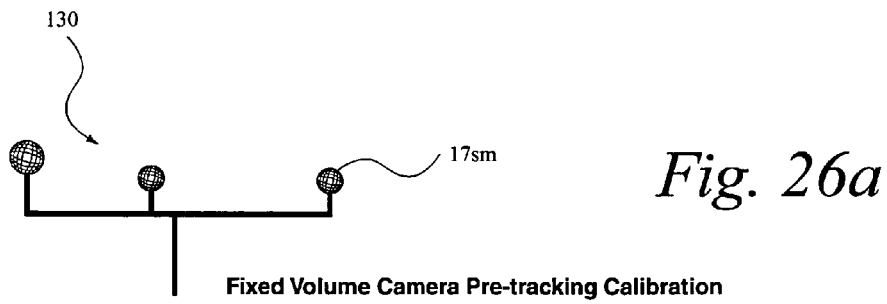
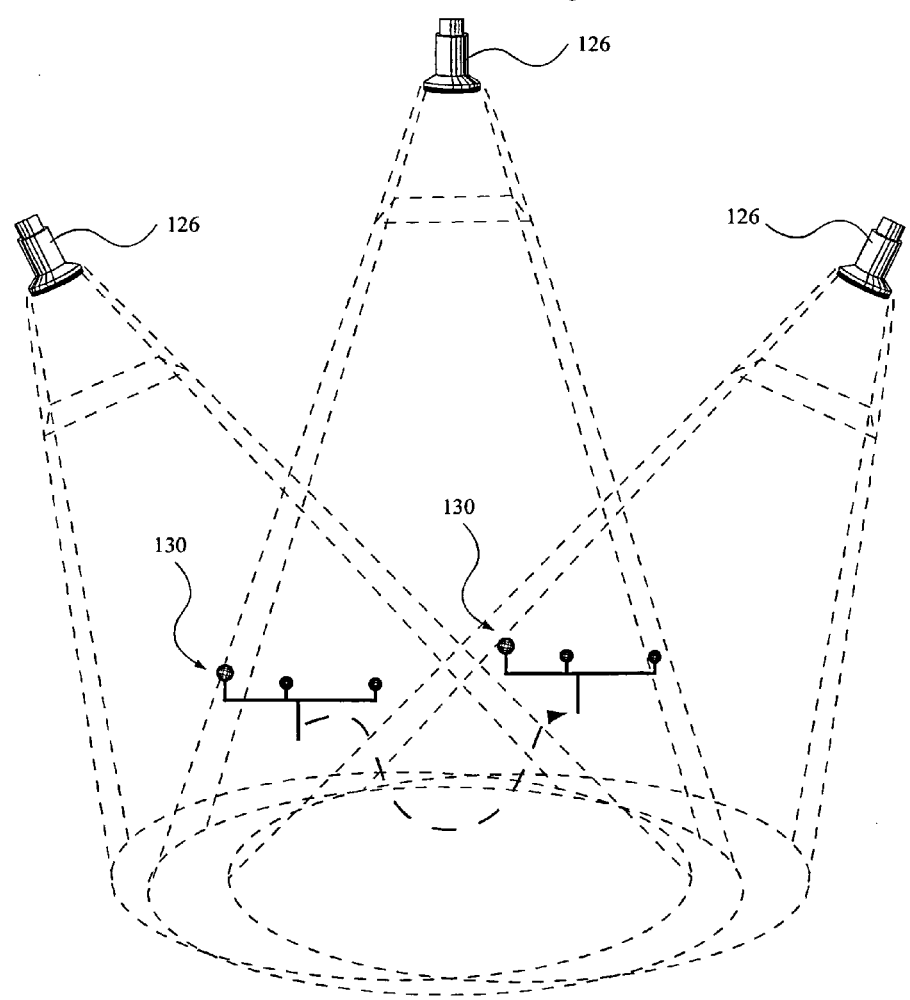
Fig. 26a

Fixed Area Camera & Movable Volume Camera
Dynamic Calibration

OPTIMIZATIONS FOR LIVE EVENT, REAL-TIME, 3D OBJECT TRACKING

RELATED APPLICATIONS

The present invention is a divisional application of U.S. patent application Ser. No. 10/006,444 filed on Nov. 20, 2001, now issued U.S. Pat. No. 7,483,049 B2. Application Ser. No. 10/006,444 was a continuation in part of U.S. patent application Ser. No. 09/510,922 filed on Feb. 22, 2000, now issued U.S. Pat. No. 6,707,487 B1, as well as U.S. patent application Ser. No. 09/197,219 filed on Nov. 20, 1998, now issued U.S. Pat. No. 6,567,116.

TECHNICAL FIELD

The present invention relates to machine vision systems for tracking the movement of multiple objects within a predefined area or volume.

BACKGROUND OF THE INVENTION

Several systems currently exist in the commercial marketplace for tracking the movement of one or more objects within a limited area. Such systems are routinely used to follow the movement of human subjects for a range of purposes including medical analysis, input for lifelike animation, as well as sports measurement. The following companies provide machine vision-based motion analysis systems:

Motion Analysis Corporation and their HiRES 3D system;
Vicon with their Vicon 250 and 512 3D motion analysis systems;
Ariel Dynamics, Inc. with their APAS system;
Charnwood Dynamics with their CODA motion analysis system;
Peak Performance Inc. with their Motus system;
Biogesta with their SAGA-3 RT System;
Elite with their ELITEPlus Motion Analyser System;
Northern Digital with their Optotrak and Polaris systems, and
Qualisys with their ProReflex system.

Each of these systems, which are capable of working in real time and creating three-dimensional (3D) tracking information, employ a system of markers to be placed upon the object(s) to be tracked. The markers themselves are followed by an overlapping configuration of tracking cameras. As image information is analyzed from each camera's two-dimensional (2D) view, it is combined to create the 3D coordinates of each marker as that marker moves about in the designated tracking volume. Based upon the detected marker 3D locations as well as the pre-known relationship between the markers and the objects, each system is then able to "re-assemble" any given object's 3D movement. All of the systems share at least portions of the following common attributes:

1—All of the cameras that are used to view the marker and therefore object movement are pre-placed in fixed strategic locations designed to keep the entire tracking volume in view of two or more cameras.
2—Each camera is designed to capture a unique 2D view for a fixed portion of the tracking volume. The entire set of captured 2D information is combined by the system to create the 3D information concerning all markers and therefore objects.
3—For a marker to be located in the local (X, Y, Z) coordinate system during any given instant, it must be visible to at least two cameras within that instant.
4—They use a single tracking energy that is either from the visible spectrum (such as red light) or infrared (IR).
5—They add additional tracking energy in the form of LED-based ring lights attached to the tracking cameras.
6—They place special retroreflective markers on the objects to be tracked. These retroreflectors reflect a broad spectrum of energy including visible and IR light.
7—The markers do not comprise any special encoding and are most often identical in size and shape. Typical shapes are a rectangle, a circle, or a sphere.
8—They use the unique positional combination (i.e., the measured physical space relationship of the markers placed upon the object) to encode that object's identity. Hence, no two objects can have the same or a substantially similar positional combination of markers placed upon them. This "constellation" of markers covers the majority of the object's surface volume and as such requires that the entire volume remain substantially in view at all times.
9—They determine, confirm, or both determine and confirm the identity of each object simultaneously with the tracking of the objects as they move throughout the entire tracking volume.
10—After the cameras have been placed in their fixed positions, they calibrate the system prior to tracking by moving a special calibration tool throughout the combined views of all cameras. The calibration tool consists of two or more markers that are at a pre-known distance from each other. Once the calibration has been completed, none of the cameras may be moved before or during actual object tracking.

Each of these systems shares many drawbacks, especially when considered for use in a live sporting environment such as a sporting contest. Some of these drawbacks are as follows:

1—All of the tracking cameras must be set into fixed positions and then pre-calibrated prior to actual live tracking. This requirement precludes the use of automatic pan, tilt, and zoom cameras to collect additional information as directed by the system in anticipation of marker inclusions.
2—Each camera is positioned to have a unique and substantially perspective view of a given portion of the tracking volume. Each camera's perspective view contains a significant depth of field. Any given object traveling throughout this depth of field will be seen with substantially different resolutions depending upon whether the object is at the nearest or farthest point with respect to a given camera. Therefore, the system experiences a non-uniform resolution per object throughout the entire tracking volume. This non-uniform resolution affects at least the ease with which the system may be scaled up to cover larger and larger tracking volumes using a consistent camera arrangement.
3—If the tracking energy is red light, any human observers will also see the illuminated markers if they are within the narrow retroreflected cone of light.
4—If the tracking energy is red light, then the system is susceptible to reflections of red light caused by pre-existing lighting in the visible spectrum that may be reflected from red colored portions of the tracked objects or the tracking volume itself.
5—In order to reduce unwanted reflections when working with visible red light, the systems typically cover the objects in darker material and place black matting on the movement surface to help reduce unwanted reflections that become system noise. These techniques are not appropriate for a "live" environment.

6—If the tracking energy is IR, then the light sources employed only emit IR without any additional visible light. The additional visible light would normally act as an indicator to a human observer that the light is on, naturally causing them not to stare for prolonged periods. Continued exposure to any high-intensity energy including IR light can damage the retina of the eye.

7—When working with IR, these systems do not employ IR absorbent compounds to be placed upon the objects and tracking volume background surfaces before any markers are attached as a means of reducing unwanted reflections that become system noise.

8—Because the retroreflective markers work across a broad spectrum, they will reflect any visible energy, not just the chosen emitted tracking energy whether that be red light or IR. As such, they will for instance retroreflect any pre-existing lighting or portable lighting such as camera flashes that are typically used by human observers in a live environment.

9—Given that the preferred spherical markers do have an appreciable size, they are limited in the number of places that they can be placed upon the objects, especially in a live environment. Due to their size, they are impractical for use in live sporting contests especially contact sports such as ice hockey where they may become dislodged during normal play.

10—When the systems are used to track more and more objects, each with many markers, more and more instances arise when not all markers are in view of at least two cameras or in some cases in view of any camera. This is referred to as "inclusions" and also affects the ability of the system to accurately identify a given object since its identity is encoded in the unique "constellation" of the markers placed upon the object, the location of one or more of which is now unknown.

11—When the objects to be tracked are uniformed athletes such as ice hockey players versus non-uniformed human subjects, their body sizes and shapes become less distinguishable due to the standard pad sizes of their equipment and their loose-fitting jerseys. As body shapes become less distinguishable, then the unique "constellation" of markers used to identify a given uniformed athlete becomes less distinguishable and more markers must be added in order to clearly identify individual players.

The present inventors have addressed many of these drawbacks in their co-pending applications entitled:

Multiple Object Tracking System, application Ser. No. 09/197,219; Filed: Nov. 20, 1998

Method for Representing Real-Time Motion over the Internet, application Ser. No. 09/510,922; Filed: Feb. 22, 2000

Employing Electromagnetic By-Product Radiation for Object Tracking, application Ser. No. 09/881,430; Filed: Jun. 14, 2001

Visibly Transparent Wide Observation Angle Retroreflective Materials, application Ser. No. 09/911,043; Filed: Jul. 23, 2001

Each of these patent applications is hereby incorporated by reference into the present application.

In these patents applications, the present inventors describe various aspects of a multiple object tracking system that functions in general to track many types of objects but that is especially constructed to track athletes during a live sporting event such as an ice hockey game. These patent applications teach at least the following novel components:

1—The system employs a matrix of separate overhead tracking cameras responsible for first locating any given object as a whole in a local (X, Y) area rather than in a (X, Y, Z) volume coordinate system. This technique yields a substantially uniform pixel resolution per area tracked providing a simple and regular approach to camera arrangement when the system is scaled to track larger areas.

2—The system employs separate sets of one or more pan, tilt, and zoom cameras per player to be tracked. These moveable cameras are automatically directed by the system based upon the (X, Y) location information that was first determined using the overhead tracking "area" cameras. Each of these volume cameras will collect (X, Y, Z) information from a particular view of the player to be combined with at least the (X, Y) information captured by the "area" cameras concerning the same player. Due to the system's ability to move and zoom each player-tracking camera, a substantially uniform pixel resolution per player is achieved. This technique provides a simple and regular approach to camera arrangement when the system is scaled to track more and more players.

3—The system preferably employs a non-visible tracking energy such as ultraviolet or infrared that is currently being generated by pre-existing lighting within the tracking area.

4—By using pre-existing lighting that is already in place with a purpose of illuminating the playing area for human observers, the system ensures that the observers will have a visible light indicator that the lamp is on. This will naturally keep the observer from staring at the lights and receiving an overexposure of non-visible tracking energy.

5—The system employs one or more reflective, retroreflective, fluorescent, and fluorescent retroreflective materials that are specifically designed to reflect only the chosen non-visible ultraviolet or infrared tracking energy and to be substantially transparent to visible light.

6—The system preferably employs markers that are made of ink which has minimal thickness and can be placed upon virtually any surface such as in the case of hockey a players helmet, jersey, or gloves; the tape they use to wrap their stick; or the puck.

7—The system preferably encodes the player's unique identity into the markings placed exclusively upon the "top surface" of the player, such as the helmet or shoulders. In so doing, the player's identity can be determined solely from the (X, Y) area tracking cameras and is substantially unaffected by player "bunching" and subsequent body marker inclusions that primarily affect the view of the body below the helmet and shoulders.

8—The system preferably takes advantage of the reduced player movement and smaller area of the playing surface entrance and exit as well as the team benches in order to perform player identification. The unique characteristics of the entrance and exit and benches provides the opportunity to focus the overhead (X, Y) tracking cameras in a considerably smaller field-of-view such that the players' helmets and attached markings are considerably enlarged with respect to the entire captured image. This in turn ensures that the space available for a marking on the helmet is sufficient to completely encode and therefore identify a given player through the use of more complex symbol patterns similar to bar codes. As previously mentioned, since the unique player code is therefore fully contained on the helmet, only the overhead (X, Y) cameras are necessary to determine identity thereby eliminating the effect of body marker inclusions caused when the (X, Y, Z) cameras' fields-of-view are blocked.

9—By separating entrance and exit and bench tracking and identification from playing surface tracking, it is possible to place a multi-frequency responsive marker at least on the player's helmet. For instance, the complex symbol patterns used to encode the player's identity can be created with an UV ink while the helmet tracking mark can be created with an IR ink, or vice versa. This switching of frequencies effectively doubles the available marking area of at least the helmet and potentially any other "top surface" such as the shoulders.

10—The area cameras have mutually exclusive fields-of-view with slight edge-to-edge overlap for calibration purposes. This calibration process is performed prior to live tracking.

11—The volume cameras are first calibrated with respect to their pan, tilt, and zoom drive mechanisms also prior to actual tracking. Their field-of-view will constantly overlap one or more area cameras. The combination of this overlapping area and volume information is then used by the system for dynamic re-calibration and adjustment of the volume cameras. The system thereby permits individual cameras to move and be recalibrated simultaneously with actual tracking.

12—The system employs absorber compounds that are to be placed upon the objects and playing surface prior to placing the markers in order to cut down or eliminate unwanted reflections that are system noise.

13—The system employs predictive techniques based upon the object's last known position, acceleration, velocity, and direction of travel to minimize the search time required to locate the object in subsequent video frames.

Also currently existing in the commercial marketplace are the following important components:

1—Wide-angle retroreflectors are capable of reflecting light in a wider cone than typical retroreflectors. These are available in both cube cornered and microscopic bead optical body formats. They provide the opportunity to move the lighting source further away from the tracking cameras when using retroreflective materials.

2—Fluorescent laser dyes are capable of absorbing visible light just below the 700 nm wavelengths that are still visible and converting it into IR light just above the 700 nm region that is non-visible. When using IR, these dyes provide the opportunity to convert visible energy as emitted by pre-existing arena lighting into IR tracking energy thus eliminating the need to add lighting that specifically radiates IR into the tracking volume.

3—Fluorescent laser dyes are capable of absorbing UV light around 330 nm wavelengths and converting it into UV light around 390 nm. This conversion is important given that certain commercially available low-cost digital imaging cameras are designed to have a higher responsivity to UV light especially around the 390 nm range. Furthermore, existing arena lighting such as Metal Halide Lamps currently generate UV energy in the frequency range of 315 to 400 nm. By absorbing the shorter wavelength UV energy around 330 nm and then radiating additional UV energy around 390 nm, the fluorescent dyes will essentially "double up" on the preferred narrow band of tracking frequencies.

4—Notch filters may be used with the tracking cameras and are capable of passing very narrow bands of specific frequencies of energy. This provides the opportunity to place reflective, fluorescent, or retroreflective materials that operate at different frequency ranges onto different players to assist in the identification process.

The present inventors have described in their co-pending applications many useful component and system solutions to the problems that are inherent within the existing systems. Additional components as described above also exist. It is possible to create several different and yet effective machine vision systems for tracking multiple moving objects based upon the novel components disclosed within the present application and four co-pending applications. What is needed is an understanding of how all of these teachings can be combined to form several different machine vision systems, each with their own novel optimizations.

In addition to the aforementioned machine vision system solutions to multi-object tracking it should be noted that at least two other companies are attempting to provide systems for similar purposes. Both Trackus, a Massachusetts-based company, and Orad, an Israeli-based company, are attempting to develop real-time "beacon"-based tracking technology for sporting events. Orad has produced a working system to follow horse racing; Trakus is the only company currently attempting to follow players in an ice hockey game. While Orad's solution is essentially similar at the highest levels, the technology will be explained based upon information gathered concerning Trakus.

Trakus' solution includes a microwave based transmitter and receiver that will track a single point within the helmet of each player. There are many deficiencies with this proposed solution as compared to machine vision systems in general and the novel teachings of the present inventors in particular. One of the most important distinctions is the "active" and potential harmful nature of the microwave technology. If used for tracking youth sports, it is anticipated that the average parent would balk at the idea of placing even a low-power microwave device into the helmet of their child. Furthermore, there are significant reflection problems due to the hard interior surfaces of a hockey arena that must be resolved before this technology can effectively track even a single point (the helmet) on every player on both teams. As already discussed, machine vision-based systems employ "passive" markers that are capable of tracking 14 or more points (the head and every major joint) on every player in real time. The present invention furthermore uniquely teaches a system that can also track game equipment and the puck, devices that have surfaces that cannot be substantially altered by the normal size of traditional markers.

SUMMARY OF THE INVENTION

For the purposes of disclosing the novel teachings of the present invention, the exemplary application of following the motion of hockey players, their equipment, and the game puck in a live sporting event will be used to represent mufti-object tracking.

In order to create an optimal multi-object tracking system, the present inventors have focused on four major factors as follows:

A. The desired tracking information to be determined by the system;

B. The characteristics of the objects to be tracked;

C. The characteristics of the tracking environment; as well as

D. Traditional engineering goals.

A. With respect to the desired tracking information to be determined by the system, the following characteristics were considered:

1. Is the desired representation to be visual for display only or a mathematical model for measurement and rendering?;

2. Is two or three-dimensional information preferred?;

3. Is object orientation required in addition to location, velocity, and acceleration?;
4. Must this information be collected and available in real time?
5. What is the acceptable accuracy and precision with respect to this information?;
6. Will the system be required to identify the objects as well as tracking them?; and
7. Once an object has been identified, can this identity be lost during tracking?

B. With respect to the objects to be tracked, the following characteristics were considered:
1. Is the object rigid or flexible?;
2. In how many degrees of freedom will the object be moving?;
3. How fast will the objects be moving?;
4. Are there multiple objects to be tracked and, if so, how will this impact the tracking method?;
5. Are there any restrictions or safety considerations regarding the type of electromagnetic energy used to track the objects?;
6. What are the physical space limitations on the objects for any marker- or beacon-based tracking system?; and
7. What is the natural reflectivity of the various background surfaces to the different potential tracking energies?

C. With respect to the tracking environment, the following characteristics were considered:
1. Is the setting "live" or "controlled"?;
2. What are the existing ambient electromagnetic energies?;
3. Are their any other pre-existing energy sources that may have available by-product energy that could be used for tracking?;
4. What is the natural reflectivity of the various background surfaces to the different potential tracking energies?;
5. What is the size of the tracking area relative to the range of the potential tracking methods?; and
6. Is the tracking environment physically enclosed within a building or outside?

D. With respect to traditional engineering goals, the following characteristics were considered:
1. The system should be scalable and therefore comprise uniform assemblies that can be combined into a matrix designed to increase tracking coverage in terms of area, volume, and the number of objects while still maintaining uniform performance.
2. The system should be minimally intrusive upon the objects to be tracked and upon the surrounding environment, especially if that environment is a live setting;
3. The tracking signal-to-noise ratio should be maximized; and
4. Manufacturing and installation costs should be minimized and the resultant system should be simple for the user to maintain and operate.

An optimized system design such as disclosed in the present application must consider many of the above-stated questions and criteria simultaneously. However, for the sake of consistency, each of the pertinent questions and criteria listed above will be considered in order.

Therefore, referring first to the characteristics of the desired tracking information to be determined by the system, the following is taught.

A.1. Is the desired representation to be visual for display only or a mathematical model for measurement and rendering?

It is preferable that the tracking system creates a mathematical model of the tracked players and equipment as opposed to a visual representation that is essentially similar to a traditional filming and broadcast system. A mathematical model allows for the measurement of the athletic competition while also providing the basis for a graphical rendering of the captured movement for visual inspection from any desired viewpoint. Certain systems exist in the marketplace that attempt to film sporting contests for multiple viewpoints after which a computer system may be used to rotate through the various overlapping views giving a limited ability to see the contest from any perspective. All of the aforementioned machine vision companies, such as Motion Analysis and Vicon, generate a mathematical model.

This requirement of creating a mathematical model of human movement necessarily dictates that at least one precise location on the human body be identified and followed. For beacon-based systems such as Trakus or Orad, following the beacon's signal provides both identity and object location. To be implemented in a machine vision system, this further implies that each of these locations remain substantially in view of two or more tracking cameras at all times. Furthermore, the use of markers strategically placed upon the players can greatly simplify video frame analysis, as the markers become consistent center points that reduce the need for detailed edge detection techniques as well as identification and weighted averaging of player surfaces. This marker technique is implemented by all of the vision-based systems such as Motion Analysis and Vicon and is preferred by the present inventors. As will be discussed, the exact choice of the type, shape, size, and placement of the preferred markers is significant to some of the novel functions of the present invention and is different from existing techniques.

A.2. Is two or three-dimensional information preferred?

Three-dimensional information provides the ability to generate more realistic graphical renditions and to create more detailed statistics and analyses concerning game play. All of the aforementioned machine vision companies such as Motion Analysis and Vicon attempt to generate three-dimensional data while the beacon-based Trakus and Orad only generate two-dimensional information.

This requirement of creating a three-dimensional mathematical model of game play further dictates that at least the major joints on a player are identified and tracked. For instance, the player's helmet, shoulders, elbows, writs, torso, waist, knees, and feet are all beneficial tracking points for a 3D model. This informational goal in practice precludes beacon-based systems such as Trakus and Orad since it would require a significant number of beacons to be placed onto each player, often times in locations that are not convenient. Furthermore, each beacon will create additional signal processing and, given current state of the art in microwave tracking, the system could not function quickly enough to resolve all of the incoming signals.

For vision-based systems such as Motion Analysis and Vicon, significant difficulties also begin to present themselves in consideration of the requirement that each joint be in view of at least two cameras at all times. As players move about and change their body positions, individual joints can easily be lost from view (inclusion) or take positions that from a given camera's "flat 2D" perspective appear to make them a part of a different player. This is especially true in light of the small spherical markers used by existing systems that are not in view from every possible rotational angle of the joint. What is needed is a vision-based tracking system that can identify and track players with one set of cameras and then automatically direct a second set of cameras to adjust their views so as to minimize these inclusions. What is further needed is a tracking system that employs markers that can cover a much larger area, for instance all the way around an elbow rather than a single point or set of three points upon the elbow, while at the same time remaining less obtrusive.

A.3. Is object orientation required in addition to location, velocity, and acceleration?

Especially in the sport of ice hockey, it is important to know the orientation of the player as a whole since, for instance, they can be skating in a certain direction either facing forwards or backwards. Furthermore, in any motion system designed to follow the movement of a human joint that has multiple degrees of freedom, it is necessary to determine the orientation of the joint, not merely its position in order to create an accurate mathematical model. This requirement exceeds the capacity of beacon-based systems such as Trakus and Orad since the emitted signals are uniformly omni-directional and therefore cannot be used to determine rotation about the transmitting axis. For vision-based systems such as Motion Analysis, Vicon and the present invention, this requirement significantly favors the use of markers over edge detection of player surfaces. This is because the markers have clear center points and could be placed in a triangular format that is a traditional method for orientation detection. The present inventors prefer larger markings that form shapes such as an oval, circle, or triangle over the placement of spherical markers as is currently practiced.

A.4. Must this information be collected and available in real time?

The ability to capture and analyze images, convert them into a 3-D mathematical model, and then dynamically render a graphic representation along with quantified statistics in real time offers significant opportunities and challenges. For beacon-based systems such as Trakus and Orad, there is a single set of receiving towers throughout the arena that must process as many beacons as required to follow all of the players to be tracked. Essentially, the entire set of towers is necessary to cover the rink for even a single player. Additionally, each player's beacon signal will be picked up by each tower and then must be compared across all towers to perform the location function. As more players are added, they will create additional processing for each tower. Hence, the total number of players is limited by the capacity of a single tower to process its received signals in real time. While such beacon-based systems may be scalable by playing area, therefore simply adding additional towers will cover additional area, they are not scalable by the number of players. Hence, for more players within a given area, one cannot simply add more towers. These systems are inherently "player bound" as opposed to "area bound." For vision-based systems such as Motion Analysis and Vicon, the goal of real-time information significantly challenges system capacity especially when combined with the need to track multiple players. This requirement limits the amount of image processing time available to handle ambiguities created in the data set by the inclusions that occur when players overlap, or bunch up, within a given camera view. Similar to the beacon-based systems, these camera systems can be said to be scalable by playing area since each additional playing volume requires the uniform addition of fixed perspective cameras. However, they too are "player bound" since any number of players may at a single time end up in any given playing volume creating a large, "included" data set that cannot be sufficiently processed in real time if at all without human assistance to clarify ambiguities.

The present inventors prefer to separate the function of "area" tracking for 2D movements and identification from "player" tracking for the full 3D data set. Hence, a matrix of overhead (X, Y) cameras follows the movement of any number of players per single camera across a single playing area. Since the number of markers tracked from the overhead view is limited to primarily the helmet and shoulders, the total number of marks, even for a large number of players is still trackable. Furthermore, due to the overhead view and the tendency for players to remain upright, it is expected that there will be minimal instances of helmet or shoulder "overhead inclusions." In addition to being tracked in 2D space by the overhead cameras, each player will also be followed by at least two and preferably four dedicated pan, tilt, and zoom perspective cameras. These dedicated, movable, perspective cameras will be automatically directed by the known (X, Y) location of each player as determined by the overhead cameras. This combination of novel techniques provides for scalability by both tracking area and player. Hence, to cover more area simply add one or more overhead "area" tracking cameras while to cover more players simply add additional sets of one or more dedicated movable "player" tracking cameras.

A.5. What is the acceptable accuracy and precision with respect to this information?

The speed of a hockey puck can approach 100 mph while a player may be skating upwards of 25 mph. As was previously described in detail in the present inventors' co-pending application for a Multiple Object Tracking System, minimum capture rates of 40 frames per second for low-end commercial video cameras will follow pucks at a maximum of 3.7 feet per frame and players at 0.9 feet per frame. While this is sufficient to create a realistic mathematical model of game movement, faster cameras with between 2 to 4 times the capture rates are readily available. The incorporation of faster cameras also requires the use of faster computers and software algorithms to locate and identify markers and therefore players and equipment within the allotted fraction of a second. Currently, the beacon-based Trakus captures data at 30 locations per second.

A.6. Will the system be required to identify the objects as well as tracking them?

The ability to identify the tracked objects is critical and poses a more difficult problem for the video-based systems versus the beacon systems. With a beacon system, the transmitted signal can easily contain a uniquely encoded value that serves to differentiate each player. For a video-based system, which uses a single tracking energy and passive markers, the encoding must be accomplished via some unique arrangement of markings. For vision based systems such as Motion Analysis and Vicon, the current practice is to consider the unique "constellation" of markers as placed upon each players body to form an encoding for that player. This thinking is predicated on the idea that no two individuals have exactly the same body shape and hence the markers will always be in at least slightly different configurations. If two players did end up with "constellations" that were too similar in configuration to be accurately differentiated, then one or more additional markers would be added to at least one of the players to sufficiently differentiate the one from the other. It should be noted, that with this strategy, the majority of the markers play a dual role of both joint and body segment tracking on an individual basis and player identity on a collective basis.

A further practical limitation of this technique is its real-life implementation with non-sophisticated system operators. In other words, at the most difficult youth sport level, the ideal tracking system must be operable by minimally trained lay people such as coaches and parents. Placing these markers upon the player's body in such a way as to guarantee a unique constellation for all 16 to 20 players on a team will be overly restrictive. What is needed is a simple approach to placing a minimum of a single marker upon the player that is assured to provide a unique identification during game tracking. The present inventors prefer to isolate player identification to those markings that can be viewed strictly from the overhead cameras, i.e., the "top surface" of the player's body. This minimizes the occasions when the markers that are relied upon for identification are hidden (included) from camera view based upon player bunching. In the preferred embodiment, the markings placed on the player's helmet and possibly also on their shoulders form a uniquely identifiable pattern, similar in form to bar coding. The decision as to whether the shoulder markers need to be included in the unique pattern depends mainly upon the total area provided by the helmet alone and the number of pixels per inch resolution of the viewing cameras. For effective machine vision, any mark to be "seen" must be picked up by preferably two pixels. Depending upon the pixel per inch resolution of the camera configuration, these two pixels will represent a different sized area. In practice, due to the expected movement and rotation of the helmet that is inherently not a flat surface, it is preferred to have many more pixels per inch of marking for accurate recognition. Additionally, it is anticipated that there may be between thirty to forty players and game officials on the ice over the course of a given game. Each one of these players and officials must have a unique tracking pattern on their helmet. Hence, if there is not enough room on the helmet to include an easily recognizable, unique encoding for each player, the shoulders can be used to augment the coding scheme. This novel approach provides the opportunity to optionally separate the player identification process from the tracking process. Since the players are all expected to enter and exit the playing area via a limited passageway and furthermore to collect just outside the playing area on team benches, it is anticipated that these will present ideal areas to first ascertain and then reconfirm unique player identities. Once the players are identified as they first enter the playing area through the passageway, they can then simply be tracked as they move throughout the playing area. Should an ambiguity arise between two players during game play, their identity can be sorted out once they return to the team benches.

This separation of player identification from movement tracking opens up the possibility of different camera and lens configurations in the "identification areas" versus the "tracking areas." Hence, the identification cameras could for instance be focused on a much narrower field of view since the passageway and team bench are considerably smaller in area than the playing surface. By narrowing the field of view, the resultant pixels per square inch of "id pattern" will be increased thereby reducing the necessary size of this unique marking. Other possibilities are anticipated such as the creation of a unique marking that is detected in a first select frequency such as IR and an overlapping tracking mark that is detected in a second select frequency such as UR. (These frequencies could easily be reversed with no change to the novel functionality.) In this embodiment, the "identification areas" will be viewed with IR cameras while the "tracking areas" will be viewed with UV cameras. It should be noted that both the IR id mark and the UV tracking mark would be non-visible to the players and viewing audience. Furthermore, these separate "identification areas" will also facilitate tracking the limited movement of the players until they enter the playing surface, i.e. "tracking area."

A.7. Once an object has been identified, can this identity be lost during tracking?

The answer to this question is entirely driven by the selected tracking and identification technique. For instance, with beacon-based identification such as Trakus and Orad, the identity is only lost if the unique player signal is lost. For traditional vision-based tracking such as Motion Analysis and Vicon, player identity can be easily lost based upon a number of factors. These factors include the number of cameras viewing a given playing volume, the pixel per inch resolution for the allowed marker size as well as the number of expected inclusions due to player bunching. The final factor is randomly variable throughout a given tracking session. The preferred embodiment of the present invention has separated the identification of each player into a 2D overhead viewing function that strictly focuses on the "top surface" of each player. Since the number of inclusions of player's helmets is expected to be minimal, especially from the overhead view is expected to be minimal, the preferred embodiment will not experience the same difficulties in maintaining player identity as traditional systems.

B. Referring next to the characteristics of the objects to be tracked, the preferred and alternate novel embodiments must consider at least the following factors:

B.1. Is the object rigid or flexible?

The majority of objects (i.e., the players) are flexible while some objects are rigid such as the sticks and puck. Flexible objects such as players create difficulties for vision-based tracking systems because their form is constantly changing. These changes create greater opportunities for inclusions (blocked markers) and for misinterpretation when multiple players wearing multiple markers are each partially in view from any given camera. For beacon-based systems such as Trakus and Orad, the only location being tracked on the player is the helmet that is itself rigid. Due to the nature of the beacon itself, it is immaterial whether the object is flexible since the beacon's signal will transmit through the player's body and most equipment. For machine vision systems such as Motion Analysis and Vicon, this restriction significantly adds to the difficulty of keeping any given marker in the view of two or more cameras at a single instant, especially in light of the multiple player requirements.

Due in part to the infinite variations of marker images that can be created by any number of players holding their bodies in any number of positions creating any number of inclusions, all within a single camera field of view, the present inventors favor the novel teachings of the present invention. More specifically, by isolating player identification to markings placed upon the player's helmet that is rigid and substantially in view of the overhead cameras at all times, the flexibility of the player's body is removed as a negative factor for the more complex purpose of identification. Additionally, the use of larger ink markings provides for various marker shapes such as circles around the elbows, torso, knees or ankles or strips that can run down a player's arms, legs, torso or stick, etc. This in turn allows the present invention to greatly reduce the chances for total inclusion as the player's flex individually and bunch together. And finally, the separation of overhead (X,Y) "area" tracking that automatically directs the dedicated pan, tilt and zoom "player" tracking cameras, which in turn collect the 3D information, further minimizes the inclusions created by multiple flexible objects.

B.2. In how many degrees of freedom will the object be moving?

Similar to the difficulties created by the flexibility of a player, the full six degrees of freedom within which a player and or their limbs may travel creates increased challenges for vision-based solutions such as Motion Analysis and Vicon. It should first be noted that beacon-based systems such as Trakus and Orad are not impacted by the freedom of the player to move their helmet in any of the six possible directions from the current location. Of course, the beacon solution itself has a much greater shortcoming since it is in practice limited to a single beacon per player.

Returning to the vision systems such as Motion Analysis and Vicon, the current practice is to place small spheres ranging in size from approximately ⅛" to 1" in diameter upon the various joints and locations to be tracked on any given player. Often, these small spheres are themselves held out away from the players body on a short stem of approximately ½". This configuration is uniformly adopted by the current 3D vision-based tracking systems and represents a significant system limitation. The purpose of the spherical shape of the marker is to ensure that a maximum image size is created irrespective of the location of the marker (and its associated body part) with respect to the viewing camera. Hence, no matter what the angle of view, the marker will always show up as a circle unless the view is in some way blocked. The purpose of the stem is to hold the sphere out away from the body thereby reducing the circumstances of partial inclusion created by the body surface to which the marker has been attached. While this technique has worked well for "controlled" situations, these markers are unacceptable for "live" events.

What is needed is a method of marking the players joints that will be substantially visible from two or more cameras from any view point despite the six degree freedom of player movement. Given this requirement, the present inventors prefer the novel technique of using a much larger "surface area" marking. This essentially maximizes the marker view by both increasing the size of the mark as well as continuously surrounding a joint or body part such as the elbows, torso, knees or ankles. By both enlarging the mark and surrounding the body part, the ability for that part to been seen from any angle while it moves in six degrees of freedom is significantly increased.

B.3. How fast will the objects be moving?

As was previously stated, the speed of a hockey puck can approach 100 mph while a player may be skating upwards of 25 mph. When players are spinning or turning at or near their full speed of travel, the combined joint movement speed can present problems to tracking systems with lower sampling rates. For beacon-based systems such as Trakus and Orad, which take approximately 30 locations per second, these speeds would present a significant challenge if the beacons could be placed upon a puck or even a player's wrist. For vision-based systems such as Motion Analysis, Vicon and the present invention, camera and video capture technology can presently handle upwards of 240 frames per second with acceptable 1 megapixel resolution.

B.4. Are there multiple objects to be tracked and, if so, how will this impact the tracking method?

As has been previously suggested, it is necessary to track the motion of at least 10 players and 3 game officials in the playing area for the sport of ice hockey. Including the players' benches, the total number of players and officials can exceed 40. For other sports such as American football, the total players and officials can exceed 60, over 20 at a time on the playing surface. This requirement for ice hockey alone has pushed the limits of beacon-based systems such as Trakus and Orad that are simply attempting to track a single point, the helmet, for each player. For vision-based systems such as Motion Analysis and Vicon, this requirement also presents a significant challenge. All of the existing vision tracking systems first place fixed field of view cameras just outside the tracking area. These cameras are strategically placed in an attempt to keep the maximum number of markers within view of at least two cameras at all times even as these markers travel about in six degrees of freedom. The prospect of viewing multiple players within a given volume further challenges the strategic placement of these fixed cameras. As more and more players randomly congregate within any given volume, more and more of their respective markers will be blocked, from any given camera's field of view. Since the sum total of a player's markers is used in and of itself for player identification, as markers are lost from view this not only jeopardizes the accurate tracking of an individual body part, but also increases the incidence of improperly identified players.

The present inventors prefer the novel approach of controllably directing one or more movable pan, tilt and zoom cameras to follow each individual player based upon the first determined (X,Y) location as obtained via the overhead cameras. In this way the system's "total field-of-view" is dynamically recreated and maximized for player and marker visibility. The preferred embodiment includes movable cameras that are not necessarily unconditionally dedicated to follow a single player. It is anticipated that, given the known and projected locations of each player in the tracking area, it may be beneficial to dynamically switch one or more cameras away from one or more players onto one or more other players.

B.5. Are there any restrictions or safety considerations regarding the type of electromagnetic energy used to track the objects?

For safety requirements the properties of both wavelength and flux must be considered apart and in combination. The beacon-based tracking implemented by Trakus employs microwaves similar to cell phone technology. These frequencies of energy can be harmful in larger amounts and, for this reason, Trakus pulses their transmitter signals so as to reduce the average energy exposed to the player through the helmet. However, the present inventors see at least the potential for perceived harm since the players, which in the case of recreational hockey are youths, will be exposed to higher dosages of this energy as they tend to bunch together during play or at least in the team bench area.

In the case of vision-based systems such as Motion Analysis or Vicon, the primary tracking energy is visible, such as red light. While these energies are not harmful to the players, they do restrict the use of these systems to controlled settings where it is acceptable for the athletes and viewers to see the markers and their reflections. Motion Analysis, Vicon and other providers also offer the choice of working in near IR frequencies. These IR frequencies are safe for human exposure. The ring lights used to illuminate the tracking area in these systems only emit IR energy, however, and as such are not noticeably active on to the casual viewer. There is some concern that an uninformed individual could stare up at the camera with its IR ring light and receive an overexposure of IR energy possibly damaging the retina of the eye. For this reasons, these ring lights come with additional small LED's that emit a visible light cue when the IR light is on, essentially alerting people not to stare. This may not be a sufficient mechanism for the uniformed casual viewer. When tracking in IR energy, the present inventors prefer a light source that emits both visible and IR light since the visible light will act as a natural cue to dissuade the observer from staring.

Also taught in the preferred embodiment is the novel use of UV energy for tracking purposes. UV energy is broken into three types; UVC, UVB and UVA. UVC and UVB are generally thought to be the most damaging while UVA is considered to be biologically safe and much more prevalent in the atmosphere than UVB. UVA is typically considered to be those wavelengths between 315 to 400 nm. Visible light begins as 400 nm. The preferred embodiment employs tracking frequencies centering around 390 nm, just shy of visible light. This is an ideal wavelength since there are low-cost industrial digital cameras whose responsivity curves peak at or near this frequency. Furthermore, the metal halide lamps that are often found in hockey rinks generate a significant amount of UVA energy that could be used as an energy source.

B.6. What are the physical space limitations on the objects for any marker or beacon-based tracking system?

To employ beacon-based tracking such as Trakus and Orad for contact sports it is preferable to embed the beacon somewhere in the player's equipment. Due to several other drawbacks, these beacon systems have been limited to tracking a single point that was centrally chosen to be the helmet. If other considerations were permitting and additional beacons could be tracked per player, then the requirement to embed beacons into the equipment in order to avoid injury possible from player contact would itself becoming a significant problem.

For vision-based systems such as Motion Analysis and Vicon, the markers must reside outside of the player's exposed surface in order to receive and reflect the tracking energy. Furthermore, as was previously mentioned, these markers have been constructed as spheres so as to maximize the reflected image independent of marker angle to camera. These spheres strategically placed onto various joints and body parts are impractical for live, uncontrolled settings such as a full-contact sporting event. The preferred embodiment of the present invention specifies the use of reflective ink or paint that can be applied to the various substrates such as plastic, wood, fabric, leather, rubber, etc. and will add minimal thickness. Unlike to current practice of using visible spheres of limited diameter that must protrude from the player to maximize reflection, the preferred technique uses non-visible ink to place large markings on the various joints and body parts. Depending upon the transmissivity to the fabric being worn by the players, the ink itself could be placed on the inside of this material and receive and reflect the non-visible tracking energy directly through the jersey. The end result of this type of preferred marking is to overcome any physical space limitation considerations.

B.7. What is the natural reflectivity of the various background surfaces to the different potential tracking energies?

The reflectivity of the background surfaces, and for that matter the "non-tracked" foreground surfaces, represents the most significant source of system noise. For beacon-based systems such as Trakus and Orad, the microwaves emitted by the players' transmitters will reflect off hard surfaces such as metal and concrete. Due especially to the enclosed environment of a hockey arena, these reflections will continue to bounce between the background surfaces within the tracking volume as they slowly attenuate, thus contributing to significant noise problems.

For vision-based systems such as Motion Analysis and Vicon, reflectivity issues are limited to the individual camera's field of view. Hence, since the cameras are primarily focused on the playing surface and surrounding boundaries, the reflection issues are already diminished over beacon-based systems. However, for the sport of ice hockey, the playing surface is ice that tends to be highly reflective of visible, IR and UV energies. In the case of visible red light as preferred by Motion Analysis and Vicon, these reflections are typically handled via software processing. During system calibration, the images captured by each camera are reviewed for possible ice surface reflections especially from the ring lights affixed to the tracking cameras. Any such undesirable signals are "mapped" out via a software tool that essentially informs the image analysis to ignore any and all data capture from those coordinates. Of course, should valid marker data coincidentally show up at that same location during a live filming, it would be ignored as well.

In the preferred embodiment, absorbent compounds are applied to the various background and "non-tracked" foreground surfaces. For instance, if the tracking energy is UV, traditional UV absorptive compounds as are well known in the commercial marketplace can be used to absorb stray UV energy. The entire player including their jersey, helmet, pads, gloves, stick, etc. as well as the ice surface, boards and glass can all be first treated with one or more UV absorptive compounds. This novel technique significantly reduces system noise and essentially makes everything but the subsequently applied markers invisible to the tracking cameras. Similar techniques are possible if IR is used as the tracking energy.

C. Referring next to the characteristics of the tracking environment, the preferred and alternate novel embodiments must consider the following questions:

C.1. Is the setting "live" or "controlled"?

Tracking players in a live sporting event such as ice hockey adds a major restriction to the system requirements. Namely, the system must be as unobtrusive as possible for both the players and the viewing audience. In the case of the beacon systems from Trakus and Orad, the transmitters are hidden and the tracking signal is non-visible. The only possible drawback is that receiving towers must be placed throughout the arena. Careful attention must be made to keep these towers from blocking the view of nearby fans.

With respect to vision-based systems such as Motion Analysis and Vicon, there are two major types of restrictions present in their approach. First, the tracking energy itself is typically within the visible spectrum (e.g. red light). This energy is necessarily also visible to the players and audience. Second, as previously discussed, the markers have substantial size. Their size makes them noticeable to players and fans and potentially dangerous to the players since they could apply additional pressure to their bodies upon contact with other players, the ice surface or the boards. Furthermore, these markers could easily be dislodged creating at a minimum the stoppage of game play and or worse a potential injury hazard. Motion Analysis and Vicon, as well as other vision tracking providers, offer an option to work in IR light. This change eliminates the direct interference of visible light and its reflections off the ice surface with player and fan vision. However, the markers used by these types of systems have an additional problem other than their size. Specifically, they are constructed of a spherical material preferably a foam ball, that has been covered with a retroreflective tape. The tape itself is greyish in visible color. These tapes are typically made of a material referred to as "cube cornered retroreflectors" but could also be produced with microspheric devices. In either case, current technology provides for optically transparent bodies that are coated on their undersides with a reflective material such as aluminum or silver, essentially forming a mirror. The additional problem is the broad band frequency response of these microscopic mirrors that includes visible light as well as UV and IR. Hence, even if the tracking energy is switched to IR, other ambient visible frequencies will themselves retroreflect off these markers back towards the players and fans who are near the light source. As players move about, these spheres will have a tendency to fluctuate in brightness as they pass through various lighting channels. If a fan or reporter were to use flash-based photography or illuminated video taping, these markers would retroreflect this energy back into their camera causing noticeable bright spots on top of the greyish circles.

To overcome these drawbacks, the present inventors teach the use of ink-based markings that are applied directly to the substrates worn or held by the players. Unlike the spherical markers, these inks will not add any appreciable thickness to the player's clothing or equipment. This effectively overcomes the marker size problem. To overcome the broad band reflectivity drawback, the preferred embodiment includes either reflective, fluorescent or retroreflective inks and compounds that have been engineered to only reflect the narrow band of non-visible tracking energy and as such are substantially transparent to visible light.

C.2. What are the existing ambient electromagnetic energies?

Within the live setting of at least a hockey arena, there will be large area high intensity discharge (HID) lighting such as Metal Halide or Mercury Vapor lamps. These sources typically are chosen because they generate a very broad range of energy throughout the visible spectrum producing a natural-looking white light. The placement of these lamps will be determined and conducive to audience viewing considerations rather than object tracking requirements. During the contest, these lights may be altered in intensity or augmented with additional lighting for visual effect. There is no assurance that the illumination levels in the arena will remain consistent in intensity. Furthermore, it must be anticipated that either fans or broadcasters will bring in additional portable light sources for filming purposes that will also add to the uncontrolled lighting levels.

For beacon-based systems such as Trakus and Orad that depend upon microwave transmissions, the visible light frequencies do not present any noise to the tracking system. Fans using portable cell phones will be transmitting microwave energy but the beacon signals can simply be set to emit at a different wavelength.

For vision-based systems such as Motion Analysis and Vicon, these ambient frequencies are an important source of noise especially in consideration of the various colored uniforms and equipment worn by players during a typical live contest. Hence, if the players are wearing red uniforms or they have red streaks on their jerseys or equipment, then the ambient visible light sources will tend to reflect this color into the tracking cameras. These reflections are similar to those caused by the red LED ring lights as their emitted energy strikes the ice surface. As previously mentioned, the reflections from the ring lights are "mapped out" via software during system calibration. This software technique could not be used to "map out" the dynamically changing red light reflections caused by the player's jersey and equipment colors. It should be noted that these systems include red light filters on their cameras effectively restricting noise to a narrow band overlapping the emitted tracking energies, but not fully eliminating the problem.

As previously mentioned, machine vision companies such as Motion Analysis and Vicon do offer their systems using IR light. This non-visible frequency is used when the customer requires that the tracking be done in darkness. The IR tracking energy is not being used to reduce system noise by cutting down on the visible spectrum.

In order to avoid noise created by the existing visible light sources, the present inventors prefer to work in a non-visible tracking energy such as UV or IR and to employ energy-absorptive techniques elsewhere described in the present and co-pending applications.

C.3. Are their any other pre-existing energy sources that may have available by-product energy that could be used for tracking?

Several of the HID lamps used for large area illumination also generate non-visible frequencies such as UV and IR. Typically, the manufacturers of lights encase the inner bulb and filament with an outer bulb that has been filled with a special vapor mixture and coated with a special compound. The combination of the additional glass bulb, the special vapor and the special coating act to absorb the non-visible energies rather than release them into the surrounding environment. The present inventors anticipate modifying these various light sources to specifically emit some additional portion of their generated non-visible energy that is currently being absorbed.

C.4. What is the natural reflectivity of the various background surfaces to the different potential tracking energies?

Within a hockey arena, the hard mirror-like ice surface presents a challenge to both beacon- and machine vision-based tracking. For instance, other playing surfaces such as grass would tend to absorb most of the ambient frequencies including microwave, red light, UV and IR while only reflecting green light. Another reason the present inventors prefer to track the players and equipment using a non-visible energy such as UV or IR is that the background can then be first treated with either non-visible absorbers, reflectors, or both. This helps to create a clear reflective distinction between the markers and the background thereby facilitating image analysis. The present inventors also prefer to place these non-visible absorbers or reflectors onto the foreground objects such as the players and equipment prior to marking them. In this way, the detectable intensity levels of any unwanted reflections off the foreground objects can be controllably differentiated from the marker's reflections.

C.5. What is the size of the tracking area relative to the range of the potential tracking methods?

Some sports have relatively small playing areas and few players, such as tennis, while other sports have very large areas and many players, such as golf. Sports such as ice hockey, football, soccer and baseball have mid-to-large sized areas with many players to track simultaneously. Microwaves such as those used in the beacon-based systems from Trakus and Orad work well in any of these various-sized playing surfaces. Vision-based systems as currently implemented by companies such as Motion Analysis and Vicon are challenged to track areas significantly larger than a tennis court in size.

The major reason for their difficulties is the "volume tracking" approach they have taken to solving this problem. Simply put, each contestant may move about the playing surface which because of his or her own height and the expected flight of any game objects, becomes a playing volume rather than an area. Every portion of this volume must be in view of two or more cameras at all times. The cameras must be fixed prior to the contest so that they may be calibrated as a network. If players will have a tendency to bunch up, additional cameras will be needed within any given volume to create additional views thereby reducing anticipated inclusions. The cameras must be limited in the field of view so that they can maintain a sufficient resolution or pixels per inch within their field in order to detect the reflected markers. As the playing area widens, it becomes increasingly difficult to place cameras close enough to the inner volumes so that the ideal field of view is maintained per camera without causing an obstruction to the players or viewing audience. This obstruction would occur if a mounting structure were created to hang the cameras directly above the inner volumes. Newer cameras will continue to provide higher resolutions theoretically allowing the cameras to move further back from any given volume and still maintain the requisite pixels per inch resolution. As cameras pull back, however, the distance between the energy tracking source, the reflective marker and the cameras will continue to increase thereby having a negative effect on signal strength. The present inventors prefer to separate player (object) tracking into two distinct sub-processes thereby eliminating the aforementioned problems. In distinct contrast to the "volume tracking" approach, the preferred embodiment of the present invention relies upon a "player following" controlled by an "area tracking" technique. In essence, the players are first tracked in two dimensions, X and Y, throughout the playing area. The currently determined location of each player is then used to automatically direct that player's individual set of cameras that "follow" him or her about the playing surface. This two-step approach has many critical advantages when faced with tracking objects throughout a larger volume. First, locating the "top surface" (i.e., helmet) of each player in X-Y space for substantially the entire contest is significantly simpler than trying to detect their entire form from two or more cameras throughout the entire playing volume.

Second, by placing the player id on their "top surface" (i.e., their helmet and if need be shoulder pads), the system is able to easily identify each player while it also tracks their X-Y coordinates. Third, by controllably directing one or more automatic pan, tilt and zoom cameras to follow each player (and game object) the ideal field of view and maximum resolution can be dynamically maintained per player.

C.6. Is the tracking environment physically enclosed within a building or outside?

The indoor enclosure is most prevalent in the sport of ice hockey as opposed to other major sports such as football, soccer and baseball. This particular requirement has a negative effect on beacon-based systems such as Trakus and Orad since the hard surfaces of the enclosed arena will cause the microwave tracking energy to go through many reflections before finally dissipating. For vision systems such as Motion Analysis and Vicon, the lower ceilings that are typically found in local youth hockey arenas present a different type of problem. Due to the "volume tracking" approach just discussed, these systems ideally require the placement of their tracking camera assemblies above the playing surface or at least off to the side and very near the "tracking volume." These assemblies include the camera, lens and filter, the ring lights and power supply as well as a small computer processor for initial data analysis and may typically cost around $15,000. In total distance, each assembly may not be more than twenty to thirty feet off the ice. This makes each assembly prone to damage when a puck is either accidentally or intentionally shot at the camera system. The present inventors prefer an enclosed assembly where the camera, lens and related equipment are protected and yet still able to view the ice surface below through a Plexiglas or similarly transparent covering.

D. Referring next to traditional engineering goals, the preferred and alternate novel embodiments must consider at least the following factors:

D.1. The system should be scalable and therefore comprise uniform assemblies that are combinable into a matrix designed to increase tracking coverage in terms of area, volume or the number of players (objects) while still maintaining uniform performance.

In one respect, beacon-based systems such as Trakus and Orad include a uniform assembly in the form of the player's transmitter that is embedded within their helmet. This design is scalable by the number of players since each additional player is simply given an additional transmitter. In order to be scalable in terms of the subsequent signal processing required to locate each transmitter in X-Y space, however, the system will need to encode select transmitters to select receiving towers. The present inventors do not believe that companies such as Trakus and Orad are currently practicing this technique. This concept requires that a capacity be determined for a single set of receiving towers in terms of the number of transmitters that can be tracked in real time. For example, assume that four receiving towers are initially set up within the arena and that they can only adequately track five transmitters in real time. Once a sixth player is outfitted with a transmitter, the entire system will lose its real time processing capability. It is preferable to equip the initial four towers with a first processor that eliminates any received signal that was not generated by one of the initial five transmitters. In this way the initial five players remain adequately tracked in real time. In order to track an additional five players, an additional four towers and processor should be added to the arena. These towers would then be assigned to specifically process only those transmitters with the unique codes corresponding to the second five players. This approach will make the beacon-based system scalable. Otherwise, the entire system will be "player bound" in that it will have a maximum number of total transmitters that can be tracked irrespective of the playing volume.

Similarly, instead of encoding each signal and digitally filtering all incoming signals for selected codes, each maximum group of transmitters could be assigned a different frequency. The filtering process could then be moved to electronics. Another possibility is to coordinate the timing of the transmitted signals from the various groups of maximum transmitters. In essence, each group of transmitters will be broadcasting their locating signal as specified and non-overlapping intervals coordinated with the receiving towers. The important point is to make the system scalable by defining a minimum configuration of tracking apparatus that can simply be repeated to either increase area, or in the case of the beacon approach, increase players tracked.

For vision-based tracking systems such as Motion Analysis and Vicon, the systems are not uniform in their "camera view per volume." This lack of uniformity works against system scalability and is due to several coincident design factors. First, the camera assemblies are both relatively expensive in their own right and when taken together represent a significant portion of the system price. An attempt is being made to maximize the use of each individual camera's field of view. Second, the field of view of each individual camera is best thought of as a four-sided pyramid where the apex emanates from the CCD array in the back of the camera. In practice, the first several feet of the field of view are not useable for tracking and even so are more than likely outside of the tracking volume for pragmatic clearance considerations. This can be thought of as taking the top off the pyramid. The pixels per marker inch resolution at the nearest versus farthest points in this pyramid can be substantially different and must necessarily be limited by the minimum acceptable resolution to identify a given size marker.

Third, to be scalable, each tracking volume serviced by two or more assemblies should be either square or rectangular in its cross-sectional shape parallel to the ice surface. In this fashion, these volumes could simply be repeated with slight overlaps for calibration purposes in order to create larger and larger tracking volumes. However, this is difficult to accomplish in practice using overlapping, four-sided pyramids. And finally, an individual player with multiple markers attached could transverse any portion of the tracking volume at any rotational angle and it is necessary that each marker remain in the site of two cameras at all times. This requirement calls for a minimum of four cameras surrounding any given volume. In practice six cameras is a more acceptable minimum. As additional players are added to the tracking volume, it is not difficult to see how easy it will be for one player to block the camera's view of another. Keeping in mind the player identification technique practiced by companies such as Motion Analysis and Vicon where the unique "full body" constellation of markers identifies a skater, inclusions take on greater significance.

The task of designing a uniform configuration of acceptable resolution throughout the entire tracking volume while also accounting for the two camera minimum per marker and multiple player bunching is formidable. Furthermore, the end result "wastes" camera field of view since the actual cross-sectional shape formed by the configuration will not be either a square or rectangle nor will it even be uniform in size as it moves from the ice surface up towards the cameras. Hence, if multiple of these "minimum tracking volumes" were to simply be replicated and slightly overlapped, this would result in a considerable loss of valuable tracking region along the edges of the idealized square or rectangular volume. For all of these reasons, companies such as Motion Analysis and Vicon have not approached the larger "tracking volume" as a superset of smaller volumes in what could be called a scalable approach. For all practical purposes, each unique tracking volume shape and size in combination with the expected number of objects (or players) requires a "custom" layout of tracking assemblies. As more and more players continue to be added to the volume, more and more cameras will be added based upon best judgements for placement. This entire arrangement could be best described as "player bound" as well as "quasi-volume bound."

As previously discussed, the present inventors prefer the novel approach of separating the (X, Y) tracking of each player or game object as a whole from the (X, Y, Z) determination of each player's critical locations (e.g., joints and body parts). Furthermore, the novel concept of locating all of the identity markings on the "upper surface" of each player facilitates the top-oriented field of view of the (X, Y) tracking assemblies which naturally limits inclusions due to player bunching. Given this separation of tasks, the present invention becomes highly scalable. Each overhead (X, Y) area tracking assembly covers a fixed and uniform square or rectangular tracking area. Furthermore, the pixel resolution per this area remains substantially constant. To cover more tracking area, simply add additional (X, Y) assemblies. Each player that moves throughout this connected tracking area has their helmets (located at a minimum) and ideally also their shoulders. From this information, the player is identified along with pertinent information including orientation, direction of movement, velocity, and acceleration as well as current relative (X, Y) location. Using the current (X, Y) location as well as the direction of movement, velocity and acceleration, the preferred embodiment controllably directs one or more (X, Y, Z) pan, tilt and zoom cameras to automatically follow the given player. Furthermore, by intelligent inspection of the various projected player paths, the system optionally switches (X, Y, Z) cameras from one player to another to best maximize overall tracking performance. By constantly zooming each (X, Y, Z) camera to maximize player size per field of view, a uniform and ideal pixel resolution per marker square inch is maintained. To cover more players, simply add additional (X, Y, Z) pan, tilt and zoom camera sets per added player.

D.2. The system should be minimally intrusive upon the objects to be tracked and upon the surrounding environment especially if that environment is a live setting.

As was previously discussed, beacon-based systems such as Trackus and Orad are environmentally transparent in terms of their microwave tracking energy but are intrusive in terms of their beacon technology. While these beacons are small and can conceivably be reduced further in size, they will still always be practically limited to locations where they can be embedded for both the safety and comfort of the player as well as the protection of the device itself.

As was also discussed, vision-based systems such as Motion Analysis and Vicon are intrusive in three key areas. First, their tracking energies are in the visible spectrum such as red light that is visible to players and fans alike. Second, their markers have substantial size and are both noticeable and prone to accidents in a full contact sport such as ice hockey. And third, these same markers are covered with retroreflective tape that is broad spectrum reflective including visible light. As such, existing rink illumination and portable lighting such as camera flash bulbs will tend to create unwanted and distracting reflections into the players' and fans' views.

And finally, the preferred embodiment of the present invention overcomes each of these intrusions of the surrounding environment through its novel teachings as follows. First, the preferred tracking energy is in the non-visible frequencies such as UVA or near IR. Second, the large spherical markers have been replaced with an "invisible" ink or paint that can be adhered to the many necessary substrates while adding minimal thickness. And finally, this ink or paint, whether it be reflective, fluorescent or retroreflective in nature, is made "invisible" by its characteristic of only reflecting or emitting in the desired non-visible frequencies.

D.3. The tracking signal-to-noise ratio should be maximized.

The microwave-based beacon systems such as Trakus and Orad will have minimal noise due to ambient electromagnetic energies. However, due in part to the enclosed nature of a hockey arena and more importantly to the hard surfaces within the arena such as the ice surface itself, each signal transmitted from a player's helmet will bounce off these surfaces creating significant signal noise problems.

The vision-based systems such as Motion Analysis and Vicon attempt to limit system noise by using a narrow band of tracking energy such as red light with a corresponding camera filter. Unfortunately, by working within the visible spectrum in their preferred approach, they are susceptible to noise created by existing rink lighting, additional portable lighting and the reflections these sources will cause off player jerseys and equipment. And finally, even if they work in the non-visible IR region, both this IR energy and red light will reflect off the ice surface creating false marker reflections that must be "mapped out" via software techniques creating "dead spots" within the tracking images. The present invention is the only system to employ a combination of tracking energy absorbent and reflective compounds in order to "control" the tracking frequency noise. By using absorbers, unwanted reflections are significantly reduced or eliminated all together. By using reflective compounds, unwanted reflection can be increased to a designated intensity region that is detectably different from the marker signal intensity. These absorbent and reflective compounds can be applied to all of the background and foreground substrates. By first addressing the noise issues, the foreground objects are preferably set at a minimal or zero reflection state while the background including the ice surface, the boards and the glass is preferably set at a narrow intensity range detectably different from the marker intensity.

D.4. Manufacturing and installation costs should be minimized and the resultant system should be simple for the user to maintain and operate.

To the extent that the present invention has been shown to be scalable, its manufacturing and installation parameters are more easily calculated and maximized thereby leading to reduced costs. Furthermore, because of its uniform scalable design, the present invention will minimize any requirements for operator intervention to resolve inclusions, lost player identity, or similar confusion due in general to signal-to-noise problems.

To the extent that the existing beacon- and machine vision-based systems are not scalable, their manufacturing and installation parameters are not as easily calculated and maximized thereby leading to increased costs. Furthermore, because these systems are not uniformly scalable in combination with the larger tracking volume and number of tracking markers associated with 3D multi-player movement, they are susceptible to errors from inclusion and poor signal-to-noise ratios creating a need for operator involvement.

OBJECTS AND ADVANTAGES

Accordingly, the objects and advantages of the present invention are to:

1—teach the fundamental component groups necessary for a multi-object real-time 3D object tracking system;
2—identify those individual components already in use within currently available systems and to which component groups they belong;
3—teach those novel components suggested by the present inventors in this and their other four co-pending applications and to which component groups they belong;
4—teach how the present inventors' novel components allow currently available systems to better function in a live application with multiple colliding objects, for instance a sporting event such as ice hockey;
5—identify the composition of currently available multi-object real-time 3D object-tracking systems in terms of actual components used from each group;
6—teach a novel preferred embodiment for a multi-object real-time 3D object-tracking system best suited for a live sporting event such as ice hockey in terms of actual components used from each group;
7—teach several novel alternative embodiments using one or more components of currently available systems mixed into the preferred embodiment; and
8—teach several novel variations using one or more of the present inventors' novel components mixed into the currently available systems.

Further objects and advantages are to provide:

1—a system that is scalable and therefore comprises uniform assemblies that are combinable into a matrix designed to increase tracking coverage in terms of area, volume and the number of objects while still maintaining uniform performance;
2—a system that is minimally intrusive upon the objects to be tracked and upon the surrounding environment especially if that environment is a live setting;
3—a maximized tracking signal to noise ratio; and
4—a system with maximized manufacturing and installation costs that is simple for the user to maintain and operate.

Still further objects and advantages of the present invention will become apparent from a consideration of the drawings and ensuing description.

DESCRIPTION OF THE DRAWINGS

FIGS. 13a and 13b depict the theory and implementation of fixed (X, Y, Z) volume tracking camera assemblies.

FIG. 20a depicts a spherical retroreflective marker and its circular reflection while FIG. 20b depicts a hockey player with attached spherical markers.

FIG. 22a depicts a hockey player set up with spherical markers while FIG. 22b shows the resultant circular reflections that will be seen with an appropriate vision system.

FIG. 22c depicts a hockey player set up with flat markers while FIG. 22d shows the resultant multi-shape reflections that will be seen with an appropriate vision system.

FIG. 26a depicts the pre-tracking calibration method most typically used with current fixed (X, Y, Z) volume tracking camera-based systems.

DETAILED DESCRIPTION

Figure 1:
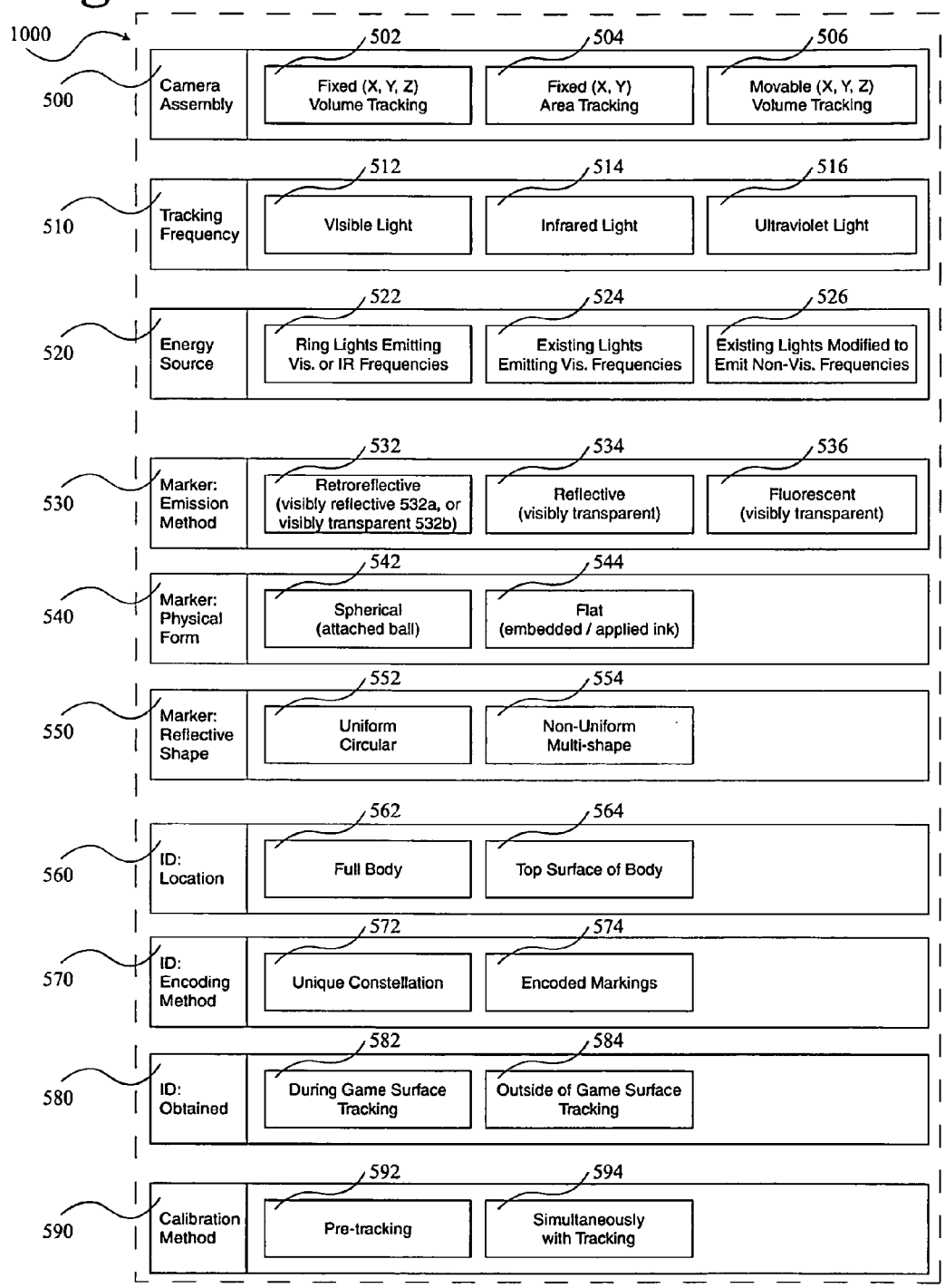
FIG. 1 is a block diagram depicting all of the major components necessary for the various multi-object tracking machine-vision systems according to the present invention. These components are broken into ten groups including Camera Assembly, Tracking Frequency, Energy Source, Marker: Emission Method, Marker: Physical Form, Marker: Reflective Shape, ID: Location, ID: Encoding Method, ID: Obtained, and Calibration Method.

Referring first to FIG. 1, there is shown a block diagram depicting all of the major components 1000 anticipated to be necessary for the various multi-object tracking machine vision systems according to the present invention. These components are broken into ten groups including Camera Assembly 500, Tracking Frequency 510, Energy Source 520, Marker: Emission Method 530, Marker: Physical Form 540, Marker: Reflective Shape 550, ID: Location 560, ID: Encoding Method 570, ID: Obtained 580 and Calibration Method 590. Camera Assembly 500 can be one or more of Fixed (X, Y, Z) Volume Tracking assemblies 502, Fixed (X, Y) Area Tracking assemblies 504 and Movable (X, Y, Z) Volume Tracking assemblies 506. Tracking Frequency 510 can be one or more of Visible Light 512, Infrared Light 514 or Ultraviolet Light 516. Energy Source 520 can be one or more of Ring Lights Emitting Visible or IR Frequencies 522, Existing Lights Emitting Visible Frequencies 524 and Existing Lights Modified to Emit Non-Visible Frequencies 526.

Within all major components 1000, there are three characteristics of markers that are categorized as follows. The possible Marker: Emission Method 530 is retroreflective 532, reflective 534 or fluorescent 536. The possible Marker: Physical Form 540 is spherical (attached ball) 542 or flat (embedded/applied ink) 544. And finally, the Marker: Reflective Shape 550 corresponding to the Marker: Physical Form 540 is uniform circular 552 or non-uniform multi-shape 554, respectively.

Within components 1000, there are three characteristics of ID (identification markers) categorized as follows. The possible ID: Location 560 is on the full body 562 or top surface of body 564. The possible ID: Encoding Method 570 corresponding to the ID: Location 560 is a unique constellation 572 or encoded markings 574. And finally, the possible ID: Obtained 580 is during game surface tracking 582 or outside of game surface tracking 584. The last group of components 1000 is the Calibration Method 590 that can be either pre-tracking 592 or simultaneously with tracking 594.

Referring now to FIG. 13a, there is shown an example of a fixed (X, Y, Z) volume tracking camera 502 that comprises a camera 126, filter and connection to a local computer system for video processing and analysis 160. Camera 126 can be one of any analog or digital-imaging cameras as typically used for industrial vision applications. One example is the Eagle digital camera used by Motion Analysis Corporation that features a ceramic metal oxide semiconductor (CMOS) image sensor with 1280×1024 pixel resolution and a maximum capture rate of 600 million pixels per second. It is important to note that, once in place, this volume tracking camera 126 has a fixed field-of-view (FOV) similar to a four-sided pyramid in shape within an image cone 121v. The actual pixel resolution per inch of the FOV will vary throughout the height 121h of the pyramid ranging from a higher value at the top width 121tw to a lower value at the bottom width 121bw. These cameras are typically secured from an overhead position to have a perspective view arrangement 502m of the desired tracking volume as shown in FIG. 13b.

Figure 14A:
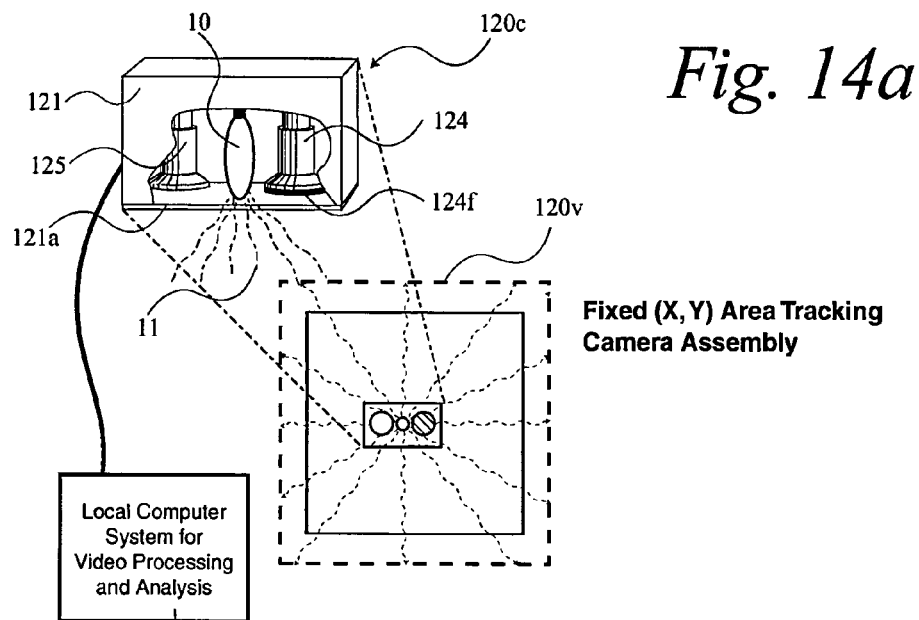
FIGS. 14a and 14b depict the theory and implementation of fixed (X, Y) area tracking camera assemblies.

Referring now to FIG. 13b, there is shown one particular arrangement of fixed (X, Y, Z) cameras 502 that, when taken together, form a uniquely shaped tracking volume through which a player 17, wearing markers such as spherical markers 17sm, may transverse. The resultant resolution per cross-sectional area of this volume 121tv is non-uniform. For example, while skating through any given point in the tracking volume, markers 17sm on one body part of player 17 may be viewed by camera 126e with a much lower resolution per inch than similar markers on a different body part. Also, the second camera such as 126d may have a much different pixel resolution of marker 17sm than camera 126e. Cameras 126a, 126b and 126c may each have obstructed views of marker 17sm. Referring now to FIG. 14a, there is shown an example of fixed (X, Y) area tracking camera 504, that comprises a tracking camera 124 with a filter 124f that have been enclosed in a protective housing 121 with a transparent underside 121a. Also enclosed in housing 121 is an energy source 10 emitting tracking energy 11 as well as unfiltered filming camera 125. Tracking camera 124 and filming camera 125 are connected to a local computer system for video processing and analysis 160. The entire assembly included within housing 121 is preferably secured in an overhead position looking directly down at a subset of the tracking surface. From this overhead position, camera 124 has a fixed FOV 120v that is focused on the top surface of any players below and as such maintains a substantially uniform pixel resolution per tracking area FOV 120v.

Figure 14B:
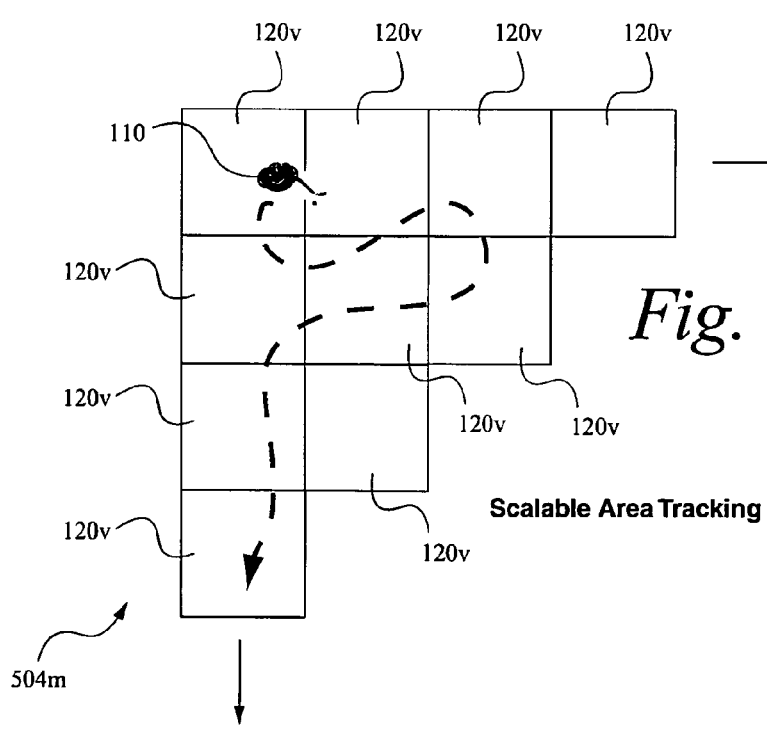

Referring now to FIG. 14b, there is shown a scalable area tracking matrix 504m comprising multiple fixed (X, Y) area tracking cameras 120c aligned such that their FOVs 120v are substantially side-by-side with a small overlap for calibration purposes. Throughout this scalable matrix 504m, the top surface 110 of player 17 can be readily tracked.

Figure 15A:
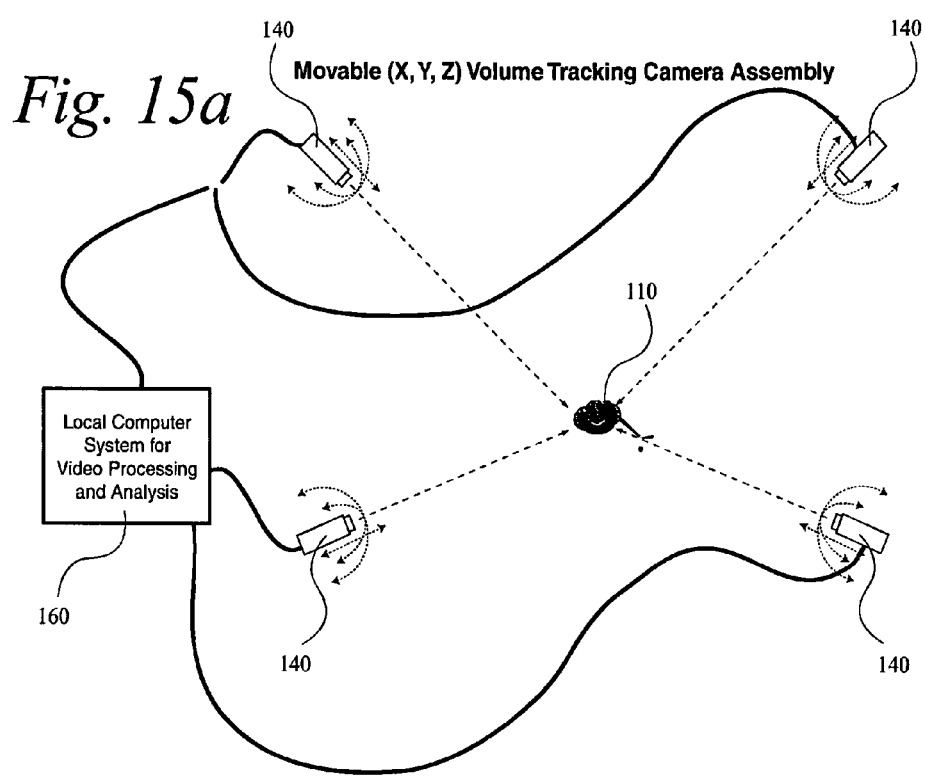
FIGS. 15a and 15b depict the theory and implementation of movable (X, Y, Z) volume tracking camera assemblies.

Referring now to FIG. 15a, there is shown an example of movable (X, Y, Z) volume tracking camera 506, that comprises a pan, tilt and zoom camera 140 with a filter that is connected to local computer system for video processing and analysis 160. Top surface 110 of player 17 is held in constant view by one or more of cameras 140 that are controllably panned, tilted and zoomed for maximum desirable pixel resolution per player. The information for this controlled movement is based either upon the current (X, Y) coordinates of player 17 as previously determined from information gather by scalable area tracking matrix 504m or by movement tracking algorithms calculated by computer 160 to predict the next possible location of player 17.

Figure 15B:
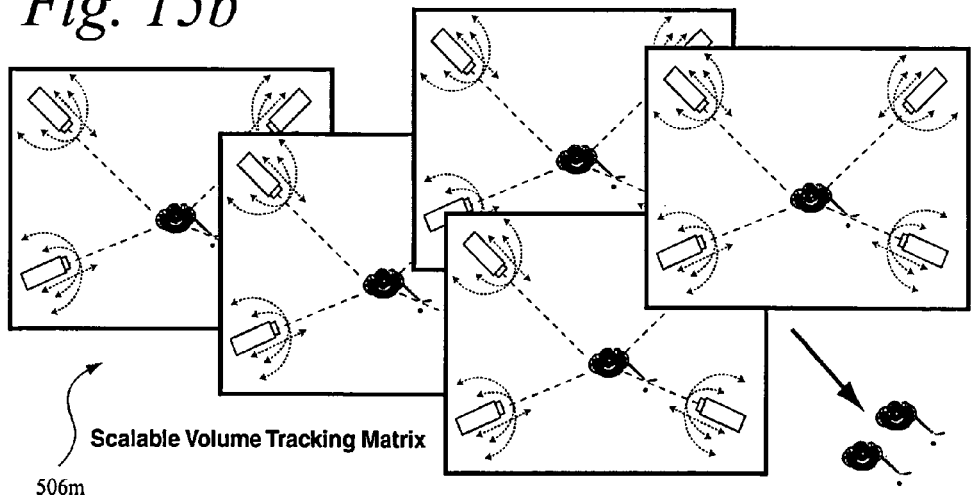

Referring now to FIG. 15b, there is shown a scalable volume tracking matrix 506m comprising multiple movable volume tracking cameras 506 where one or more cameras form an assembly and are dynamically assigned to a player 17. As will be explained in more detail using FIGS. 16a and 16b, this dynamic process of automatically panning, tilting and zooming each movable camera to maintain the maximum desirable pixel resolution per player provides a substantial benefit over the arrangement of fixed volume tracking cameras 502.

Figure 16A:
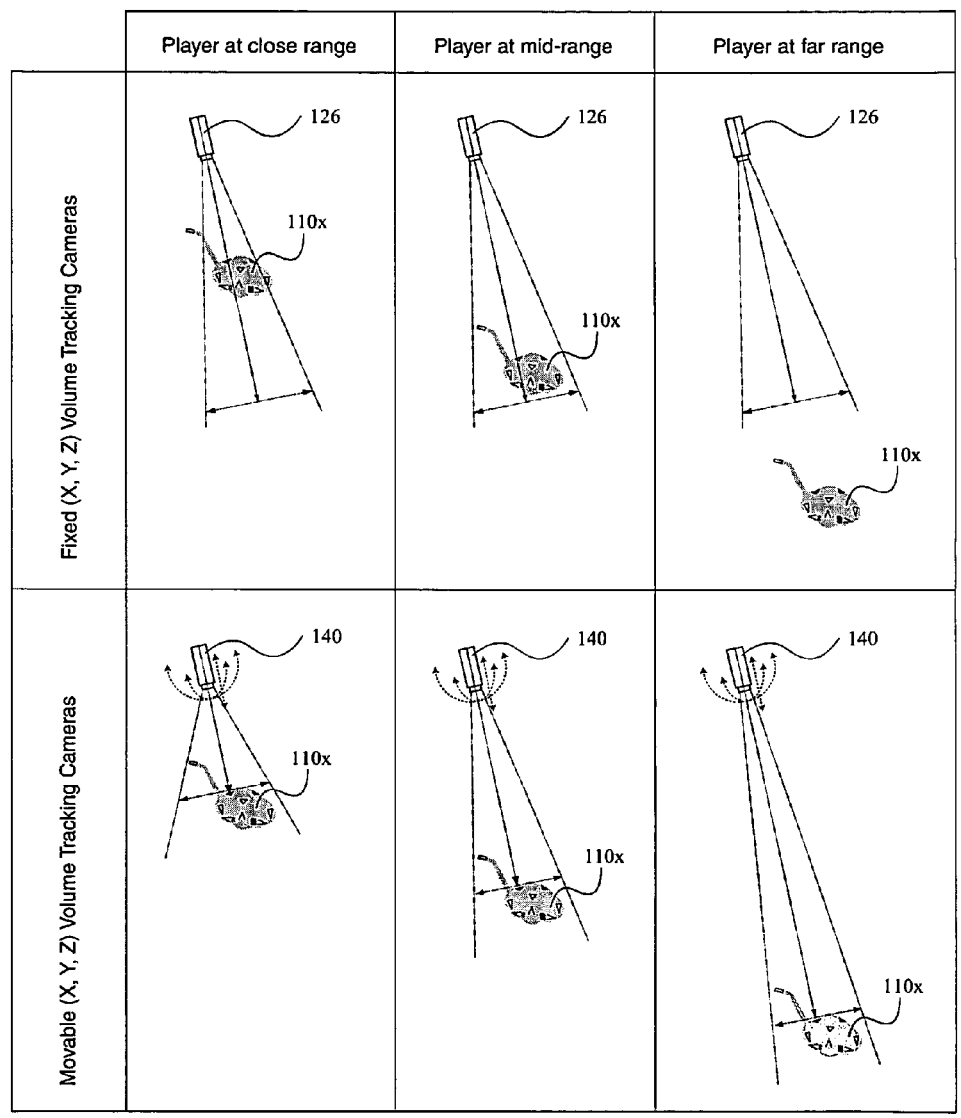
FIG. 16a depicts the relationship between constant versus dynamic field-of-view and its impact on the pixel resolution per player (object) tracked.

Referring now to FIG. 16a, there is shown a series of three views depicting the top surface 110x of player 17 (i.e., player 17 with absorbers and markings applied) at close range, mid-range and far range with respect to a fixed volume tracking camera 126. As can be seen, the pixel resolution per the player's body surface area is substantially different between close and far ranges. However, FIG. 16a also shows a series of three views the same player 17 and relative locations but now with respect to movable volume tracking camera 140. As can be seen, the pixel resolution per the player's body surface area is now substantially uniform.

Figure 16B:
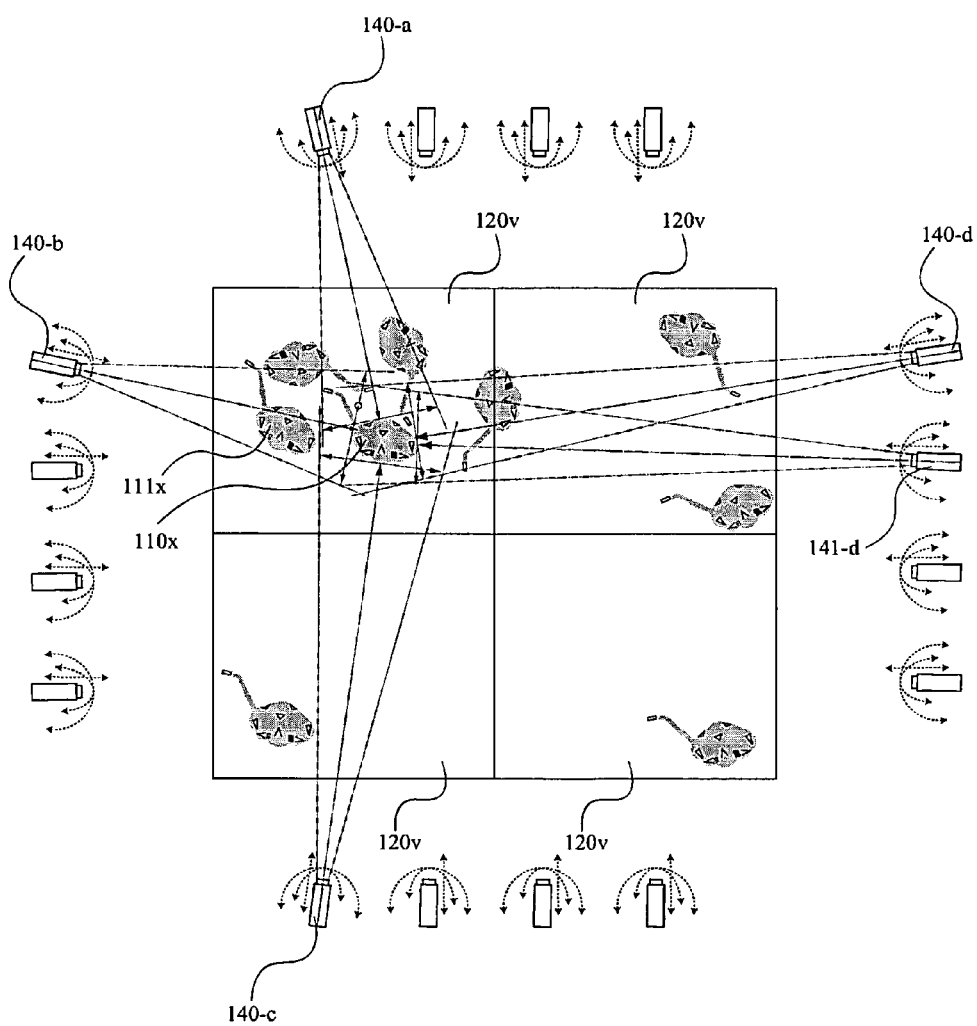
FIG. 16b depicts how player bunching and therefore marker inclusion is addressed by the use of movable (X, Y, Z) volume tracking camera assemblies.

Referring now to FIG. 16b, there is shown an example matrix of four FOV's 120v created by area tracking cameras 124. Within this combined grid, several players having top surfaces such as 110x and 111x move freely about. In this particular example, four movable cameras 140-a, 140-b, 140-c and 140-d are tracking the player with top surface 110x. As depicted, the FOVs for cameras 140-b and 140-d are almost fully blocked by other players whereas the FOV for camera 140-a is partially blocked but the FOV for camera 104-c is clear. The preferred embodiment will automatically reassign cameras such as 141-d that may already be tracking another player, (e.g., the player with top surface 111x) to now follow a different player with top surface 110x so as to ensure total maximum player visibility. This reassignment decision can be based upon the information gathered by the scalable area tracking matrix 504m, predictive calculations made by computer 160 concerning the expected next positions of any and all players, or both.

Figure 17:
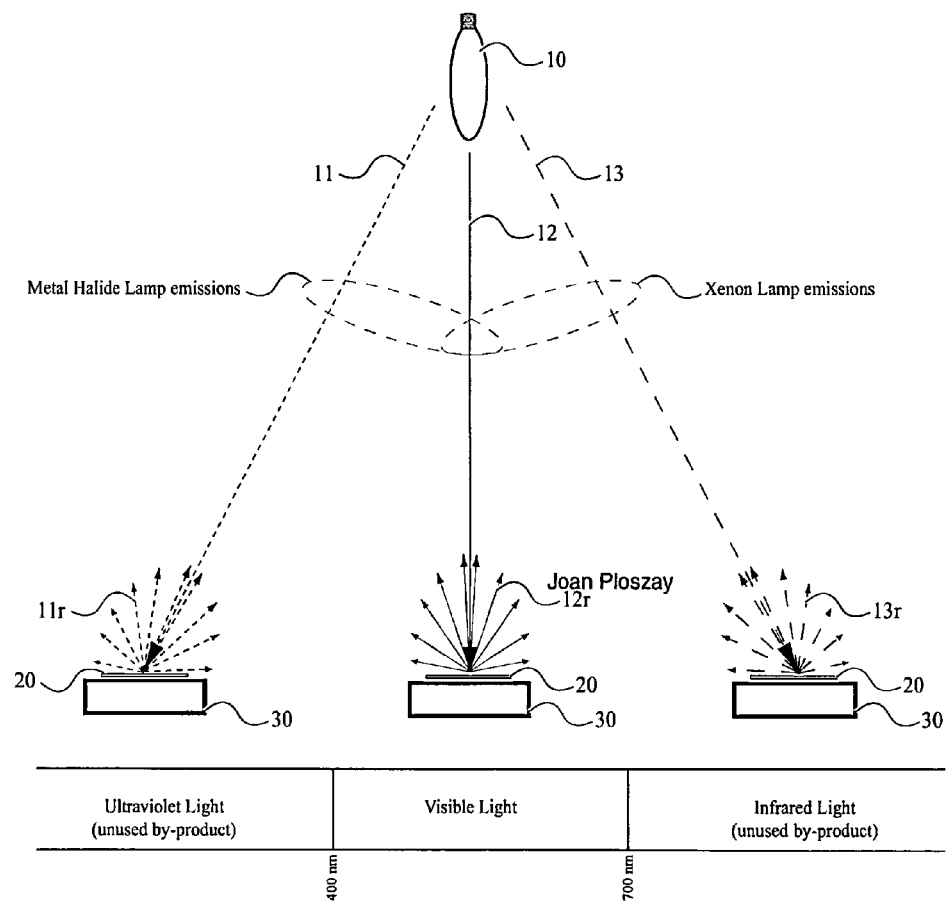
FIG. 17 is a side view drawing of a typical high intensity discharge (HID) lamp of the type often used to illuminated large open spaces such as a sporting arena or facility, further depicting the spread of emitted electromagnetic frequencies ranging from UV through visible light into IR.

Referring now to FIG. 17, there is shown an example of three different Tracking Frequencies 510 being emitted by normal or modified HID lamp 10. These include UV ray 11, visible ray 12 and IR ray 13. As these rays 11, 12 and 13 strike reflective material 20 attached to substrate 30, they will cause reflected UV ray 11r, visible ray 12r and IR ray 13r.

Figure 18A:
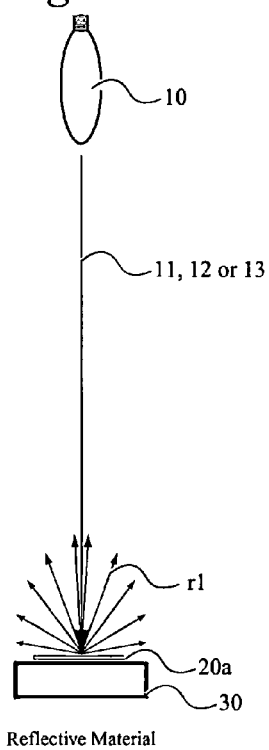
FIG. 18a is a side view of the same HID lamp showing its emitted energy being dispersed in multiple directions as it strikes a typical reflective material.
Figure 18B:
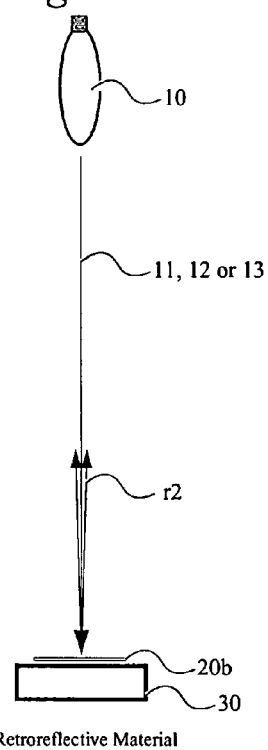
FIG. 18b is a side view of the same HID lamp showing its emitted energy being redirected back towards the lamp as it strikes a typical retroreflective material.
Figure 18C:
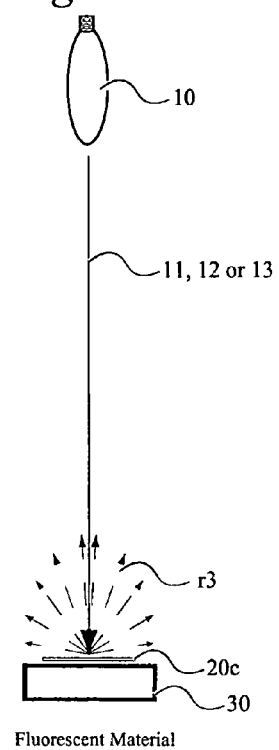
FIG. 18c is a side view of the same HID lamp showing its emitted energy being fluoresced and then dispersed in multiple directions back towards the lamp as it strikes a typical fluorescent material.

Referring now to FIGS. 18a, 18b and 18c, there is shown an example of three different Marker: Emission Methods 530 caused by reflective material 20a, retroreflective material 20b and fluorescent material 20c. In FIG. 18a, lamp 10 emits rays 11, 12 and 13 which are then reflected off reflective material 20a in a diffuse manner causing rays r1. In FIG. 18b, emitted rays 11, 12 and 13 are retroreflected off retroreflective material 20b in a manner causing rays r2. In FIG. 18c, emitted rays 11, 12 and 13 are first absorbed by fluorescent material 20c causing emitted rays r3. Reflective material 20a and fluorescent material 20c have an advantage over retroreflective material 20b in that their reflected and fluoresced rays r1 and r3, respectively, will have a wider viewing angle than retroreflected rays r2. Retroreflective material 20b has an advantage over materials 20a and 20c because its rays r2 will be of stronger combined energy for a longer distance. Fluorescent material 20c has an advantage over materials 20a and 20b because it can absorb visible light readily available in larger intensities within the ambient environment and convert this to a non-visible tacking energy such as IR.

Figure 19:
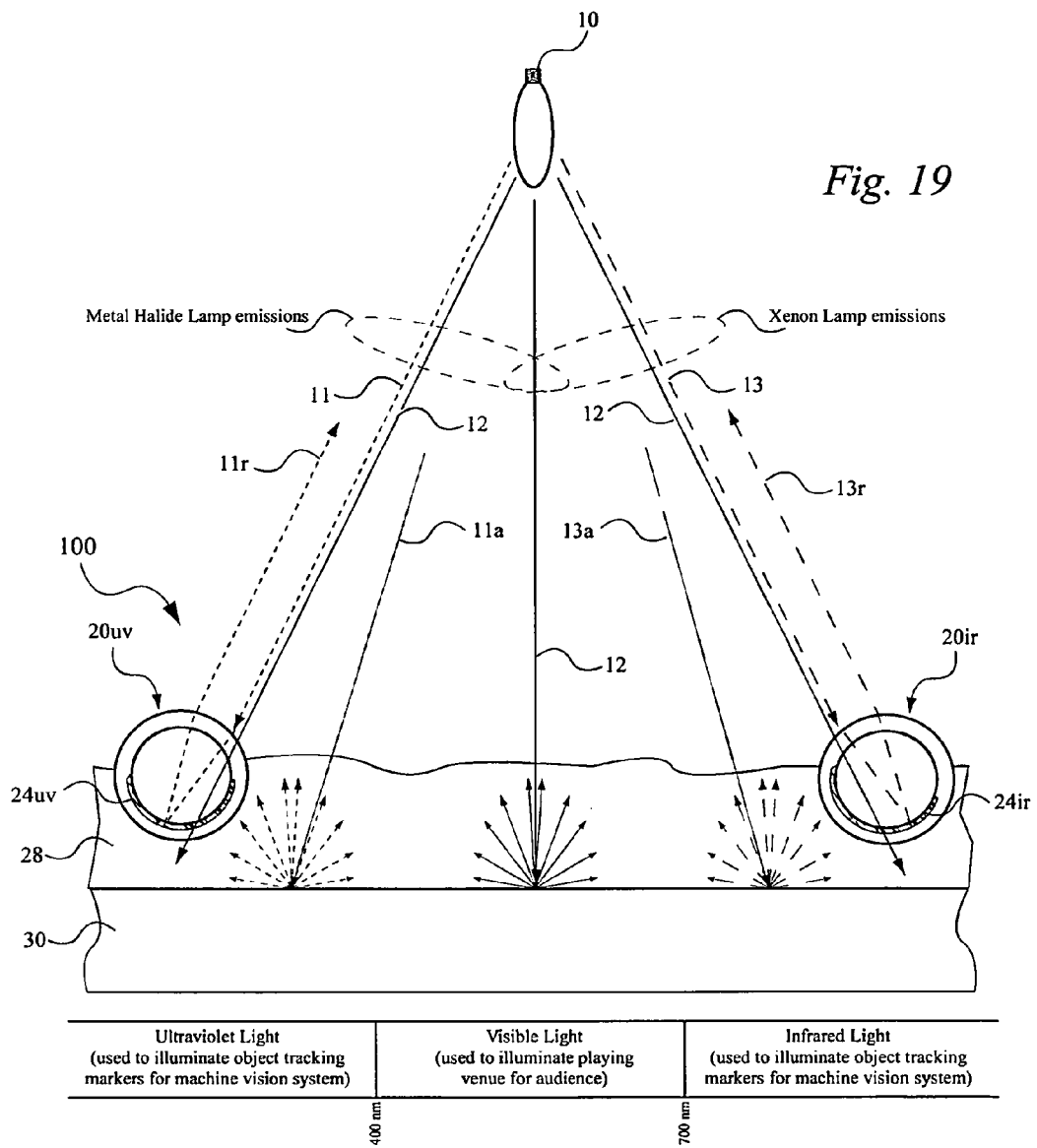
FIG. 19 is a side view of a typical HID lamp, further depicting the spread of emitted electromagnetic frequencies ranging from UV, through visible light into IR. Also shown are three variably oriented retroreflective elements partially embedded in a single binder that has been joined to a substrate. The elements and binder have been depicted as transmissive to visible light while the substrate is reflective. In response to the non-visible frequencies of either UV or IR, at least some of the elements are retroreflective while the substrate remains reflective.

Referring now to FIG. 19, there is shown a novel retroreflective material 100 that is similar to commercially available cube-cornered or microbead retroreflectors except that it has been modified to be transparent to any energies that are not intended to be retroreflected. In the case where the tracking frequency 510 is chosen to be UV light 516, HID lamp 10 is shown to emit UV ray 11 that enters retroreflective element 20uv that is coated with UV reflector 24uv. Reflector 24uv then reflects ray 11 back up through element 20uv becoming retroreflected ray 11r. Visible ray 12 and IR ray 13 will pass through reflector 24uv. In the case where the tracking frequency 510 is chosen to be IR light 514, HID lamp 10 is shown to emit IR ray 13 that enters retroreflective element 20ir that is coated with IR reflector 24ir. IR Reflector 24ir then reflects ray 13 back up through element 20ir becoming retroreflected ray 13r. Visible ray 12 and UV ray 11 will pass through IR reflector 241r. Retroreflective elements 20uv and 201r are embedded within binder 28 that is attached to substrate 30. Binder 28 is substantially transparent to UV ray 11a and IR ray 13a.

Figures 20A, 20B:
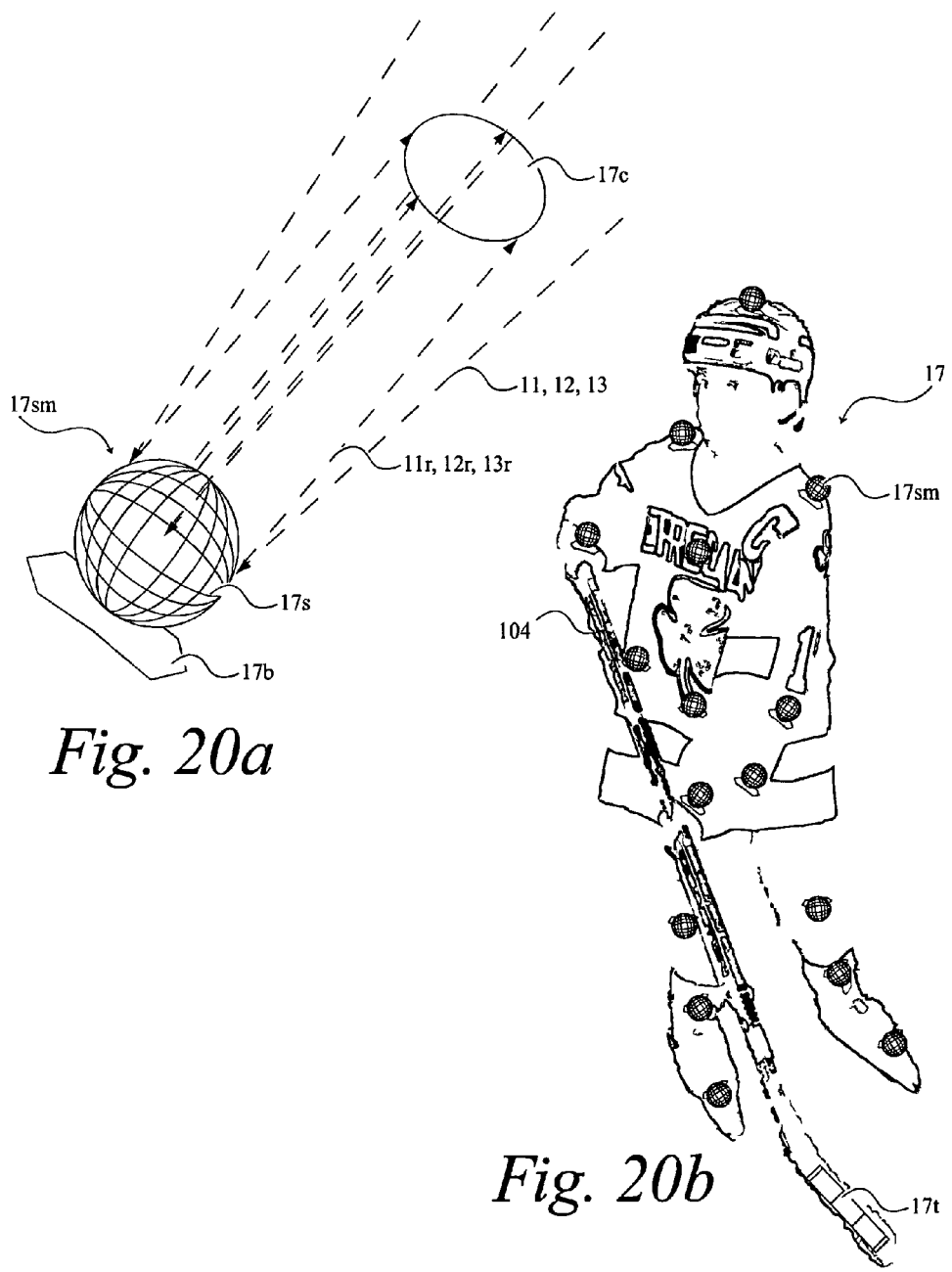

Referring now to FIG. 20a, there is shown an example of the first of the two Marker: Physical Forms 540, namely spherical (attached ball) 542, also referred to as 17sm. Spherical marker 17sm comprises a retroreflective sphere 17s that is attached to a base 17b. Companies such as Motion Analysis and Vicon currently use this type of marker. The typical retroreflective sphere 17s retroreflects a broad spectrum of frequencies including UV ray 11, visible ray 12 and IR ray 13 causing retroreflective rays 11a, 12a and 13a respectively. These retroreflective rays 11a, 12a and 13a then create resulting circular image 17c that is incident upon any tracking cameras such as 124, 126 and 140. Image 17c is an example of one of the two Marker: Reflective Shapes 550 for a marker, namely uniform circular 552.

Referring now to FIG. 20b there is shown an example of the first of two ID:Locations 562 for the player ID, namely full body 562. In FIG. 20b, spherical markers 17sm are placed at various key locations over the entire body of player 17. For practical purposes retroreflective tape 17t is used to cover the blade of stick 104.

Figure 21A:
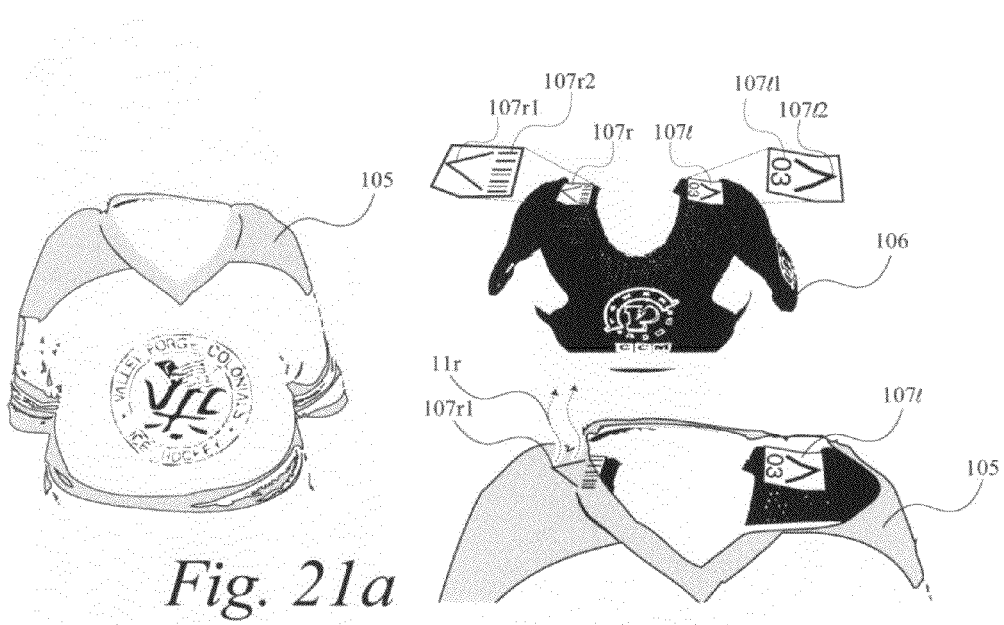
FIG. 21a is a set of three perspective drawings depicting a typical player's jersey, typical player's pads with tracking patches in place, and then a combination of the jersey over the pads with patches.
Figure 21B:
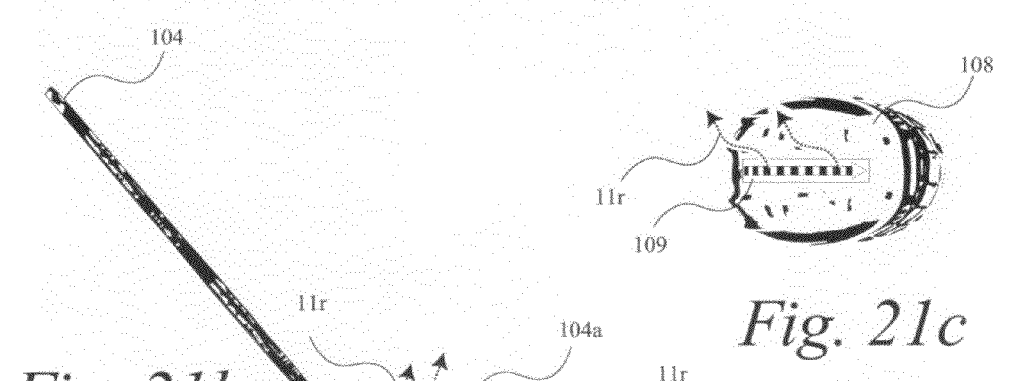
FIG. 21b is a set of two perspective drawings depicting a hockey puck as well as a typical player's hockey stick, where each has been augmented to include tracking ink on at least some portion of its outer surfaces.
Figure 21C:
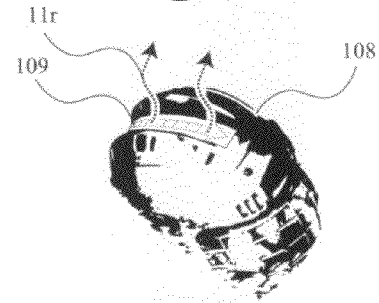
FIG. 21c is a set of two perspective drawings depicting a typical hockey player's helmet which has been augmented to include tracking stickers on at least some top portion of its outer surface.

Referring now to FIGS. 21a, 21b and 21c, shown are several examples of the second of two Marker: Physical Forms 540, namely flat (embedded/applied ink) 544. In FIG. 21a, right and left tracking patches 107r and 107l are shown attached to player shoulder pads 106 that are typically covered by jersey 105. Patches 107r and 107l have been pre-marked with special ink formulated to reflect, retroreflect, or fluoresce only the desired tracking energy. Such pre-markings include orientation marks 107r1 and 107l1 as well as bar code marks 107r2 and 107l2. In FIG. 21b, puck 103 has been coated with similar special ink 103a while the blade of stick 104 has been wrapped with reflective tape 104a. And finally, in FIG. 21c, sticker 109 has been applied to helmet 108 and comprises a uniquely identifying mark created with similar special ink. Each of FIGS. 21a, 21b and 21c illustrate retroreflected ray 11r.

Referring now to FIG. 22a, the information depicted in FIG. 20b is repeated to dramatize FIG. 22b that depicts the image formed in computer 160 based upon uniform circular 552 reflections. This distinct formation of marker reflections 17c can be used to identify player 17 and is the first of two ID:Encoding Methods 570 called unique constellation 572. Companies such as Motion Analysis and Vicon use the unique constellation 572 method for identifying human objects such as player 17. Furthermore, these same systems are designed to identify the human object while they are also tracking their motion. This is the first way the player ID is Obtained 580, namely during game surface tracking 582. Referring now to FIG. 22c, there is shown information similar to FIGS. 21a, 21b and 21c to dramatize FIG. 22d that depicts the image formed in computer 160 based upon non-uniform multi-shape 554 reflections. This collection of individual markings 17m that have been placed at various locations on player 17 are only used to locate a particular body part and its orientation rather than to identify the player 17. In the preferred embodiment that employs these types of flat 544 markings, the identification of player 17 is based upon a top surface of the body 564 Id Location 560.

Figure 23A:
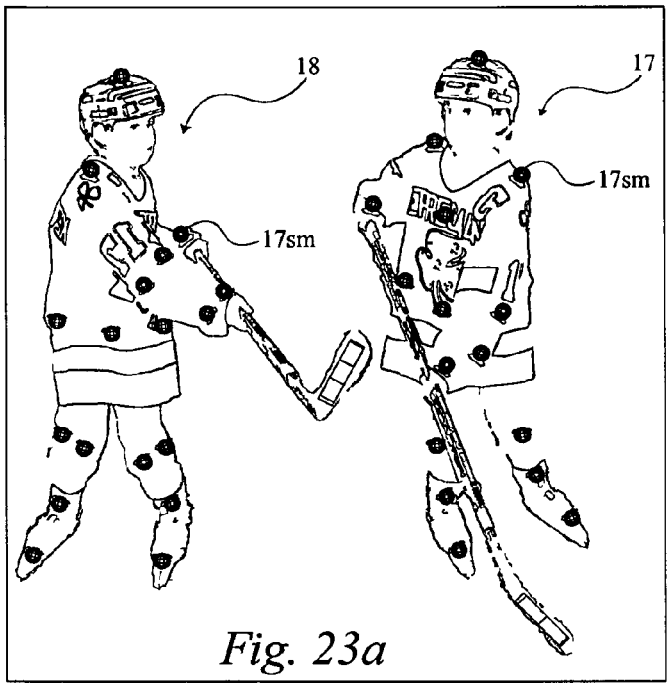
FIG. 23a depicts two different hockey players set up with spherical markers. In the depicted view, the players are not overlapping.
Figure 23C:
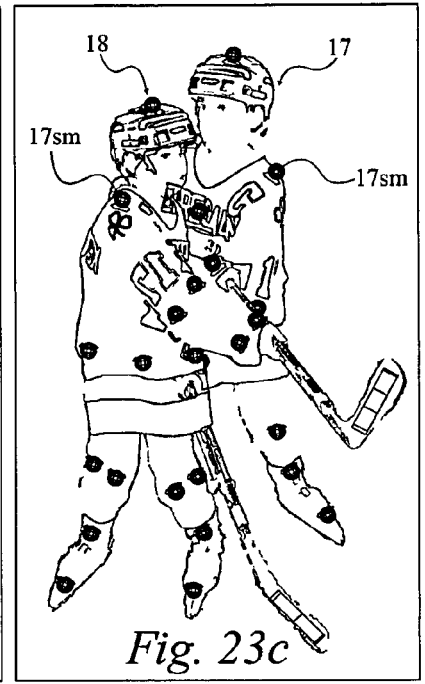
FIG. 23c depicts the same two different hockey players that were shown in FIG. 23a except that they are now overlapping.
Figure 23B:
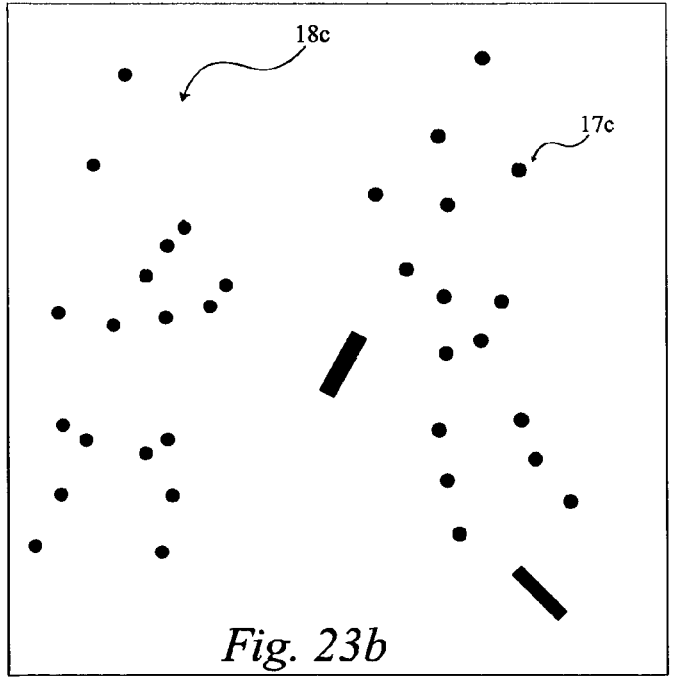
FIG. 23b shows the resultant circular reflections that will be detected by appropriate frame analysis.
Figure 23D:
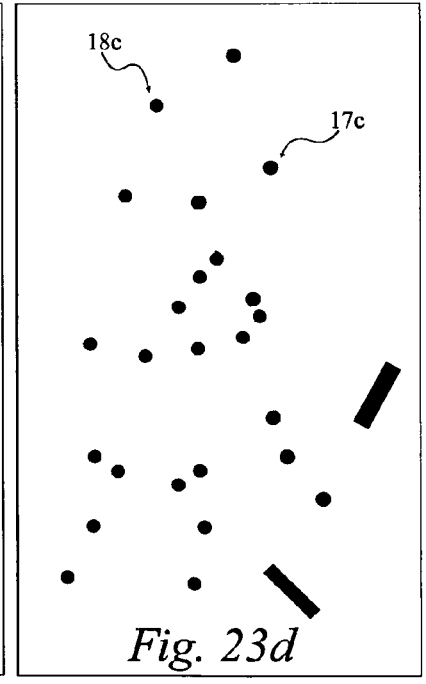
FIG. 23d shows the resultant circular reflections that will be detected in this case.

Referring now to FIGS. 23a, 23b, 23c and 23d there is dramatized the problems inherent with full body 562 unique constellation 572 player identification. In FIG. 23a, there is shown two players 17 and 18 that are each pre-marked with a unique constellation of spherical markers 17sm. The view of players 17 and 18 is not overlapping in FIG. 23a. The resultant image detected by computer 160, namely of circular reflections 17c and 18c, is shown in FIG. 23b. Reflections 17c and 18c are also not overlapping. Referring now to FIG. 23c, players 17 and 18 are now overlapping causing the resultant overlapping of reflections 17c and 18c as shown in FIG. 23d. Note the considerably more difficult identification problem presented to computer 160 as players such as 17 and 18 begin to block each other's view in one or more volume tracking cameras such as 126 or 140.

Figure 24:
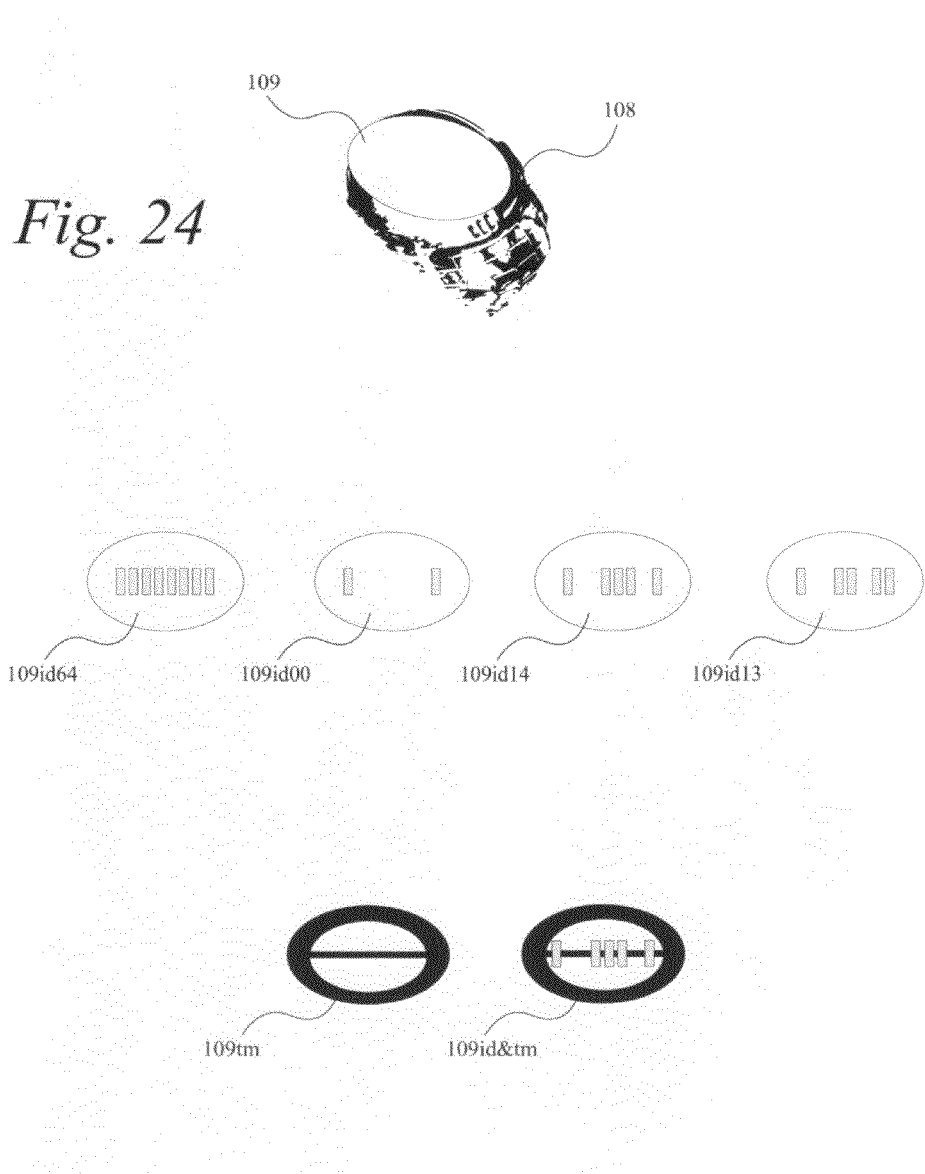
FIG. 24 depicts the combination of encoded ID marks as well as track marks that are preferably placed upon a helmet sticker. Also shown by comparison is the difference between the "top surface" helmet ID approach versus the full body "constellation" ID approach.

Referring now to FIG. 24, there is shown a set of preferred helmet stickers 109id64, 109id00, 109id14 and 109id13 implementing the uniquely encoded markings 574 method of ID:Encoding Method 570. The markings on stickers 109id64, 109id00, 109id14 and 109id13 are created using the special ink formulated to reflect, retroreflect or fluoresce preferably only the chosen Tracking Frequency 510. The player id is preferably implemented as a traditional bar code and could be embedded on the helmet stickers 109id64, 109id00, 109id14 and 109id13 in a non-visible IR or UV reflective, retroreflective or fluorescent ink. Also depicted is helmet sticker 109tm that includes a special tracking mark designed to help computer 160 both locate helmet 108 as well as determine its orientation. This special tracking mark may be created using either a non-visible IR or UV reflective, retroreflective or fluorescent ink. Sticker 109id&tm combines both the id marks as well as the tracking marks, and can either be created using the same non-visible frequency, such as both IR or both UV, or different frequencies, such as one IR and the other UV. Note the considerably simpler identification problem presented to computer 160 as it analyzes helmet stickers such as 109id&tm viewed by area tracking cameras 124. Cameras such as 124 are looking down upon the top surface of the bodies of players such as 17 and 18 and are therefore not expected to experience information degradation due to player overlapping. Stickers 109id64, 109id00, 109id14 and 109*id*13, 109*tm* and 109*id&tm* are represented generically as sticker 109 that is shown attached to helmet 108.

Figure 25:
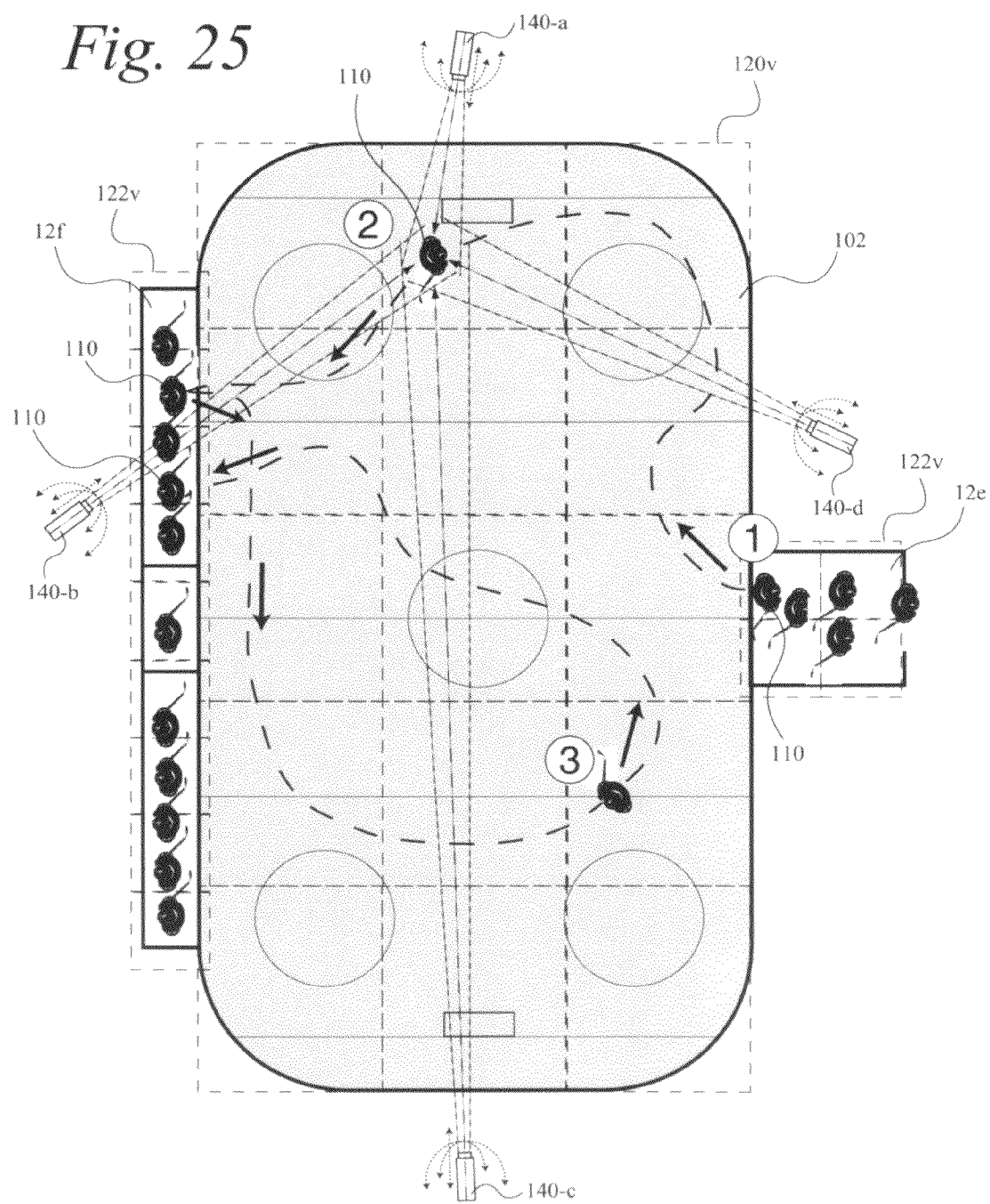
FIG. 25 depicts the separation of player identification and tracking on the non-playing surfaces of the entrance and exit passageway and the team benches versus player tracking only (and not identification) on the playing surface.

Referring now to FIG. 25, there is shown the second way in which the player ID is Obtained 580, namely outside of game surface tracking 584. Rink entrance and exit 12*e* as team bench 12*f* are in constant view of one or more area ID & tracking cameras similar to 124 except with a narrowed FOV 122*v*. Narrowing FOV 122*v* provides an increased pixel resolution per inch when looking down upon the players' helmets 108 and attached stickers such as 109*tm&id*. The increased pixel resolution allows for more complex encoding, i.e. patterns with smaller markings on the limited space of the helmet sticker 109. The rink playing surface 102 is in constant view of the scalable area tracking matrix 504*m* comprising multiple cameras 124 with normal FOV's 120*v*.

Also shown are a single set of four movable volume tracking cameras 140-*a*, 140-*b*, 140-*c* and 140-*d* that are for example currently assigned to track the top surface 110 of a player starting when he first enters the playing surface 102 from the entranceway 12*e*. Tracking with cameras 140-*a*, 140-*b*, 140-*c* and 140-*d* continues as the player transverses surface 102 and ceases when player exits surface 102 and enters team benches 12*f*. Once within bench area 12*f*, area ID & tracking cameras similar to 124 track the player and also reconfirm the player's identity by viewing helmet sticker 109*tm&id*. At any time, the player may subsequently leave bench area 12*f* and reenter surface 102 where again his motion is tracked by movable volume cameras 140-*a*, 140-*b*, 140-*c* and 140-*d*. Eventually, the player will either exit the playing area through entrance and exit 12*e* or return again to bench 12*f* and be tracked and re-identified by the ID & tracking cameras.

Referring now to FIG. 26*a*, there is shown the first type of Calibration Method 590, namely pre-tracking 592. Companies such as Motion Analysis and Vicon currently perform this method in order to calibrate their fixed volume tracking cameras 126 after they have been set into place. The calibration tool 130 comprises two or more markers such as various-sized spherical balls 17*sm* whose dimensions are pre-known and that are affixed on the tool 130 at pre-known distances from each other. The calibration process begins when tool 130 is held up within the FOV of two cameras 126. Computer 160 receives images from each of these first two cameras and processes individually the reflected circles from the calibration tool 130. Using stereoscopic algorithms that are well known in the art, the locations of each spherical marker 17*sm* on tool 130 are calculated within a local coordinate system. The operator holding the tool 130 then moves it into the view of a third camera 126 while still being in view of one of the two prior cameras 126. This technique is continued until all of the fixed cameras 126 have been individually added to the calibration of all previous cameras 126.

The present inventors anticipate that this same technique, although it would not be ideal, could be used to pre-calibrate the scalable area tracking matrix 504*m*. In consideration of area matrix 504*m*, the relative orientation of each camera 124 is primarily side-by-side with its neighbors, allowing for a small overlap on the edges of its FOV 120*v*.

Furthermore, the preferred orientation of FOV 120*v* is "top down," rather than the "perspective" view of cameras 126. Given these arrangements, a preferable pre-tracking calibration technique would be to use a traditional calibration plate incorporating a fixed set of markings held at pre-known distances from each other. This plate would then be held in a fixed position facing up at the junctions between every two cameras 124 overlapping FOV's 120*v*. Again, using standard techniques well known in the art, each of the two cameras could then be jointly calibrated by computer 160. Proceeding throughout all camera junctions in the same fashion would complete the calibration of the network to itself. The only remaining task would be to calibrate the entire matrix 504*m* to the playing surface 102, entrance and exit 12*e* and team benches 12'. This could be accomplished by placing a marking at a fixed pre-known location somewhere within each of the areas of surface 102, entrance and exit 12*e* and team benches 12*f*. Once captured by computer 160 through one or more cameras within matrix 504*m*, these markings at pre-known locations would serve to register the entire matrix.

Figure 26B:
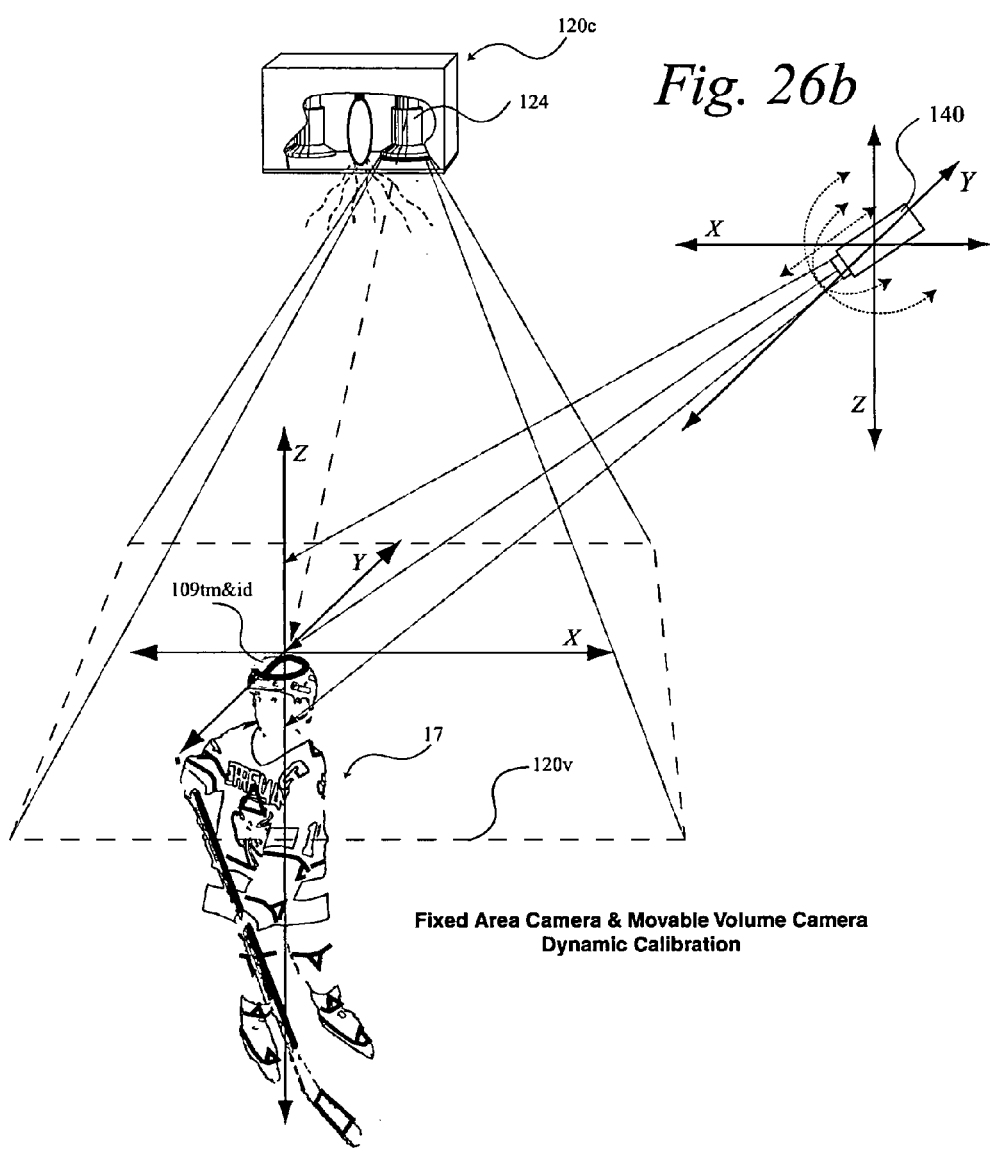
FIG. 26b depicts the dynamic calibration method taught for use with the fixed (X, Y) area and movable (X, Y, Z) volume tracking cameras of the preferred embodiment.

Now referring to FIG. 26*b*, there is shown the second type of Calibration Method 590, namely simultaneously with tracking 594. This process begins after the scalable area tracking matrix 504*m* is itself pre-calibrated as described in the previous paragraph. Once each overhead camera 124, within assembly 120*c* has been calibrated, it will be used as the basis for the dynamic re-calibration of movable cameras 140 as they continually change their orientation and FOV. After calibration, each camera 124 will have a fixed (X, Y) coordinate system registered with the playing surface 102, entrance and exit 12*e* and team bench 12'. Calibration simultaneous with tracking 594 begins when a player 17 enters the view of at least one area tracking camera 124 and is therefore detected by computer 160. The markings that computer 160 will be viewing based upon camera 124 will be those on the top surface of the body 574 including the helmet sticker 10*tm&id*. Stickers such as 109*tm&id* are similar to calibration tool 130 in that their markings are pre-known in both size and orientation to each other.

As depicted in FIG. 26*b*, at least one point on sticker 10*tm&id* that is in view of both fixed pre-calibrated camera 124 and movable camera 140 is first located in local rink (X, Y) coordinates based upon information provided by camera 124. Once located, the same point is analyzed by computer 160 from the images captured by camera 140 along with other measurable information such as the current rotations of the panning and tilting mechanisms supporting camera 140 as well as the zooming mechanism associated with its lens. During analysis, the determined (X, Y) location of the captured point is used to center the (X, Y, Z) coordinate system of camera 140. Once centered, the (Z) height scale can be set and then used to apply to all other common points in view of both the (X, Y) camera 124 and the (X, Y, Z) camera 140. These points include not only those on helmet sticker 109*tm&id* but also those throughout all the body of player 17.

Furthermore, it is expected that additional volume cameras 140 assigned to track the same player 17 will similarly be simultaneously calibrated with camera 124. It should be noted that player 17 may be straddling a boundary between area tracking cameras 124 and as such two different volume cameras 140 may actually be calibrated for the same player 17 by two different area cameras 124. In practice, this is immaterial since the pre-calibration by system 160 of the entire scalable area tracking matrix 504*m* can be thought of as creating one large single area (X, Y) tracking camera. Hence, it can be seen that each of the volume cameras such as 140 in the present figure or 140-*a*, 140-*b*, 140-*c* and 140-*d* of prior figures that are currently assigned to follow player 17 are simultaneously calibrated frame-by-frame to the overhead matrix 540*m*. Furthermore, once calibrated the multiple cameras such as 140-*a*, 140-*b*, 140-*c* and 140-*d* may be used to stereoscopically locate markings on player 17 that are not in view of the overhead matrix 540*m*.

Figures 27A, 27B:
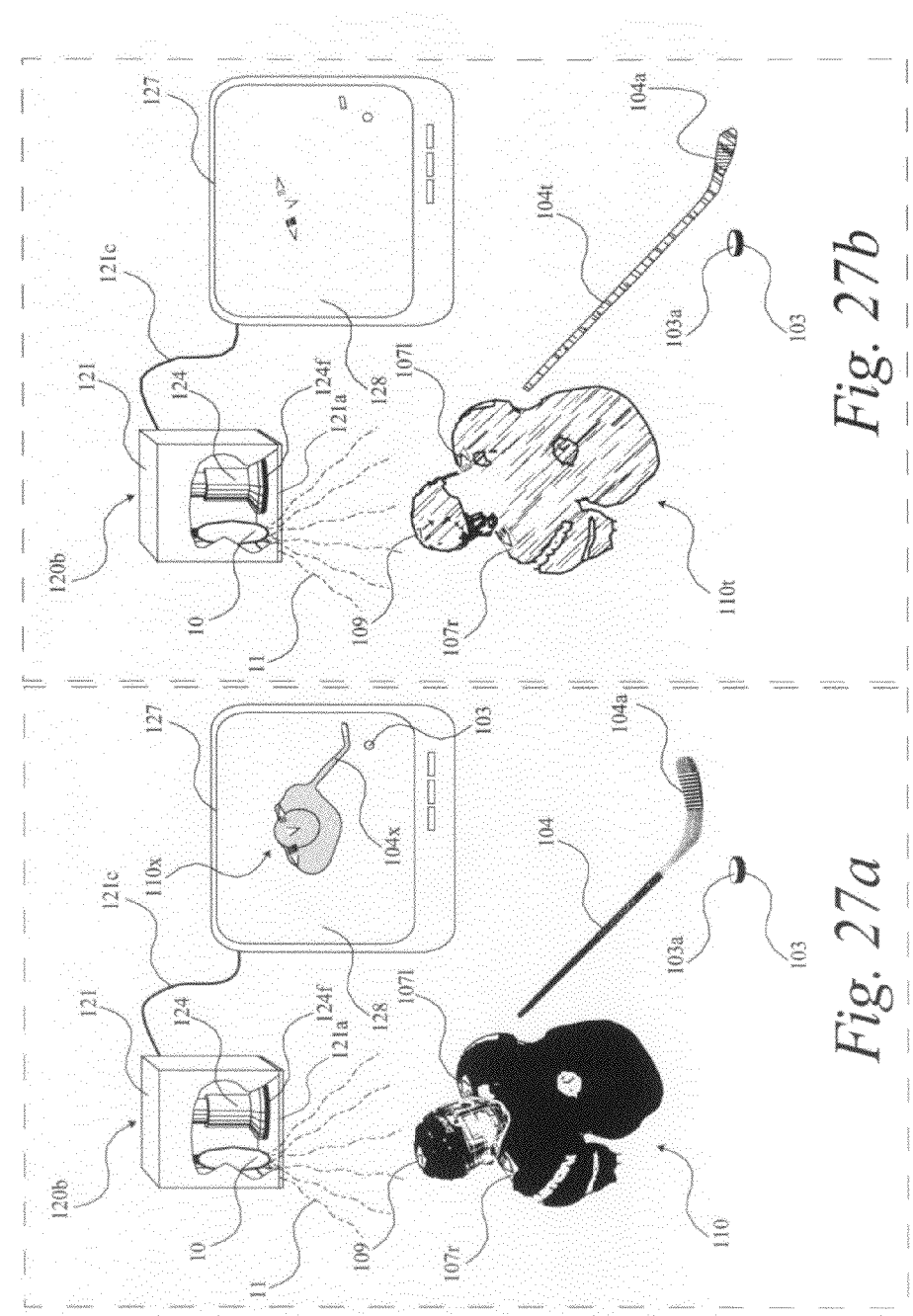
FIG. 27a depicts a typical hockey player's pads, helmet, stick and puck being captured from an overhead X-Y filming camera and displayed on a viewing screen.
FIG. 27b is similar to FIG. 27a except that now all of the foreground objects have been first treated with an energy-absorptive compound after which tracking marks have been added to desired locations.

Referring now to FIG. 27*a*, there is shown an alternate embodiment 120*b* to area (X, Y) tracking camera assembly 120*c* that does not include additional overlapping filming camera 125. In this alternate embodiment, enclosure 121 houses lamp 10 and tracking camera 124 with visible light filter 124f and is enclosed on the bottom surface by transparent cover 121a through which tracking energy 11 may transmit. Alternate embodiment of area tracking camera assembly 120b is also connected to computer 160 (not depicted) that is in turn connect to video terminal 127 via cable 121c. Further shown is player 17 to which tracking patches 107r and 107l and helmet sticker 109 have been attached. Also shown are puck 103 with reflective ink 103a and stick 104 with ink 104a. Shown on terminal 127 is camera image 128 that includes player 17. The body of player 17 is portrayed as dimmed due to some reflectance of the non-visible tracking energy while the patches, stickers and ink are portrayed as white due to their higher engineered reflectance.

Referring now to FIG. 27b, there is shown an identical arrangement to FIG. 27a except that player 17 has been first treated with one or more tracking energy absorbent compounds after which tracking patches, stickers and inks were applied. Similarly, stick 104 has also been first treated. As such, player 17 has now become 17 while stick 104 has become 104t. Due to this novel application of energy absorbers, treated player 17 is no longer visible on terminal 127. Terminal 127 displays camera image 128 provided by computer 160 in response to the images captured by the various tracking cameras 124, 126 and 140.

The present inventors have listed many absorbers and treatments that may be used especially to absorb UV frequencies in the prior co-pending application entitled Employing Electromagnetic By-Product Radiation in Object Tracking. Such treatments and absorbers are also well known for the IR frequencies to someone skilled in the art. Further, the present inventors have shown that it may also be similarly beneficial to apply energy reflectors rather than absorbers, especially with respect to the background such as player surface 102. What is important is that the intensity of the reflected signal off the tracking marks be clearly distinguishable from any reflections off the background or foreground (player's body and equipment). To gain this clarity of signal differentiation, it may be desirable to either reduce reflections through absorption or to increase reflection through reflective materials. This concept of absorbers and reflectors for the control of the signal-to-noise ratio was not listed in system 1000 as a separate component since the present inventors see it as a beneficial optimization to every possible combination of components listed in 1000.

Figures 28A, 28B:
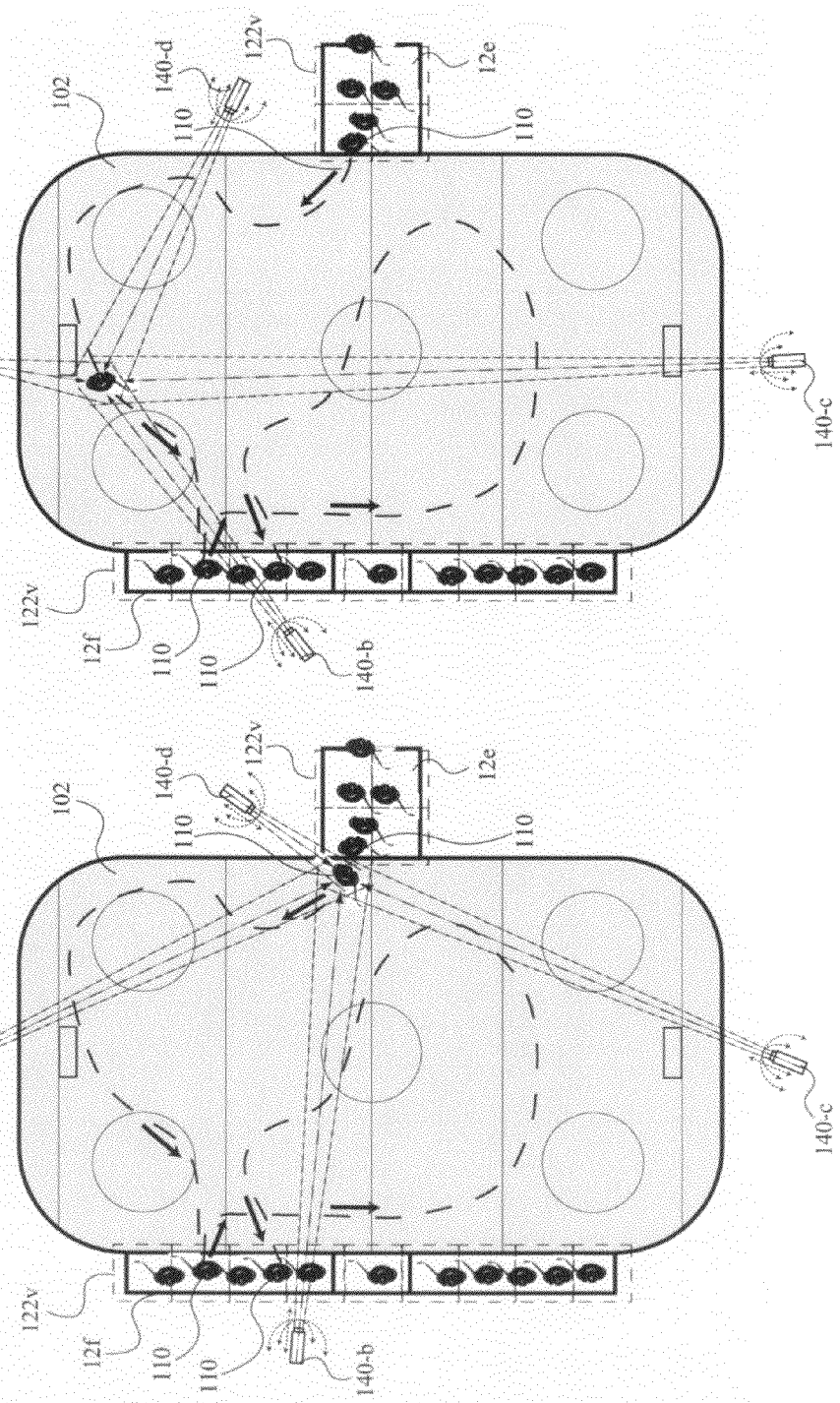
FIGS. 28a and 28b depicts the alternate embodiment that uses fixed (X, Y) area cameras for player identification and tracking on the non-playing surfaces while also using only movable (X, Y, Z) volume tracking cameras to track the players on the playing surface. Therefore the fixed (X, Y) area cameras are not first being used to track the players on the playing surface in order to direct the movable cameras but rather a predictive technique is employed to guide the movable cameras as they follow their intended targets.

Referring now to FIGS. 28a and 28b, there is shown an advantageous novel modification to the preferred embodiment that employs a scalable area-tracking matrix 504m along with a scalable movable volume-tracking matrix 506m. Specifically, that portion of the scalable area-tracking matrix 504m that was in place to track players such as 17 while they moved about the playing surface 102 has been eliminated. The reduction represents a saving in system, installation and maintenance costs.

Referring specifically to FIG. 28a, this is made possible by the understanding that as player 17 with top surface 110 passes through entrance 12e he will first still be viewed by the tracking cameras 124 left in place to cover this area, through their FOVs 122v. These cameras will first identify player 17 and then follow his movements up until he enters player surface 102. As player 17 enters surface 102, the computer 160 will automatically direct cameras 140-a, 140-b, 140-c and 140-d to pick up player 17. Referring specifically to FIG. 28b, as player 17 with top surface 110 is first viewed, computer 160 will be constantly calculating and revising its prediction of the player's next movements and therefore whereabouts. Cameras 140-a, 140-b, 140-c and 140-d will continuously pan, tilt and zoom to follow the travel of player 17. Eventually, player 17 will leave surface 102 and enter team bench 12f where he will again be in the view of tracking cameras 124 left in place to cover this area, through their FOV's 122v. Computer 160 will constantly monitor player 17 even while he remains on team bench 12f. At some point throughout the competition, player 17 is expected to re-enter the playing surface 102. At this time computer 160 will automatically direct cameras 140-a, 140-b, 140-c and 140-d to follow the player's travel until he either returns to team bench 12f or leaves through entrance and exit 12e.

Figure 29A:
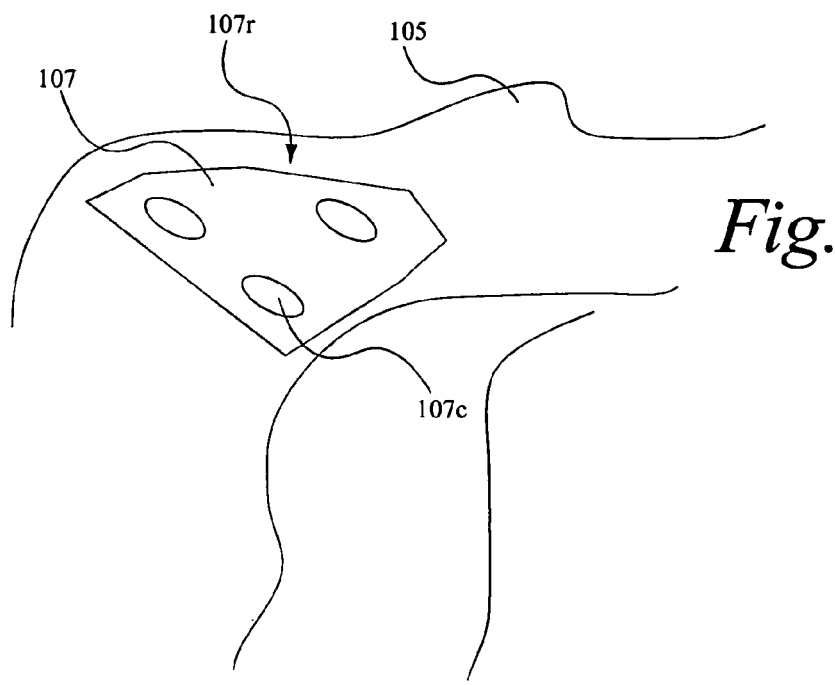
FIG. 29a depicts a potential shoulder mark that along with the jersey it is placed upon can potentially create up to three different reflectivity intensity levels depending upon the use of absorbent, reflective and retroreflective compounds.

Referring now to FIG. 29a, there is shown another advantageous modification to the preferred embodiment for marking foreground objects such as jersey 105. Specifically, there are three distinct areas of the foreground object for which it is desirable to have clearly distinguishable reflected intensity levels of the tracking energy UV or IR. The first area is the jersey 105 itself. Second, there is the base 107 of tracking patch 107r and third, there is the tracking mark 107c of patch 107r. Correspondingly, there are three appliques described in the present invention that can create the desired distinguishable reflected intensity levels: (1) UV and IR absorbent compounds, (2) UV and IR reflective compounds, and (3) UV and IR retroreflective compounds. One possible arrangement of these compounds is to first apply the absorber to jersey 105, the reflective compound to base 107 and the retroreflective compound to tracking mark 107c. Two other combinations thought to be particularly useful are: (1) Using the retroreflective compound on base 107 and using more absorber for mark 107c; and (2) Using the reflective compound on jersey 105, the absorber on base 107 and the retroreflective compound on mark 107c. Other combinations are anticipated in combination with the teachings of the present invention.

Figure 29B:
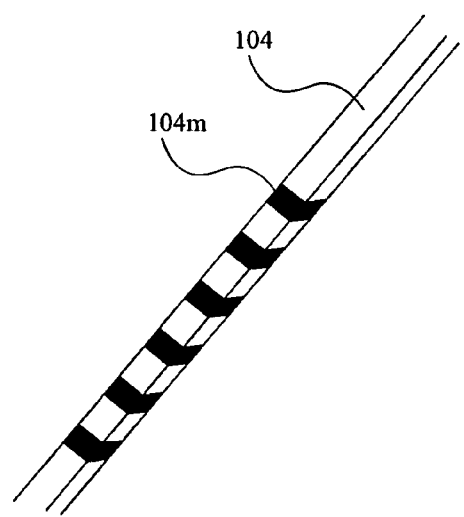
FIG. 29b depicts the strategic regular placement of markings upon the shaft of a hockey stick that allow the stick to serve as a dynamic calibration tool similar to the preferred track mark on the player's helmet.

Referring now to FIG. 29b, there is shown another advantageous modification to the preferred embodiment for creating a dynamic calibration tool that can be used to help calibrate the movable volume tracking matrix 506m simultaneously with tracking 594. Specifically, precisely measured and spaced track markings 104m have been placed onto stick 104. The exact size, shape and spacing of these markings 104m are immaterial to the concept being presently taught. Placing these markings upon a rigid object that is used by each player during the game will provide computer 160 with a way to verify its calibration estimates of both fixed area tracking camera 124 and especially movable volume cameras 140. Another possibility is to place similar markings onto the pipes of the goals on either end of the playing surface.

Figure 30:
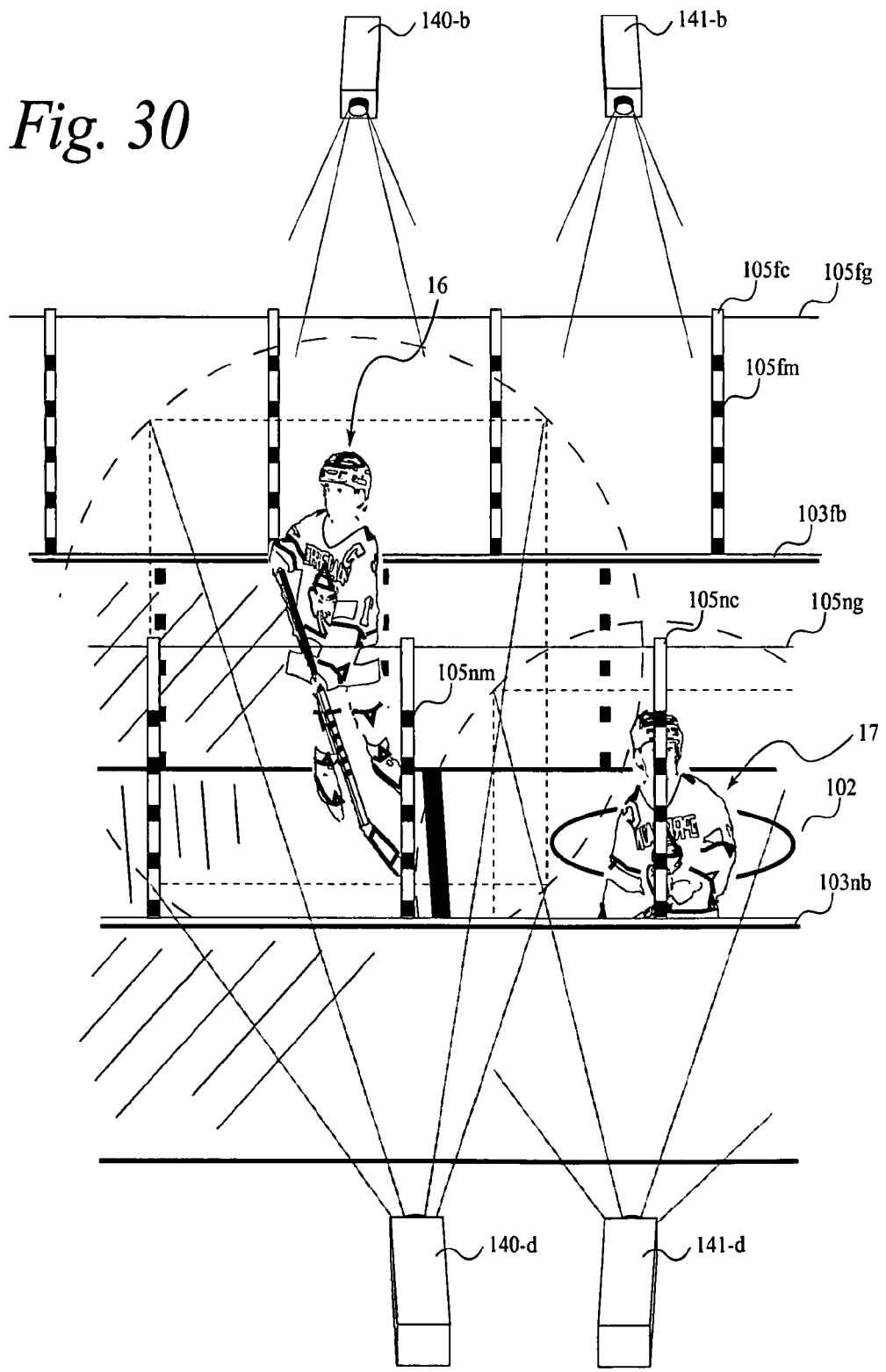
FIG. 30 depicts the additional strategic regular placement of markings upon the playing surface such as the boards and channels that hold the glass enclosing the hockey rink. These markings further serve as a dynamic calibration tool for use especially by the movable (X, Y, Z) volume tracking cameras.

Referring now to FIG. 30, there is shown a further advantageous modification to the preferred embodiment for assisting in the dynamic calibration of movable volume tracking matrix 506m. Rink playing surface 102 is shown in perspective view in between near boards 103nb and far boards 103fb. Attached to near boards 103nb are glass support columns such as 105nc that are holding in place glass panes such as 105ng. Attached to far boards 103fb are glass support columns such as 105fc that are holding in place glass panes such as 105fg. Placed on both the outer (shown) and inner (not shown) surface of near support columns 105nc are reflective markings 105nm. Similarly, placed on both the inner (shown) and outer (not shown) surface of far support columns 105fc are reflective markings 105fm. Also shown are markings 103fm on the inner side of far boards 103fb. Similar markings on the inner side of near boards 103nb are also anticipated. Moving about on surface 102 are players 16 and 17 that are being constantly tracked by movable cameras 140-b and 140-c as well as 141-b and 141-d, respectively. During player tracking as cameras such as 140-*b*, 140-*d*, 141-*b* and 141-*d* pan, tilt and zoom to change their FOVs, they will be constantly picking up one or more reflective marks such as 105*nm*, 105*fm* and 103*fm*. The exact size, shape and spacing of these markings 105*nm*, 105*fm* and 103*fm* are immaterial to the novel concept being presently taught. Placing these markings upon at least the locations specified will provide computer 160 with a means of verifying its calibration estimates of movable volume cameras 140.

Summary of Optimized Systems

A careful study of the for prior co-pending applications filed by applicants and identified above along with the previously described components 1000 will suffice to teach those skilled in the art how each component may operate as a functional part of a complete system. Therefore, the remainder of this application will focus on distinguishing at a higher level the various possible novel optimized systems according to the present invention along with discussions as to their tradeoffs.

Figure 2:
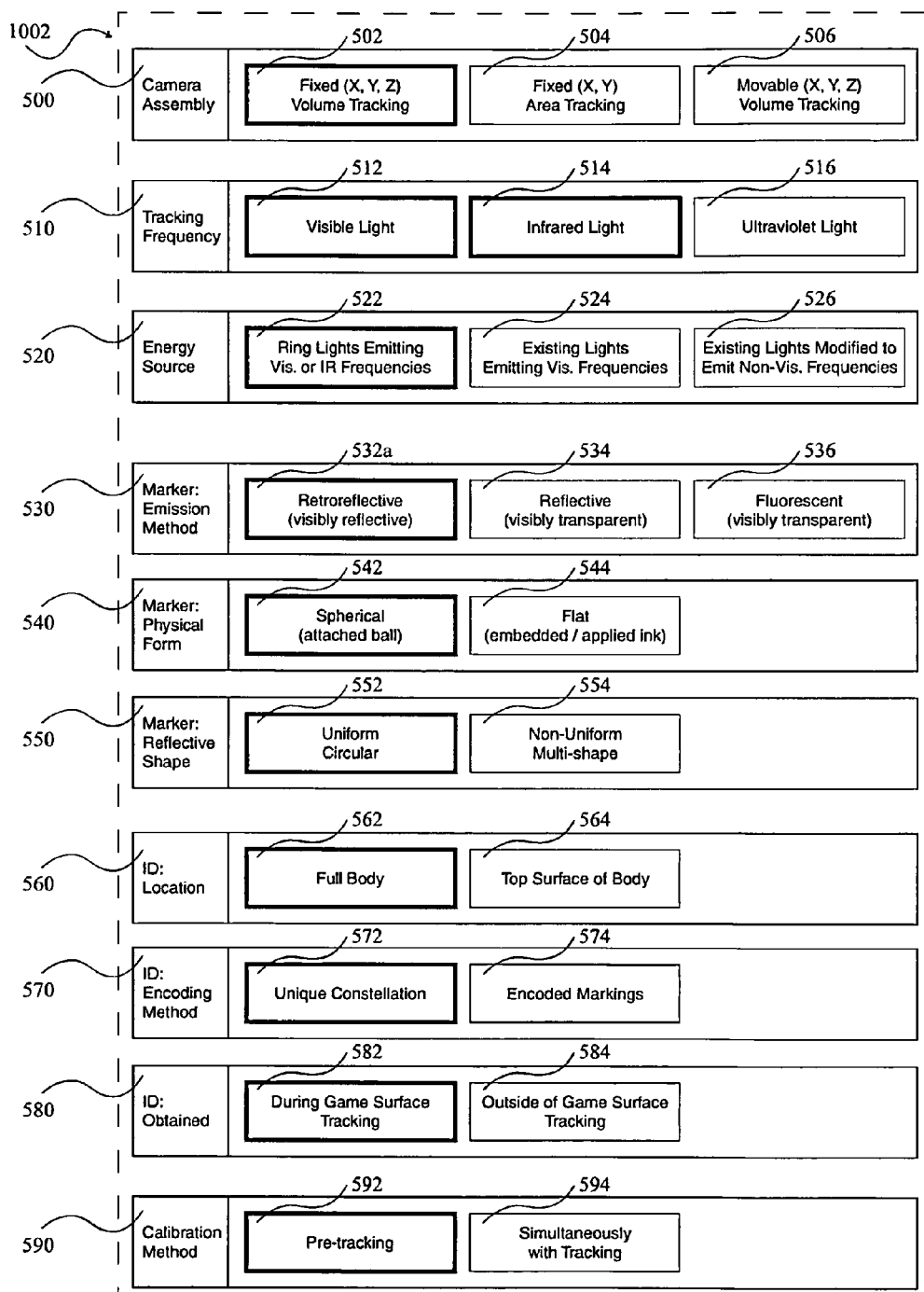
FIG. 2 is a block diagram highlighting the combination of major components currently being used in several existing machine vision systems with the main distinctive components of fixed (X, Y, Z) volume tracking cameras, visible light, spherical (attached ball) markers and a full body, unique constellation ID added by the present invention.

Referring now to FIG. 2, there is shown a block diagram depicting all of the major components 1000 of which a subset has been identified as representative of real-time 3D-object tracking system 1002. System 1002 comprises fixed (X, Y, Z) volume tracking assemblies 502 that employ either visible light 512 or IR light 514 that is emitted from ring lights 522. This tracking energy is then reflected by spherical (attached ball) 542 retroreflective 532 markers that are placed at various locations on the subject to be tracked and that create a uniform circular 552 image in camera assemblies 502. The full body 562 set of spherical markers 542 form a unique constellation 572 used by system 1002 to identify each subject during game surface tracking 582. The system 1002 is calibrated prior to tracking 592.

While system 1002 accomplishes the goals of real-time 3D tracking, it has several drawbacks as follows:

1—Due to its non-uniform approach to camera placement, it is difficult to scale up to track larger areas such as a hockey rink;

2—Due to its strategy of fixed volume tracking accomplished with a complex overlapping network of camera field-of-views, the pixels resolution per player is inconsistent and the system is prone to lose markers when multiple players bunch up;

3—When using visible light as the tracking energy, the additional red light is added by the system because of the need to use ring lights in combination with the retroreflective markers creating a lighting system that is intrusive to both players and audience;

4—When using in IR light as the tracking energy, the ring lights do not emit any additional visible light in combination with the IR to act as a cue to both players and audience not to stare at the lighting;

5—The system employs retroreflective markers in order to obtain the highest possible signal reflection but these materials are broad-band reflectors that respond to the entire visible spectrum causing unwanted reflections of ambient light sources that is intrusive to both players and audience;

6—The retroreflective markers are constructed to be spherical balls that protrude away from the body helping to ensure maximum visibility to the tracking cameras by consistently creating a circular reflection from any angle, however, this very nature of their protruding physical form makes them vulnerable to dislodge during player contact;

7—The uniform circular nature of the retroreflection caused by the spherical marker is useful for centroid calculations and therefore determining exact body points, however, it necessarily forces more cameras since less player surface area can be marked for viewing using a spherical shape;

8—By attempting to combine player identification with body joint tracking the system creates a difficult requirement that forces camera views away from the top down view that rarely experiences inclusions due to player bunching to a perspective view that is very susceptible to inclusions;

9—By attempting to combine player identification with body joint tracking the system creates a difficult requirement that substantially all markers placed on the full body must be in view in order to identify a given player;

10—By attempting to combine player identification with body joint tracking the system loses an opportunity to perform player identification off the game surface in either the player entrance and exit or on the team benches. (These areas are short on space for adequate perspective camera placement and are also very crowed with players who in the case of team benches are expected to be sitting therefore additionally hiding markers);

11—By attempting to combine player identification with body joint tracking the system (a) creates a difficult requirement that each player have either a substantially different body shape and therefore configuration of markers or that additional markers be added to create a unique pattern, and (b) makes using the system with up to twenty some players per team cumbersome as a pre-tracking procedure must be instituted to ensure adequate "constellation" differentiation per player; and 12—The system has no method of simultaneously calibrating the cameras during tracking that precludes the possibility of using movable volume tracking cameras that could dynamically reconfigure the tracking volume to better create a uniform pixel resolution per player and reduce the number of marker inclusions due to player bunching.

Figure 3:
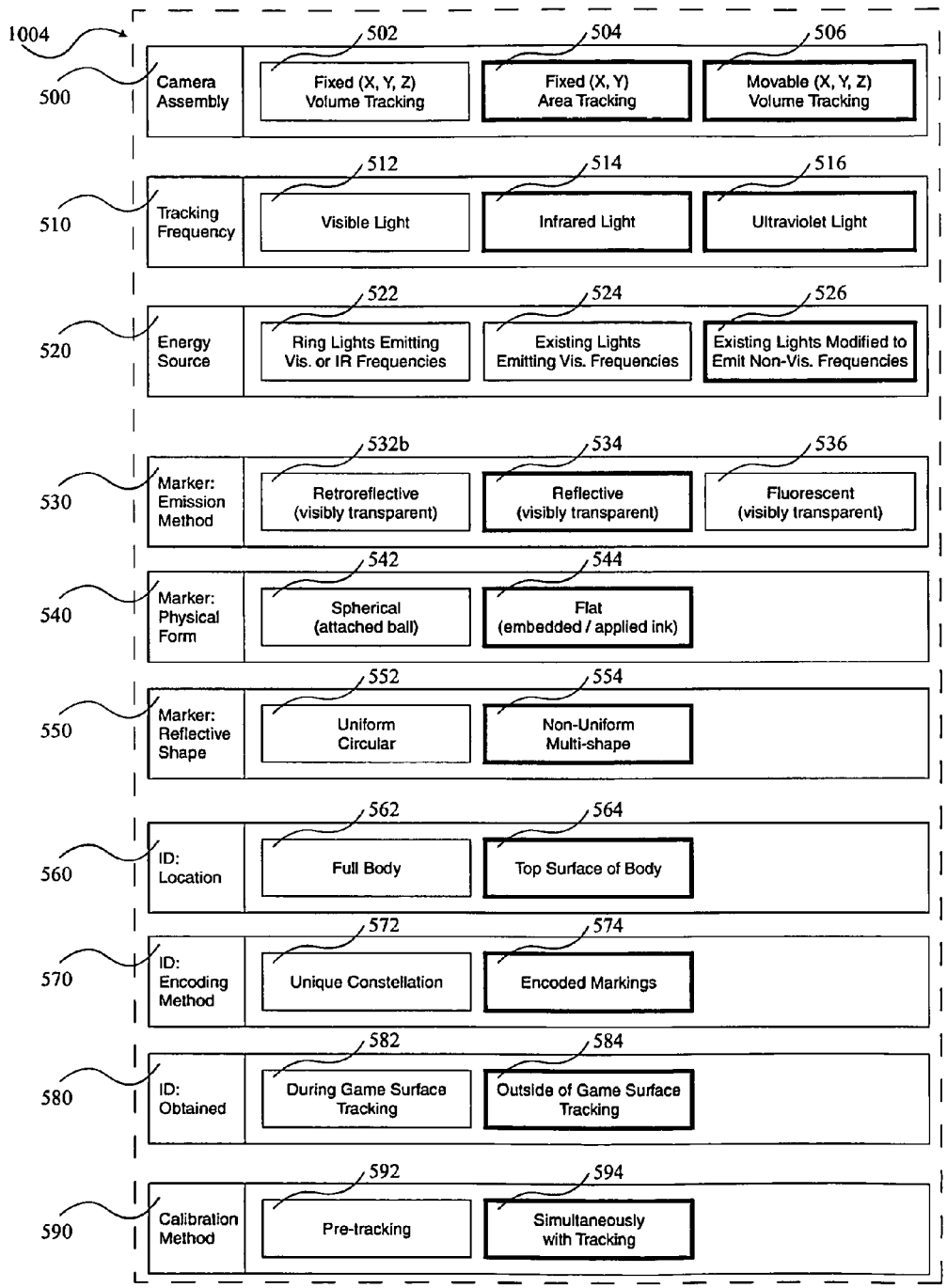
FIG. 3 is a block diagram highlighting the combination of major components in the preferred embodiment of the present invention, including the use of fixed (X, Y) area tracking cameras in combination with movable (X, Y, Z) volume tracking as well as non-visible IR or UL, flat reflective markers, and a top surface of body, encoded markings ID.

Referring now to FIG. 3, there is shown a block diagram depicting all of the major components 1000 of which a subset has been identified as the preferred embodiment 1004 of the present invention. Preferred embodiment 1004 comprises fixed (X, Y) area tracking assemblies 504 in combination with movable (X, Y, Z) volume tracking assemblies 506, that employ either IR light 514 or UV light 516 that is provided by existing lights modified to emit non-visible frequencies 526. This tracking energy is then reflected by flat (embedded/applied ink) 544 reflective 534 markers that are placed at various locations on the subject to be tracked and that create non-uniform multi-shape 552 images in camera assemblies 504 and 506. Specially encoded 574 flat 544 markers placed on the top surface of the body 564 are used by system 1004, to identify each subject outside of game surface tracking 584. In system 1004, while fixed (X, Y) area tracking assemblies 504 are calibrated prior to tracking, movable (X, Y, Z) volume tracking assemblies 506 are calibrated simultaneously with tracking 592.

The preferred embodiment 1004 accomplishes the goals of real-time 3D tracking without the limitations of currently available system 1002 providing the following advantages:

1—By limiting the fixed (X, Y) area tracking matrix to a top view only, the system creates a scalable approach to camera placement that provides a substantially uniform pixel resolution per area;

2—By implementing a separate matrix of movable (X, Y, Z) volume tracking cameras to pick up the remaining side views of the players, the system creates a scalable approach to camera placement that provides a substantially uniform pixel resolution per player;

3—By using either or both UV and IR light as the tracking energy that is emitted as a by-product from lamp sources that are also providing visible lighting for general purposes, the system is both non-intrusive and eye safe;

4—By using reflective as opposed to retroreflective markers the cone of reflection is opened up such that separate ring lights are not required whose added energy and visible light would be intrusive to both players and audience;

5—By using markers that reflect only the narrow band of tracking energy and specifically do not reflect visible light, the marker's reflections are hidden from player and audience view;

6—By using flat markers that are embedded into the substrate the marker is no longer vulnerable to dislodge during player contact;

7—By using flat markers of non-uniform sizes and shapes the markers are made visible for more camera angles thereby reducing the incidence of inclusions;

8—By using flat markers of non-uniform sizes and shapes the markers can be made to cover significantly larger surface area thereby reflecting more of the tracking energy;

9—By using visibly transparent flat markers embedded into the substrate adding minimal additional thickness, the system's markers will now be completely undetected by both the players and the audience;

10—By first strategically applying a combination of tracking energy absorptive or reflective compounds to the background as well as foreground objects the system provides the ability for more clearly distinguishing between background reflections, foreground object reflections and marker reflections;

11—By separating player identification from the player joint tracking and isolating the identification marker to the top surface of the player, the system ensures a higher rate of player identification due to fewer inclusions of identification markers;

12—By separating player identification from the player joint tracking and isolating the identification marker to the top surface of the player, the system eliminates the importance of having substantially all body joint markers in view at all times;

13—By separating player identification from the player joint tracking and isolating the identification marker to the top surface of the player, the system provides the possibility of performing player identification off the playing surface in the limited area of the entrance and exit and team benches where player movement is expected to be significantly reduced thereby facilitating the identification process;

14—By separating player identification from the player joint tracking and isolating the identification marker to the top surface of the player that can be zoomed in on while in the restricted movement areas of the entrance and exit and team benches, encoded markings similar to bar codes become feasible, which encode markings can easily handle forty or more players and avoid any cumbersome pre-tracking procedure to ensure adequate marker "constellation" differentiation per player;

15—By establishing a separate fixed (X, Y) area tracking matrix that may be pre-calibrated for the X and Y dimensions and by implementing fixed size and shape relationship markers on rigid surfaces such as the player helmet and stick that can be used as calibration tools, the system provides dynamic calibration of movable cameras simultaneously with player tracking;

16—By providing dynamic calibration of movable cameras simultaneous with player tracking, the system further provides the ability to dynamically recreate the optimal tracking volume for minimal marker inclusions;

17—By establishing a separate fixed (X, Y) area tracking matrix that continually locates each player in (X, Y) space the system provides the ability to automatically direct the pan, tilt and zoom aspects of one or more movable cameras to follow each player; and 18—By establishing a system that dynamically follows each player with greater accuracy and fewer marker inclusions, the system provides the ability to predict more accurately the limited range of movement that could be expected from any player in the next instant, which ability provides a second method for automatically directing the pan, tilt and zoom aspects of one or more movable cameras to follow each player.

Figure 4:
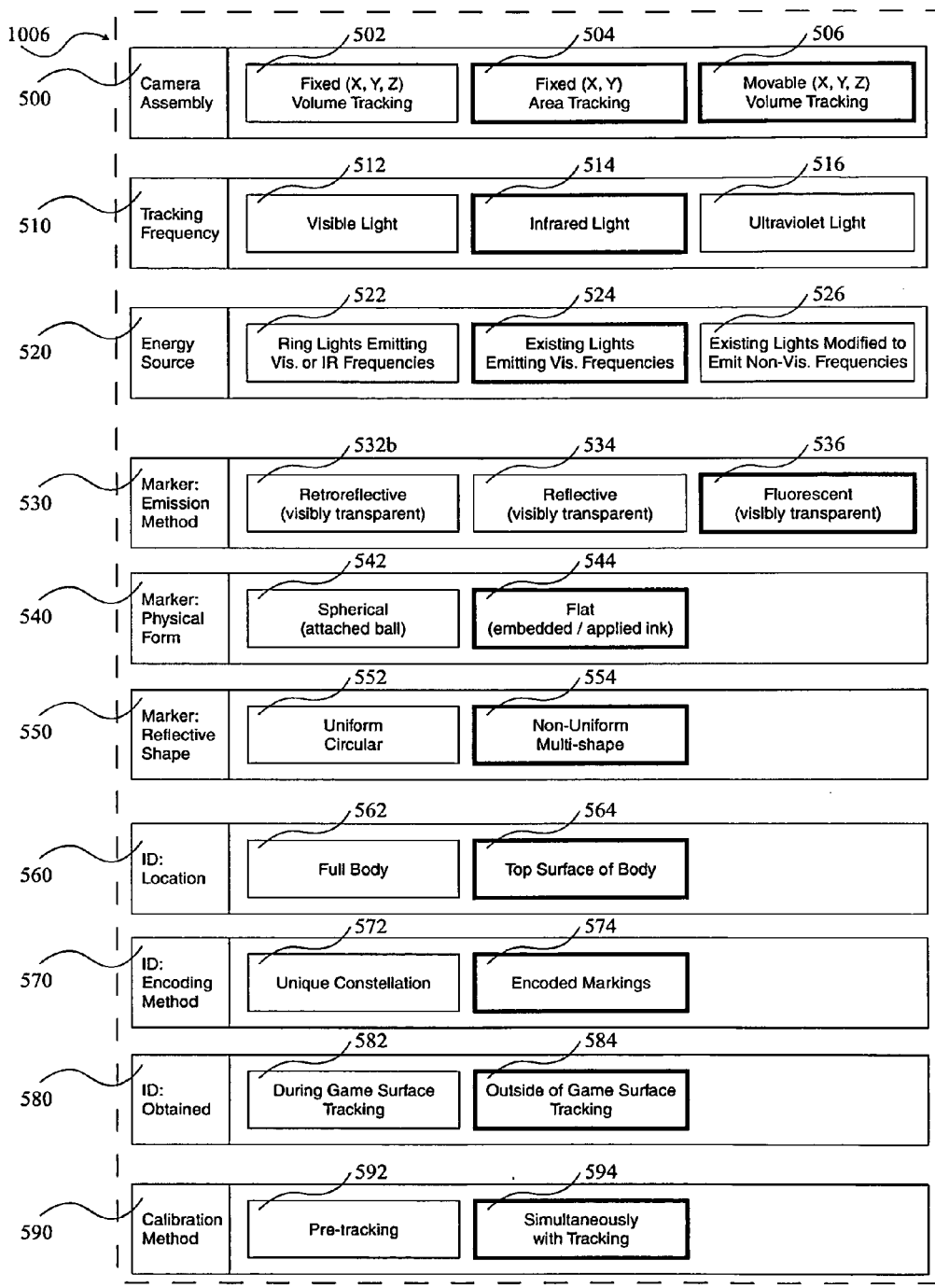
FIG. 4 is a block diagram highlighting the combination of major components in an alternate embodiment of the present invention. The main distinction between this alternate and the preferred is the use of flat fluorescent markers instead of flat reflective.

Referring now to FIG. 4, there is shown a block diagram substantially similar to the preferred embodiment 1004 except that it employs components taught by the present inventors to provide a fluorescent alternative embodiment 1006. Embodiment 1006 specifically employs existing lights emitting visible frequencies 524 that are absorbed by fluorescent 526 markers that in turn emit IR light 514 for the tracking frequency 510. All other aspects and benefits of alternate embodiment 1006 are identical to preferred embodiment 1004.

Embodiment 1006 accomplishes the goals of real-time 3D tracking, without the limitations of system 1002, and provides the following additional advantages:

1—By using fluorescent markers that absorb in the visible region the system can rely fully upon existing rink lighting without modifications to its emissions spectrum to supply the tracking energy, and 2—By using fluorescent markers that emit in the IR region the system can remain visually transparent to players and audience.

Figure 5:
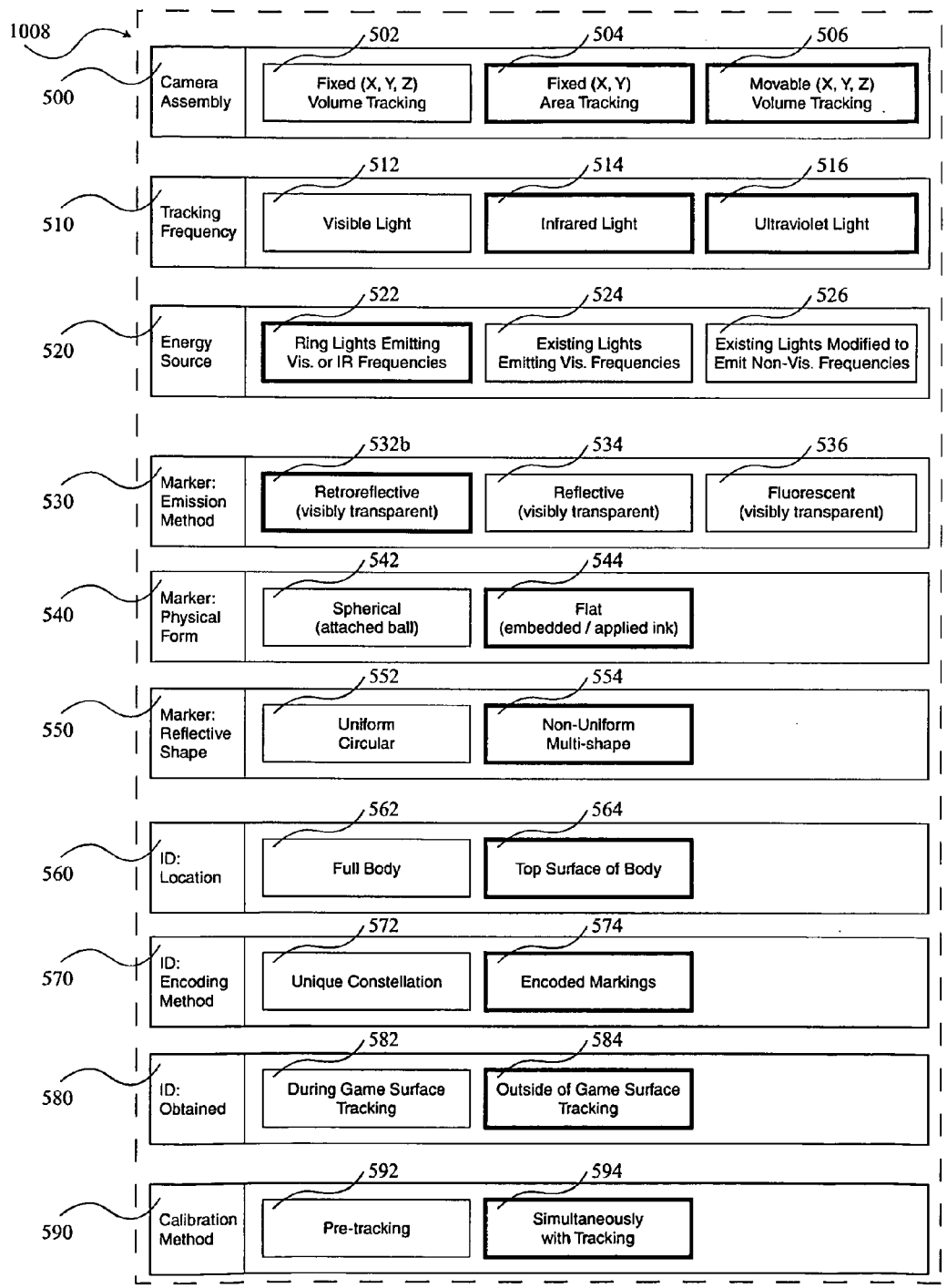
FIG. 5 is a block diagram highlighting the combination of major components in another alternate embodiment of the present invention. The main distinction between this alternate and the preferred is the use of flat retroreflective markers instead of flat reflective.

Referring now to FIG. 5, there is shown a block diagram substantially similar to the preferred embodiment 1004 except that it employs components to provide a visibly transparent retroreflective alternative embodiment 1008. Embodiment 1008 specifically employs visibly transparent retroreflective 532*a* markers in combination with ring lights 522 emitting either IR light 514 or UV light 516 tracking frequencies 510. All other aspects and benefits of alternate embodiment 1008 are identical to preferred embodiment 1004.

Embodiment 1008 accomplishes the goals of real-time 3D tracking, without the limitations of system 1002, and provides the following additional advantage: using retroreflective markers that reflect only the narrow band of tracking frequencies of IR or UV, the system provides for greater reflected signal strength while still remaining visibly transparent to both players and audience.

Figure 6:
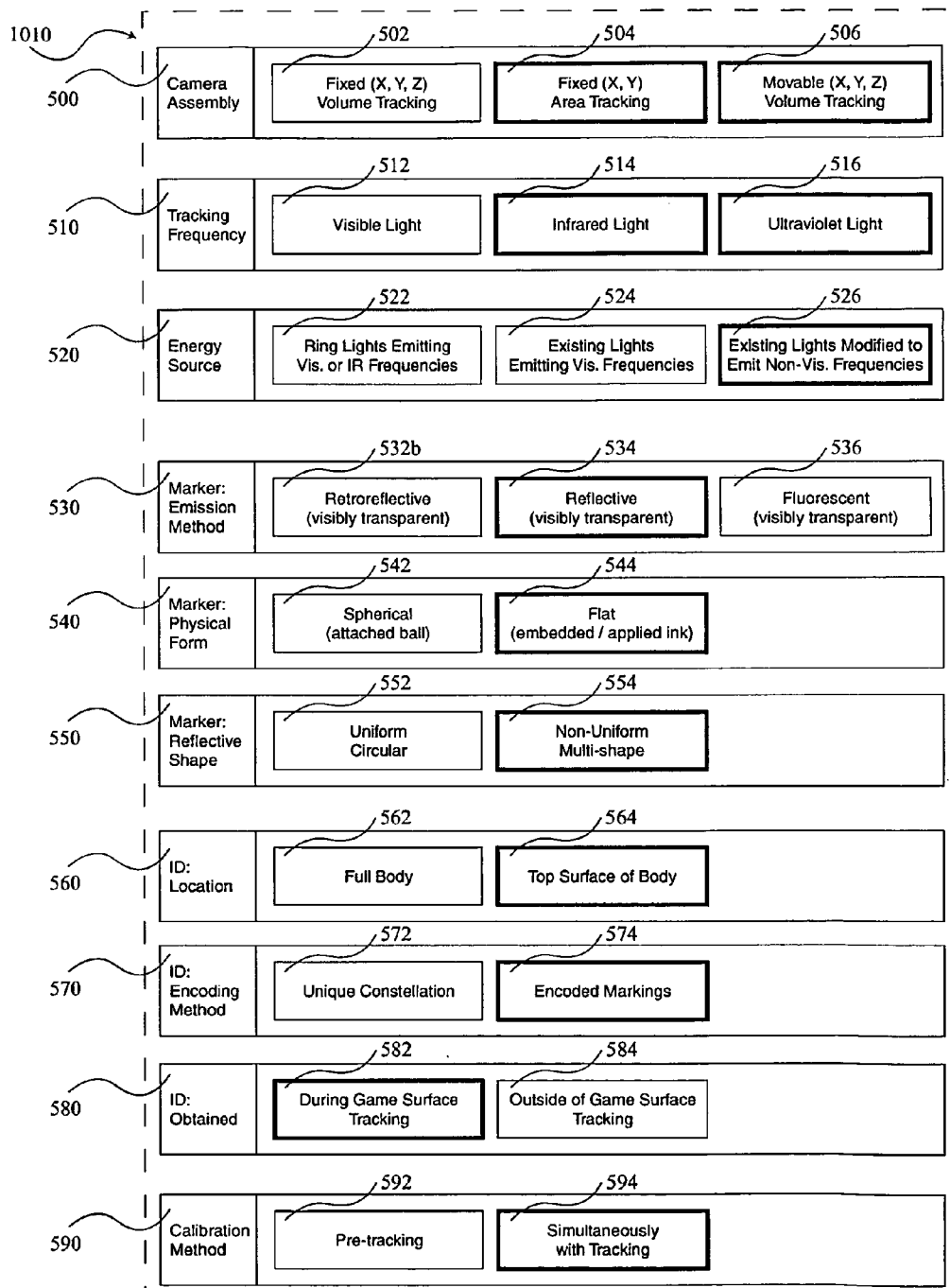
FIG. 6 is a block diagram highlighting the combination of major components in still another alternate embodiment of the present invention. The main distinction between this alternate and the preferred is that the ID is obtained during rather than outside game surface tracking.

Referring now to FIG. 6, there is shown a block diagram substantially similar to the preferred embodiment 1004 except that it employs components to provide a game surface id tracking alternative embodiment 1010. Embodiment 1010 specifically uses fixed (X, Y) area tracking assemblies 504 to read the encoded marking 574 player id located on the top surface of the body 564 during game surface tracking 582. All other aspects and benefits of alternate embodiment 1010 are identical to preferred embodiment 1004.

Embodiment 1010 accomplishes the goals of real-time 3D tracking, without the limitations of system 1002, and providing the following additional advantage: identifying players simultaneously with game surface tracking the system provides the option of eliminating separate area tracking cameras in the non-playing surfaces of the entrance and exit passageway and team benches.

Figure 7:
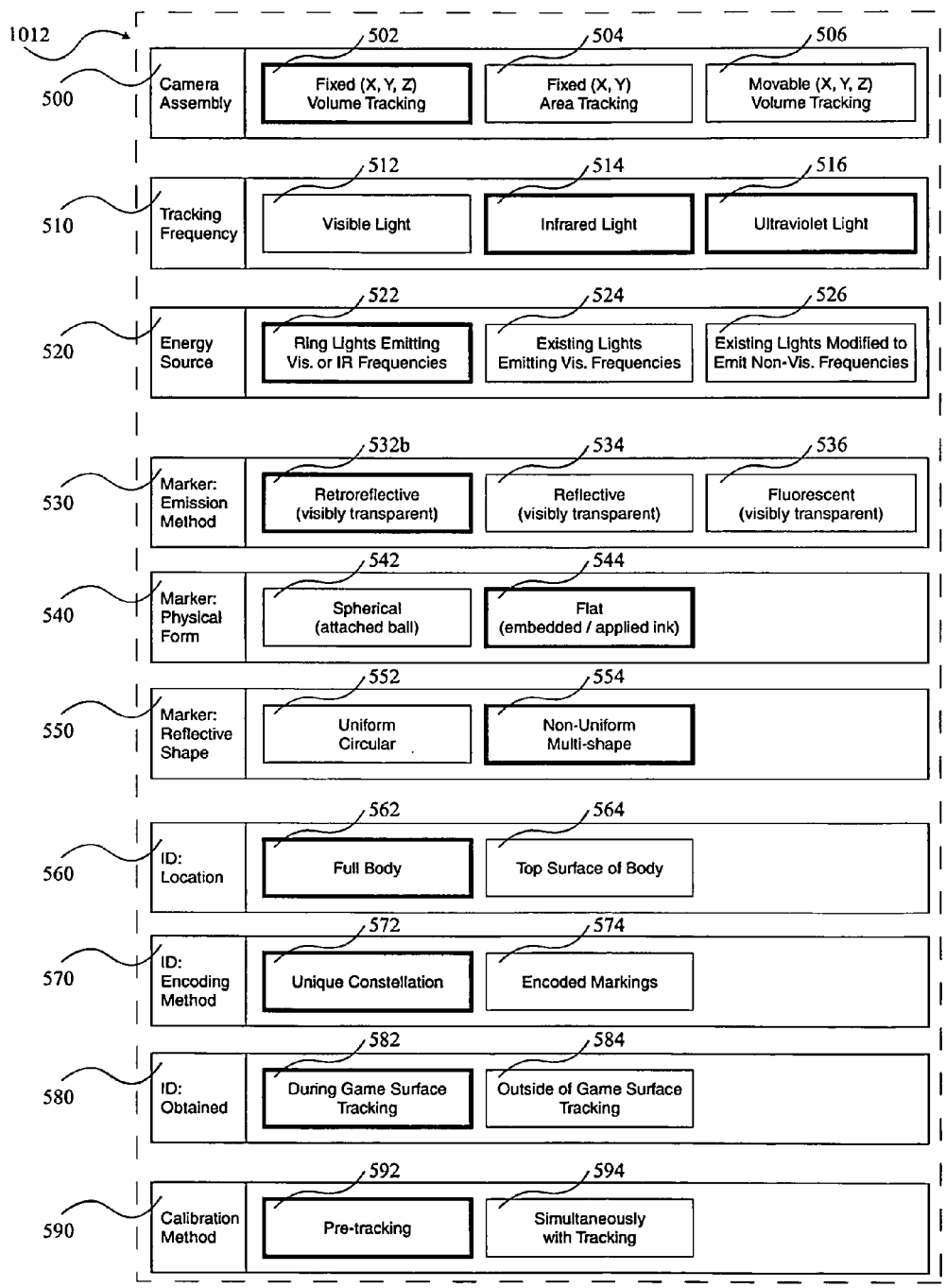
FIG. 7 is a block diagram highlighting the combination of major components in another alternate embodiment of the present invention. The main distinction between this alternate and the preferred is the use of fixed (X, Y, Z) volume tracking cameras rather than the fixed (X, Y) area tracking and movable (X, Y, Z) volume as well as flat retroreflective markers, and a full body, unique constellation ID.

Referring now to FIG. 7, there is shown a block diagram substantially similar to the system 1002 except that it employs components to provide a non-visible variation 1012. Variation 1012 specifically uses the visibly transparent retroreflective markers 532a first taught by the present inventors in their co-pending application rather than traditional visibly retroreflective markers as currently used. Variation 1012 further limits the tracking frequencies 510 to either IR light 514 or UV light 516 and employs flat (embedded/applied ink) 544 non-uniform multi-shape 554 markers.

Variation 1012 incrementally improves upon the real-time 3D tracking implemented by system 1002 by providing the following additional advantages:
1—By using markers that reflect only the narrow band of tracking energy and specifically do not reflect visible light, the marker's reflections are hidden from player and audience view;
2—By using flat markers that are embedded into the substrate the marker is no longer vulnerable to dislodge during player contact;
3—By using flat markers of non-uniform sizes and shapes the markers are made visible for more camera angles thereby reducing the incidence of inclusions;
4—By using flat markers of non-uniform sizes and shapes the markers can be made to cover significantly larger surface area thereby reflecting more of the tracking energy, and
5—By using visibly transparent flat markers embedded into the substrate adding minimal thickness, the system's markers will now be completely undetected by both the players and the audience.

Figure 8:
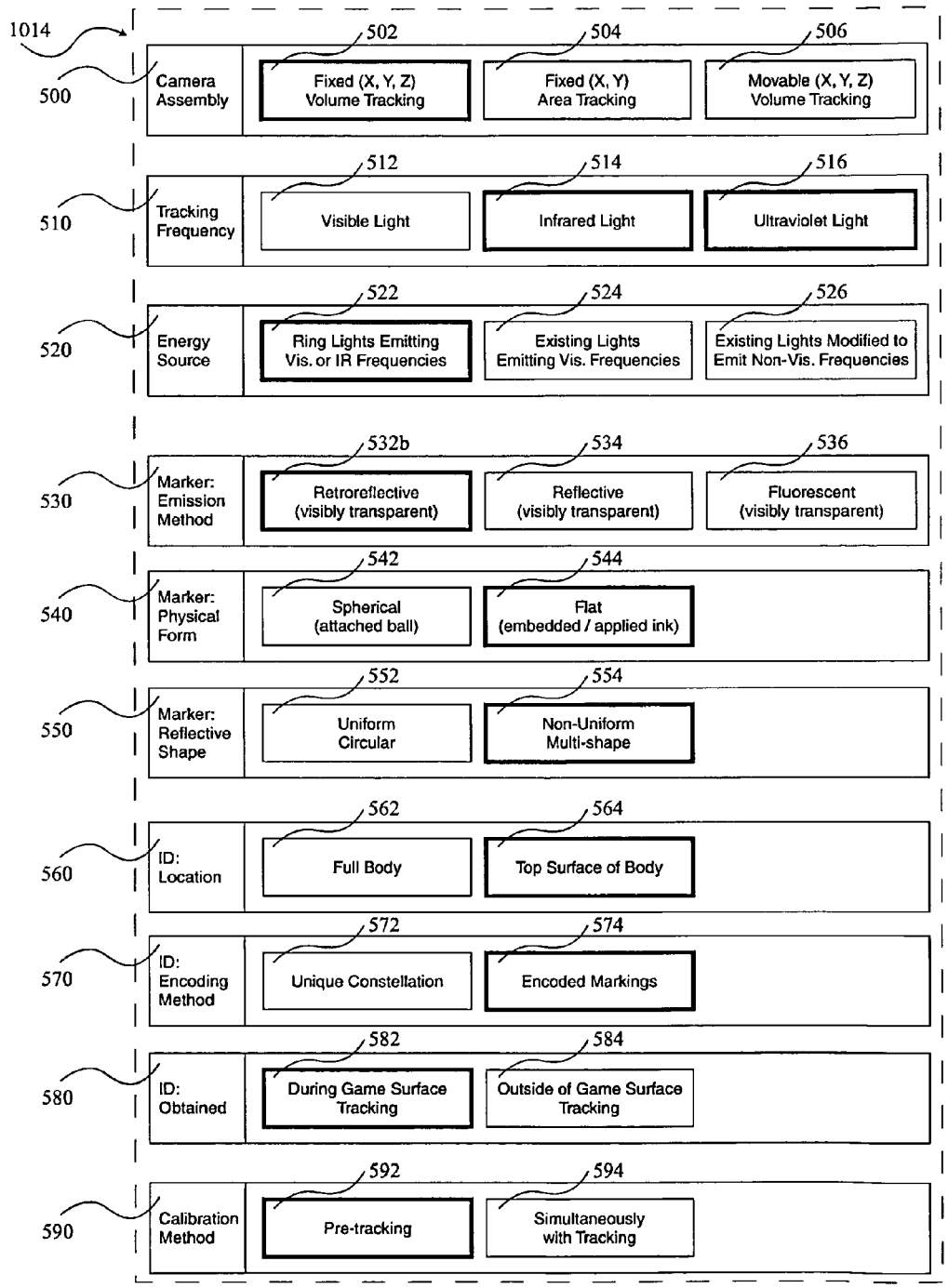
FIG. 8 is a block diagram highlighting the combination of major components in an alternate embodiment of the present invention. The main distinction between this alternate and the alternate of FIG. 7 is the used of a top surface of body, encoded markings ID.

Referring now to FIG. 8, there is shown a block diagram substantially similar to the non-visible variation 1012 except that it employs additional components to provide a top surface of body encoded id variation 1014. Variation 1014 specifically uses flat 544 non-uniform 554 top surface of body 564 encoded markings 574 to establish each player's identification during game surface tracking 582.

Variation 1014 incrementally improves upon the real-time 3D tracking implemented by non-visible variation 1012 by providing the following additional advantages:
1—By separating player identification from the player joint tracking and isolating the identification marker to the top surface of the player, the system ensures a higher rate of player identification due to fewer inclusions of identification markers,
2—By separating player identification from the player joint tracking and isolating the identification marker to the top surface of the player, the system eliminates the importance of having substantially all body joint markers in view at all times, and
3—By separating player identification from the player joint tracking and isolating the identification marker to the top surface of the player, the system provides the possibility of performing player identification off the playing surface in the limited area of the entrance and exit passageway and team benches where player movement is expected to be significantly reduced thereby facilitating the identification process.

Figure 9:
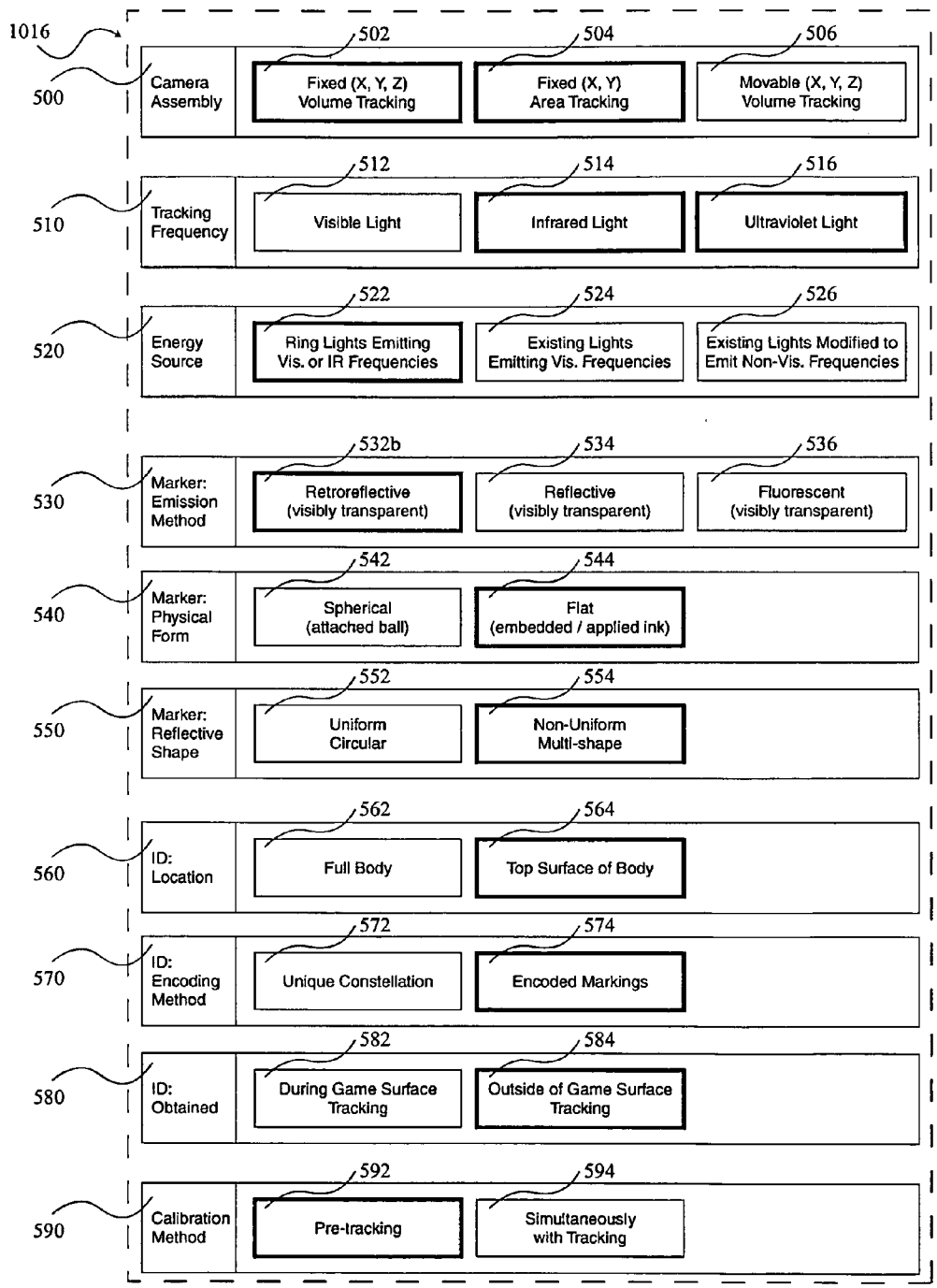
FIG. 9 is a block diagram highlighting the combination of major components in an alternate embodiment of the present invention. The main distinction between this alternate and the alternate of FIG. 8 is that the ID is obtained during rather than outside game surface tracking.

Referring now to FIG. 9, there is shown a block diagram substantially similar to the top surface of body encoded id variation 1014 except that it employs additional components to provide outside of game surface id variation 1016. Variation 1016 specifically establishes each player's identification outside of game surface tracking 584 using fixed (X, Y) area tracking assemblies 504 at least in these restricted areas.

Variation 1016 incrementally improves upon the real-time 3D tracking implemented by top surface of body encoded id variation 1014 by providing the following additional advantages:
1—By separating player identification into the outside of game surface areas such as the entrance and exit passageway and team benches, the identification marker on the top surface of the player that can be zoomed in on without affecting body marker tracking while on the game surface. The possibility of zoomed fields of view for the fixed volume cameras in these special areas makes encoded markings similar to bar codes feasible. These encoded markings can easily handle forty or more players and avoid any cumbersome pre-tracking procedure to ensure adequate marker "constellation" differentiation per player.
2—By using fixed (X, Y) area tracking cameras at least in the identification areas of the entrance and exit passageway and team benches, total camera use is made more efficient. The top-down orientation of the (X, Y) camera is better suited than the perspective orientation of the (X, Y, Z) camera for zoom-in viewing of the top surface where the encoded markings are located.

Figure 10:
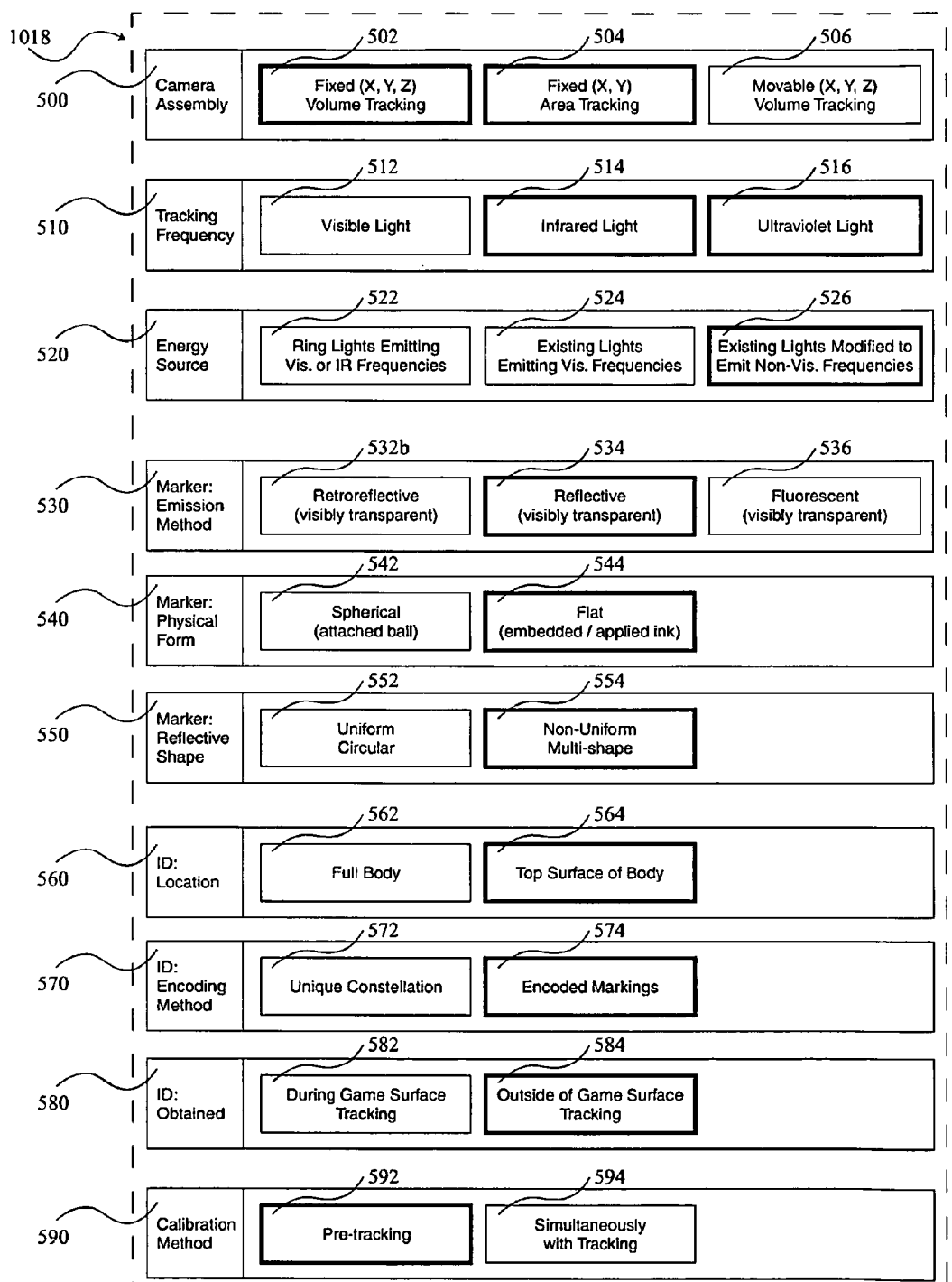
FIG. 10 is a block diagram highlighting the combination of major components in another alternate embodiment of the present invention. The main distinction between this alternate and the preferred is the use of fixed (X, Y, Z) volume tracking cameras in place of the movable (X, Y, Z) volume.

Referring now to FIG. 10, there is shown a block diagram substantially similar to outside of game surface id variation 1016 except that it employs additional components to provide existing light source variation 1018. Variation 1018 specifically employs existing lights modified to emit non-visible frequencies 526 whose tracking energy is returned by the markers using the reflective 534 Marker: Emission Method 530.

Variation 1018 incrementally improves upon the real-time 3D tracking implemented by outside of game surface id variation 1016 by providing the following additional advantages:
1—By switching to reflective markers as opposed to retroreflective, the cone of reflected energy is greatly expanded and can now be thought of as omni-directional thus eliminating the need to keep the camera's lens in close proximately to the emitting light source, and
2—By using existing lights as the tracking energy source, no additional energy is required and therefore added to the ambient lighting that would among other problems raise the temperature and add additional production, installation and maintenance costs to the system.

Figure 11:
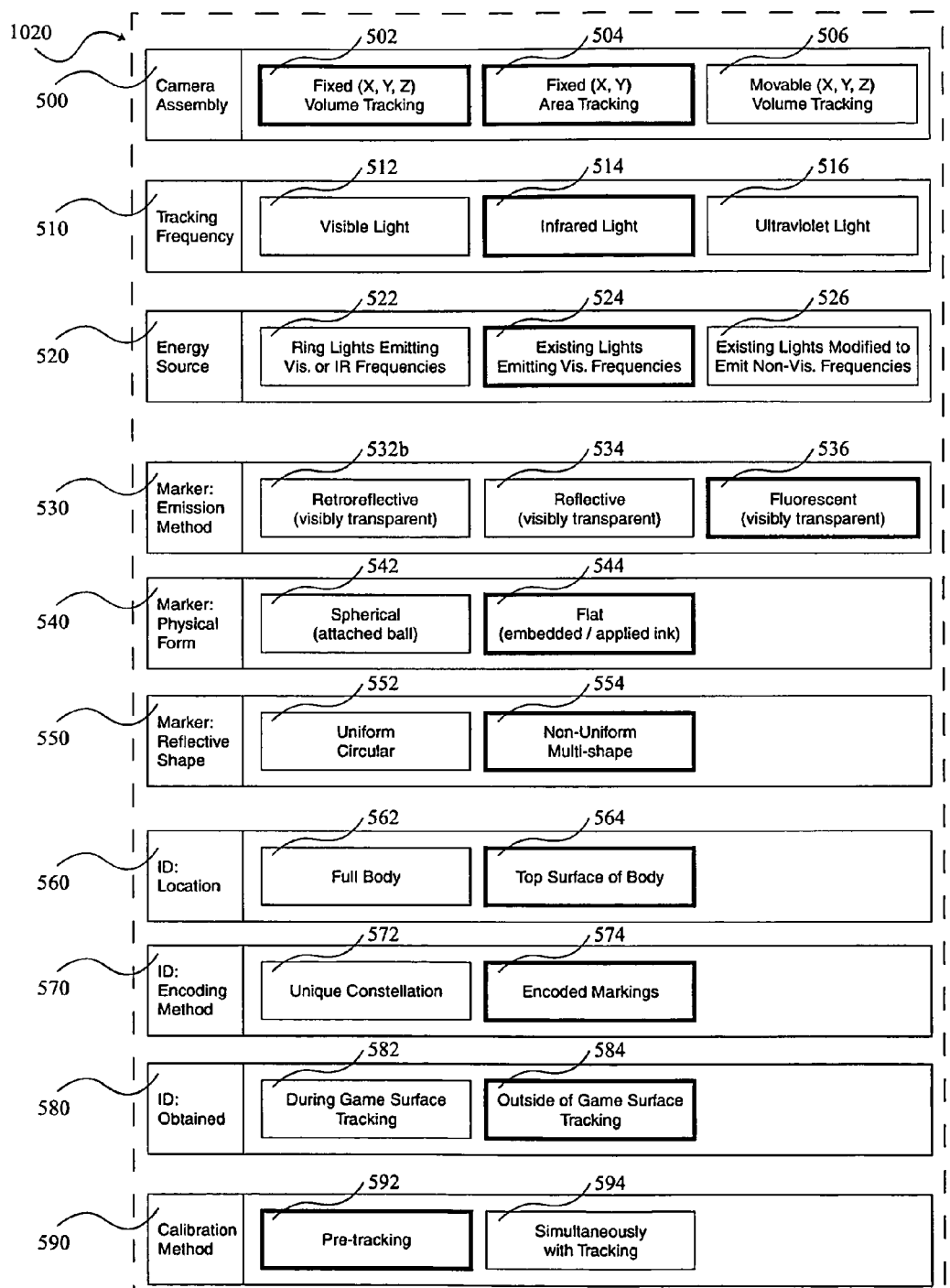
FIG. 11 is a block diagram highlighting the combination of major components in another alternate embodiment of the present invention. The main distinction between this alternate and the alternate of FIG. 10 is the use of flat fluorescent rather than reflective markers.

Referring now to FIG. 11, there is shown a block diagram substantially similar to existing light source variation 1018 except that it employs additional components to provide fluorescent variation 1020. Variation 1020 specifically employs existing lights emitting visible frequencies 524 that are absorbed by fluorescent 526 markers that in turn emit IR light 514 for the tracking frequency 510.

Variation 1020 incrementally improves upon the real-time 3D tracking implemented by existing light source variation 1018 by providing the following additional advantages:
1—By using fluorescent markers that absorb in the visible region the system can rely fully upon existing rink lighting without modifications to its emissions spectrum to supply the tracking energy, and
2—By using fluorescent markers that emit in the IR region the system can remain visually transparent to players and audience.

Figure 12:
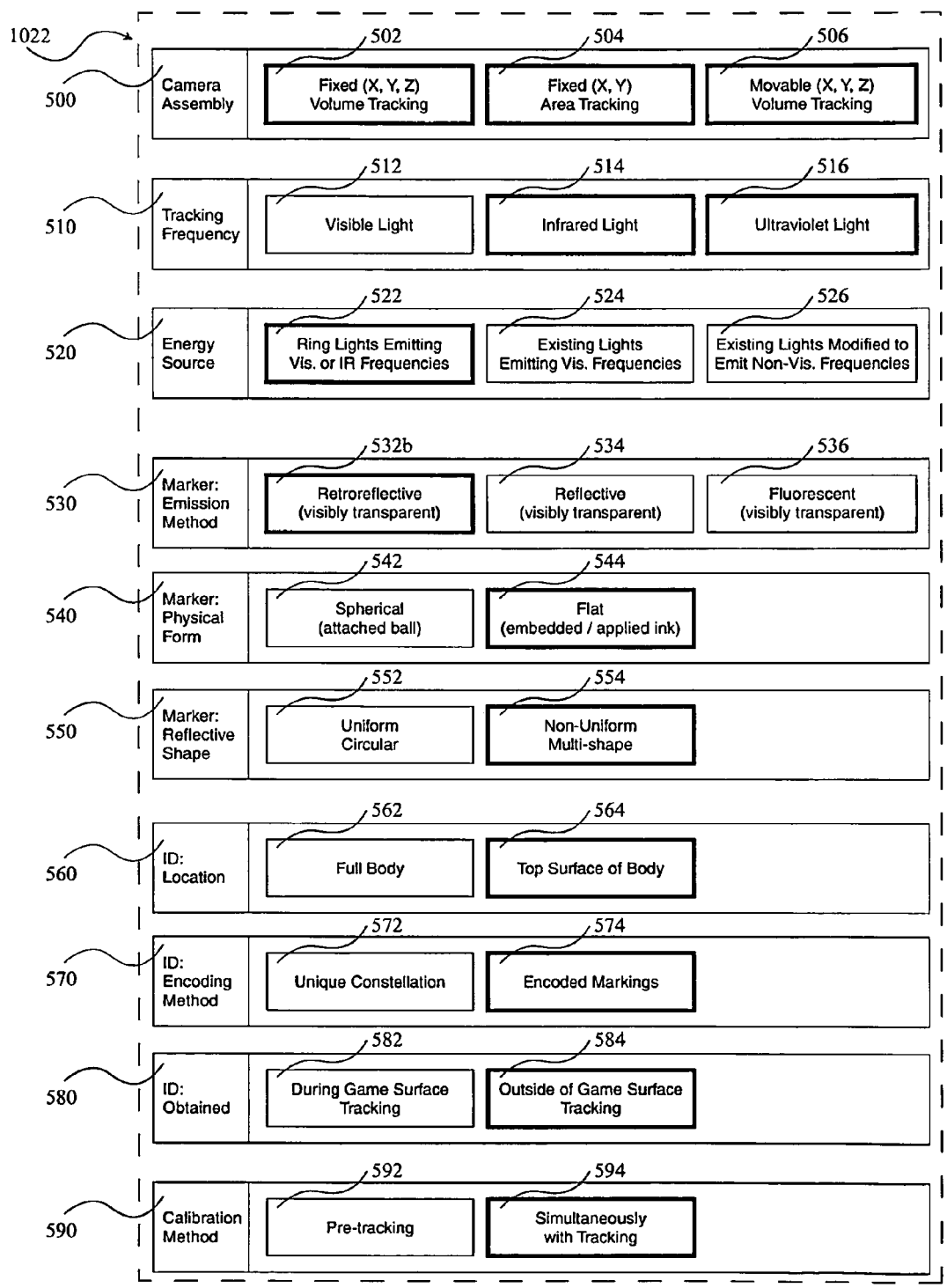
FIG. 12 is a block diagram highlighting the combination of major components in another alternate embodiment of the present invention. The main distinction between this alternate and the alternate of FIG. 11 is the additional use of movable (X, Y, Z) volume tracking cameras as well as flat retroreflective rather than reflective markers.

Referring now to FIG. 12, there is shown a block diagram substantially similar to outside of game surface id variation 1016 except that it employs additional components to provide movable volume tracking variation 1022. Variation 1022 specifically employs movable (X, Y, Z) volume tracking assemblies 506 along with a calibration method 590 that is performed simultaneously with tracking 594.

Variation 1022 incrementally improves upon the real-time 3D tracking implemented by outside of game surface id variation 1016 by providing the following additional advantages:
1—Since both fixed area and fixed volume tracking assemblies are pre-calibrated prior to tracking, by adding pre-known markers to rigid surfaces such as the player's helmet and stick or the boards and their glass support columns, the system is now able to calibrate movable cameras simultaneously with tracking, and
2—By adding movable (X, Y, Z) volume tracking cameras that can remain calibrated as they pan, tilt and zoom, the system can automatically augment the combined FOV created by existing fixed volume tracking cameras whenever anticipated player bunching is expected to create an unacceptable level of marker inclusions.

In summary, FIG. 1 represents those components either in use within currently available systems such as Motion Analysis or Vicon or the corresponding novel components taught by the present inventors.

At least the following components are considered to be novel and first taught by the present inventors for use within a multi-object tracking system:
1. fixed (X, Y) area tracking cameras 504 as a Camera Assemblies 500,
2. movable (X, Y, Z) volume tracking cameras 506 as a Camera Assemblies 500,
3. UV light 516 as a Tracking Frequency 510,
4. existing lights emitting visible frequencies 524 as an Energy Source 520,
5. existing lights modified to emit non-visible frequencies 526 as an Energy Source 520,
6. retroreflective (visibly transparent) 532b as an Emission Method for a Marker 530,
7. reflective (visibly transparent) 534 as an Emission Method for a Marker 530,
8. fluorescent (visibly transparent) 536 as an Emission Method for a Marker 530,
9. flat (embedded/applied ink) 544 as a Physical Form for a Marker 540,
10. non-uniform multi-shape 554 as a Reflective Shape for a Marker 550,
11. top surface of body 564 as a Location for the Identification 560,
12. encoded markings 574 as an Encoding Method for the Identification 570,
13. outside of game surface tracking 584 as a time to Obtain the Identification 580, and
14. simultaneously with tracking 594 as a time to perform the Calibration Method 590.

FIG. 2 represents the system 1002 that comprises a combination of components known and taught for use within a multi-object tracking system. FIG. 7 through FIG. 12 represent some of the possible and useful variations of the system 1002 including various of the additional components either first taught by the present inventors or first considered for use within such multi-object tracking systems by the present inventors. FIG. 3 represents the preferred embodiment 1004 for a multi-object tracking system. FIG. 4 through FIG. 6 represent some of the possible and useful alternate compositions of the system 1002 in consideration of known and taught components being applied in a novel way.

There are other novel components first taught by the present inventors that are not specifically identified in any of the FIGS. 1 through 12. Three such important components are:
1—the use of absorbers or reflectors to control the reflectivity of background and foreground objects creating a clear distinction between their detected energy intensities and that of the tracking markers,
2—the use of strategically placed markings on one or more rigid objects moving about with the players such as their helmet and stick in order to assist in the dynamic calibration of especially the movable volume tracking cameras, and
3—the use of strategically placed markings on one or more surfaces of the background such as the boards or their glass support columns to assist in the dynamic calibration of especially the movable volume tracking cameras.

The use of these components is considered to be important and equally applicable to any such system 1002 through 1022.

CONCLUSION, RAMIFICATIONS, AND SCOPE OF INVENTION

Thus the reader will see that the present invention successfully:
1—teaches the fundamental component groups necessary for a multi-object real-time 3D object tracking system;
2—identifies those individual components already in use within currently available systems and to which component groups they belong;
3—teaches those novel components suggested by the present inventors in this and their other four co-pending applications and to which component groups they belong;
4—teaches how the novel components allow systems to better function in a live application with multiple colliding objects, for instance a sporting event such as ice hockey;
5—identifies the composition of multi-object real-time 3D object-tracking systems in terms of actual components used from each group;
6—teaches a novel preferred embodiment for a multi-object real-time 3D object-tracking system best suited for a live sporting event such as ice hockey in terms of actual components used from each group;
7—teaches several novel alternative embodiments using one or more components of the systems mixed into the preferred embodiment, and
8—teaches several novel variations using one or more of the novel components mixed into the system.

Furthermore, the reader will also see that, for at least the preferred embodiment and to a great extant its alternates as well as the variations of the systems, the present inventors have taught how to construct a system that:
1—is scalable and therefore comprises uniform assemblies that are combinable into a matrix designed to increase tracking coverage in terms of area, volume or the number of objects while still maintaining uniform performance;
2—is minimally intrusive upon the objects to be tracked and upon the surrounding environment especially if that environment is a live setting;
3—maximizes tracking signal-to-noise ratio;
4—minimizes manufacturing and installation costs, and
5—simplifies maintenance and operation for the user.

While the above description contains many details, these should not be construed as limitations on the scope of the invention, but rather as an exemplification of preferred embodiments thereof. Many aspects of the system's functionality are beneficial by themselves without other aspects being present as will be appreciated by those skilled in the art. Furthermore, all of the novel combinations of components taught have anticipated application beyond that of the tracking of live sporting events. Examples of other applications include but are not limited to the tracking of human actors for the creation of animated film sequences, the tracking of human subjects for medical research, as well as other object tracking functions currently preformed by existing systems.

From the foregoing detailed description of the present invention, it will be apparent that the invention has a number of advantages, some of which have been described above and others that are inherent in the invention. Also, it will be apparent that modifications can be made to the present invention without departing from the teachings of the invention. Accordingly, the scope of the invention is only to be limited as necessitated by the accompanying claims.

The invention claimed is:

1. A method for use in indexing, in a database, data associated with an event, where the event is conducted at a specific performance area over a specific performance time, the method comprising steps of:
    processing detected data obtained in accordance with the event in real time, the detected data comprising tracking data of one or more event objects, where event objects are either objects or one or more people associated with the event, where the detected data are continuously received in real-time throughout the specific performance time and continuously comprise information pertaining to the entire specific performance area, where the tracking data are immediately generated from the detected data as the detected data are received and are stored in a tracking database with an index at least including event object and time, where time is directly related to the real-time of the event, and where the tracking data relate to the entire specific performance time and the entire specific performance area;
    capturing video in real-time from one or more cameras simultaneous with generating of the tracking data, where the video comprises video frames captured over time that are stored in a video database with an index at least including time, and where time is directly related to the real-time of the event; and
    providing in real-time and simultaneous to storing of the tracking and video data, a cross-link between the tracking database and the video database wherein video frames are then immediately retrieved by first accessing the tracking database.

2. The method of claim 1 where the event is held in an event venue and the venue comprises a specific performance area, where the tracking data is generated throughout the entire duration of the event and includes the locations of all one or more event objects whenever the objects are physically located within the specific performance area, and where the locations specified for the event objects are with respect to the event performance area.

3. The method of claim 2 where a view of each one or more cameras does not entirely cover the specific performance area.

4. The method of claim 2 where a view of each one or more cameras does not entirely include all of the event objects at any given event moment.

5. The method of claim 1 where the video captured from at least one of the one or more cameras simultaneous with the generating of the tracking data is non-tracking video that is distinct from the detected data comprising the tracking data, wherein the system creates a cross link between the tracking database and a non-tracking video.

6. The method of claim 1 where at least a portion of the detected data that is used to generate the tracking data is the same video for indexing captured by at least one of the least one or more cameras.

7. The method of claim 1, further comprising a step of obtaining pre-existing data associated with the event, where the step of indexing data associated with the event in the database is based on at least a portion of the processed real-time detected data and at least a portion of the obtained pre-existing data and where the generated index is used to retrieve at least a portion of the data associated with the event includes one or more cross-links between at least a portion of the processed real-time detected data and at least a portion of the obtained pre-existing data.

8. The method of claim 7, where the pre-existing data associated with the event comprises one or more of event object information, event object group information, detector information, event area information or layout.

9. The method of claim 7, where the event is a sporting event and the people are players, game officials or coaches, and where the pre-existing data at least includes a list of players and team associations, if the sporting event is a team sport.

10. The method of claim 1, where processing of the detected data into tracking data comprises generating at least one of event object location information, event object orientation information, or event object activity information.

11. The method of claim 10, where generating of the at least one of event object location, orientation, or activity information comprises generating one or more event object motion paths using a real-time tracking technique.

12. The method of claim 1, where at least a portion of the tracking data indexed in the database includes event object locations associated with each object's unique identity, wherein video frames are then immediately retrieved by first accessing event object identity in the tracking database.

13. The method of claim 1, for providing individuals, including the event objects that are players, coaches or game officials, or other people who are not event objects including fans, instant real-time or delayed access to either some or all of the tracking and video databases, further including a step of providing a database connection process for accessing the tracking and video databases for use by any one or more remote computing devices over a network connection, where the cross-linked databases are used immediately as created for processing requests indicating one or more different event times to be queried based upon review of the event object tracking data, wherein the connection process then provides tracking or video data corresponding to specified event times.

14. The method of claim 13, where the event is a sporting event held at an event venue with team benches and the event objects at least include players, coaches or game officials, where either the players, coaches or game officials use portable devices at the event venue or computer work stations on the team benches as networked computing devices for issuing requests and receiving tracking or video data.

15. The method of claim 14, where the sporting event is either a practice or a game.

16. The method of claim 1, where the event is held in a venue comprising a specific performance area throughout which the event objects are expected to move, for creating at least a portion of the detected data within the specific performance area, comprising a step of using two or more tracking cameras where the tracking cameras are first aligned in an array wherein combined views of all two or more tracking cameras create a single field of view covering the entire specific performance area, and where at least a portion of the obtained detected data comprise the video frames from the array of tracking cameras.

17. The method of claim 16, where each of the two or more tracking cameras are located either: (1) directly over the specific performance area wherein the individual tracking camera's field of view is perpendicular to the specific performance area, or (2) not directly over the specific performance area wherein the individual tracking camera's field of view is neither perpendicular nor parallel to the specific performance area.

18. The method of claim 1, where at least a portion of the obtained detected data comprises the video frames captured from at least one of the one or more cameras, further comprising a step of affixing at least one marker to at least one of the event objects wherein the marker is detected data within the video frames, where the processing of the detected data in order to generate tracking data first locates any affixed marker within the video frame for determining the marker's location, and where the location of the affixed marker is then used as the location of the event object to which the marker is attached.

19. The method of claim 18, where the at least one marker is identity encoded, where the processing of the detected data in order to generate tracking data first locates and decodes any affixed encoded marker for determining the marker's location within the video frame and identity, and where the location and identity of the affixed marker is then used as the location and identity of the event object to which the marker is attached.

20. The method of claim 18, where the at least one marker is substantially non-visible, and where the at least one camera for capturing video frames used as detected data are further enabled to detect the non-visible marker.

21. The method of claim 1, for creating a minimized video database, further comprising a step of processing the video frames prior to storage by comparing each image frame from each camera to a pre-known background image in order to determine at least the foreground pixels and subsequently storing in the minimized video database a minimal number of foreground pixels in a representative format that is sufficient to ensure that the original video frame can be substantially recreated when reapplying the minimal number of foreground pixels back onto the pre-known image backgrounds.

22. The method of claim 21, for creating a likeness of the originally captured video from the minimized video database, further comprising a step of (i) using the pre-known background image corresponding to the view of the originally captured video, (ii) retrieving the minimal number of foreground pixels corresponding to the original video from the minimized video data, and (iii) overlaying the retrieved minimal foreground pixels onto the pre-known background.

23. The method of claim 1, for creating a stylized graphical representation of the event activities, further comprising a step of translating the tracking data into one or more graphical symbols that are at least moved within a video image in accordance with the tracked locations of the respective event objects.

24. The method of claim 23, where the stylized graphical representation of the event is interchangeable with the video frames stored in the video database for reviewing the event.

25. The method of claim 1, for automatically adjusting a view in real-time of one or more adjustable cameras recording the event, further comprising steps of:
using one or more automatically adjustable cameras enabled to adjust any of a pan, tilt or zoom setting, where any of the pan, tilt or zoom settings of the adjustable camera are adjusted in response to digital directives, and
processing the tracking data in order to determine a center-of-play and sending digital directives to any one or more of the automatically adjustable cameras in order to dynamically adjust any of the camera's pan, tilt or zoom settings to best align that camera's view with the determined center-of-play.

26. The method of claim 1, where one or more cameras are used to capture video of the event throughout the entire duration of the event for storage in the video database cross-linked to the tracking database, where all video frames captured of the event by at least one always-storing camera of the one or more cameras are stored in the video database, wherein any temporal portion of the event is available for immediate review using at least the video captured and stored from any always-storing camera by first accessing the tracking database and then cross-linking by time to the corresponding video in the video database.

27. Apparatus for use in indexing, in a database, data associated with an event, where the event is conducted at a specific performance area over a specific performance time, comprising:
at least one camera to capture video data in real-time of the event, where the video data comprises video frames captured over time, and
at least one processor configured to: (i) process detected data obtained in accordance with the event in real-time, the detected data comprising tracking data of one or more event objects, where event objects are either objects or one or more people associated with the event, where the detected data are continuously received in real-time throughout the specific performance time and continuously comprise information pertaining to the entire specific performance area, and where the tracking data are immediately generated from the detected data as the detected data are obtained; and (ii) storing and indexing both the video and tracking data in a database related to time and providing a cross-link between the video and tracking databases simultaneous with both the capture of the video data and generating of the tracking data, where time is directly related to the real-time of the event, wherein video frames are then immediately retrieved by first accessing the tracking database.

28. The apparatus of claim 27 where the event is held in an event venue and the venue comprises a specific performance area, where the tracking data is provided throughout the entire duration of the event and at least includes the locations of all one or more event objects whenever the one or more objects are physically located within the specific performance area, and where the locations specified for the objects are with respect to the event performance area.

29. The apparatus of claim 28 where a view of any of the at least one camera does not entirely cover the specific performance area.

30. The apparatus of claim 28 where a view of any of the at least one camera does not entirely include all of the event objects at any given event moment.

31. The apparatus of claim 27 where the video captured from at least one of the one or more cameras simultaneous with the generating of the tracking data is non-tracking video that is distinct from the detected data comprising the tracking data, wherein the system creates a cross link between the tracking database and a non-tracking video.

32. The apparatus of claim 27 where at least a portion of the detected data that is used to generate the tracking data is the same video for indexing captured by at least one of the at least one camera.

33. The apparatus of claim 27, further comprising an additional process operative on at least one processor to obtain pre-existing data associated with the event, where the indexing operation of data associated with the event in the database is based on at least a portion of the processed real-time detected data and at least a portion of the obtained preexisting data and where the generated index is used to retrieve at least a portion of the data associated with the event includes one or more cross-links between at least a portion of the processed real-time detected data and at least a portion of the obtained pre-existing data.

34. The apparatus of claim 33, where the pre-existing data associated with the event comprises one or more of event object information, event object group information, detector information, event area information or layout.

35. The apparatus of claim 33, where the event is a sporting event and the people are players, game officials or coaches, and where the pre-existing data at least includes a list of players and team associations, if the sporting event is a team sport.

36. The apparatus of claim 27, where processing of the detected data into tracking data comprises generating at least one of event object location information, event object orientation information, or event object activity information.

37. The apparatus of claim 36, where generating of the at least one of event object location, orientation, or activity information comprises generating one or more event object motion paths using a real-time tracking technique.

38. The apparatus of claim 27, where at least a portion of the tracking data indexed in the database includes event object locations associated with each object's unique identity, wherein video frames are then immediately retrieved by first accessing event object identity in the tracking database.

39. The apparatus of claim 27, for providing individuals, including the event objects that are players, coaches or game officials, or other people who are not event objects including fans, instant real-time or delayed access to either some or all of the tracking and video databases, further comprising an additional process operative on at least one processor to provide a database connection for accessing the tracking and video databases for use by any one or more remote computing devices over a network connection, where the cross-linked databases are used immediately as created for processing requests indicating one or more different event times to be queried based upon review of the event object tracking data, wherein the connection process then provides tracking or video data corresponding to specified event times.

40. The apparatus of claim 39, where the event is a sporting event held at an event venue with team benches and the event objects at least include players, coaches or game officials, where either the players, coaches or game officials use portable devices at the event venue or computer work stations on the team benches as networked computing devices for issuing requests and receiving tracking or video data.

41. The apparatus of claim 40, where the sporting event is either a practice or a game.

42. The apparatus of claim 27, where the event is held in a venue comprising a specific performance area throughout which the event objects are expected to move, where two or more tracking cameras are used to capture video data of the event and arranged in an array wherein combined views of all two or more tracking cameras create a single field of view covering the entire specific performance area, and where at least a portion of the obtained detected data comprise the video frames from the array of tracking cameras.

43. The apparatus of claim 42, where each of the two or more tracking cameras are located either: (1) directly over the specific performance area wherein the individual tracking camera's field of view is perpendicular to the specific performance area, or (2) not directly over the specific performance area wherein the individual tracking camera's field of view is neither perpendicular nor parallel to the specific performance area.

44. The apparatus of claim 27, where at least a portion of the obtained detected data comprises the video frames captured from at least one of the at least one camera, and where at least one marker is affixed to at least one of the event objects wherein the marker is detected data within the video frames, where the processing of the detected data in order to generate tracking data first locates any affixed marker within the video frame for determining the marker's location, and where the location of the affixed marker is then used as the location of the event object to which the marker is attached.

45. The apparatus of claim 44, where the at least one marker is identity encoded, where the processing of the detected data in order to generate tracking data first locates and decodes any affixed encoded marker for determining the marker's location within the video frame and identity, and where the location and identity of the affixed marker is then used as the location and identity of the event object to which the marker is attached.

46. The apparatus of claim 44, where the at least one marker is substantially non-visible, and where the at least one camera for capturing video frames used as detected data are further enabled to detect the non-visible marker.

47. The apparatus of claim 27, where the process for storing the video frames in the video database first segments each frame by comparing each image frame from each camera to a pre-known background image in order to determine foreground pixels, and where a minimal number of foreground pixels in a representative format is stored in a minimized video database wherein when the minimal number of foreground pixels are retrieved from the minimized video database and reapplied to the pre-known background image the result is a recreated video frame substantially similar to the originally segmented video frame.

48. The apparatus of claim 47, where an additional process operative on at least one processor by either the event objects that are people or other individuals, provides a likeness to the originally captured video by (i) using the pre-known background image corresponding to the view of the originally captured video, (ii) retrieving the minimal number of foreground pixels corresponding to the original video from the minimized video data, and (iii) overlaying the retrieved minimal foreground pixels onto the pre-known background.

49. The apparatus of claim 27, where an additional process operative on at least one processor by either the event objects that are people or other individuals, provides a stylized graphical representation of the event by creating a visual display using one or more graphical symbols to represent the event objects, where the symbols are at least moved in accordance with the tracking data.

50. The apparatus of claim 49, where the stylized graphical representation of the event is interchangeable with the video frames stored in the video database for reviewing the event.

51. The apparatus of claim 27, where a view of at least one camera recording the event is automatically adjusted in real-time, further comprising:
at least one automatically adjustable camera enabled to adjust any of a pan, tilt or zoom setting, where any of the pan, tilt or zoom settings of the adjustable camera are adjusted in response to digital directives, and an additional process operative on at least one processor for processing the tracking data in order to determine a center-of-play and for sending digital directives to the at least one automatically adjustable camera in order to dynamically adjust any of the camera's pan, tilt or zoom settings to best align that camera's view with the determined center-of-play.

52. The apparatus of claim 27, where at least one camera is used to capture video of the event throughout the entire duration of the event for storage in the video database cross-linked to the tracking database, where all video frames captured of the event by at least one always-storing camera of the at least one cameras are stored in the video database, wherein any temporal portion of the event is available for immediate review using at least the video captured and stored from any always-storing camera by first accessing the tracking database and then cross-linking by time to the corresponding video in the video database.

* * * * *